United States Patent [19]

Sherman, III et al.

[11] Patent Number: 4,703,172

[45] Date of Patent: Oct. 27, 1987

[54] METHOD AND APPARATUS FOR COUNTING SHEETS WHICH MAY BE FED IN SKEWED AND/OR OVERLAPPING FASHION

[75] Inventors: William Sherman, III, Medford; Francis C. Larkin, Trenton, both of N.J.; Stephen J. Horvath, Bensalem, Pa.

[73] Assignee: Brandt, Incorporated, Bensalem, Pa.

[21] Appl. No.: 840,147

[22] Filed: Mar. 17, 1986

Related U.S. Application Data

[62] Division of Ser. No. 440,584, Nov. 10, 1982, Pat. No. 4,608,704.

[51] Int. Cl.[4] ........................ G01N 9/04; G06M 7/00
[52] U.S. Cl. ................................ 250/223 R; 271/263
[58] Field of Search ............... 250/222.2, 223 R, 559, 250/560, 561; 271/262, 263; 356/376, 381, 383; 364/562, 563; 377/53

[56] References Cited

U.S. PATENT DOCUMENTS

| | | | |
|---|---|---|---|
| Re. 29,470 | 11/1977 | Jones | 377/53 |
| 3,614,419 | 10/1971 | Daughton et al. | 250/223 R |
| 3,737,666 | 6/1973 | Dutro | 250/223 R |
| 4,577,096 | 3/1986 | Beery et al. | 250/223 R |

*Primary Examiner*—David C. Nelms
*Assistant Examiner*—Stephone Allen
*Attorney, Agent, or Firm*—Shenier & O'Connor

[57] ABSTRACT

Sensors in the infeed and output stackers, under control of the microprocessor, monitor the sheets. The apparatus is started automatically by placing sheets in the infeed. A count of the sheets is developed and displayed as the sheets are fed. When the infeed is empty and the output contains sheets, the count is retained. If sheets are removed from the outfeed, the count is retained and is reset only after more sheets are placed in the input. The same rules obtain for batching. The sensors cooperate with singles, holes and doubles detectors and have their gain adjusted depending upon sheet density. Automatic threshold adjustment circuits compensate for dust build-up and component aging. Upon sheet detection, the sensing circuit threshold level is instantaneously shifted to prevent an abrupt change in intensity from the sheet covering the sensor to provide an erroneous indication of the presence of a subsequent sheet or sheets. The sensors assure accurate counting even through sheets are fed in skewed and/or overlapping fashion. An amplifier normally in saturation is driven out of saturation when light intensity drops to increase the ability to determine the transmissivity to distinguish between single and double sheets. Operating speed may be reduced from normal speed. All timing is automatically readjusted according to the selected operating speed. The control circuitry may be coupled to and synchronized with a denominations counter and printer. The doubles detection circuit may also discriminate between two and three overlapped sheets.

7 Claims, 12 Drawing Figures

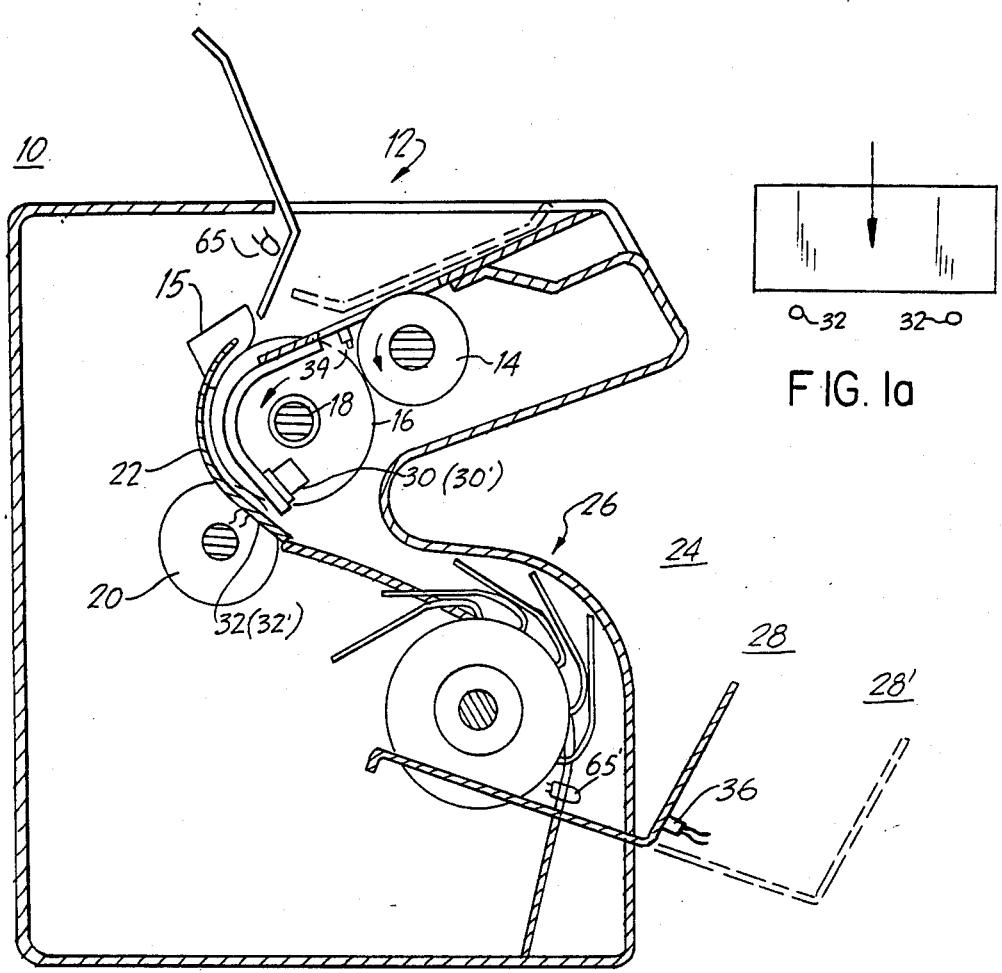
FIG. 1a
FIG. 1
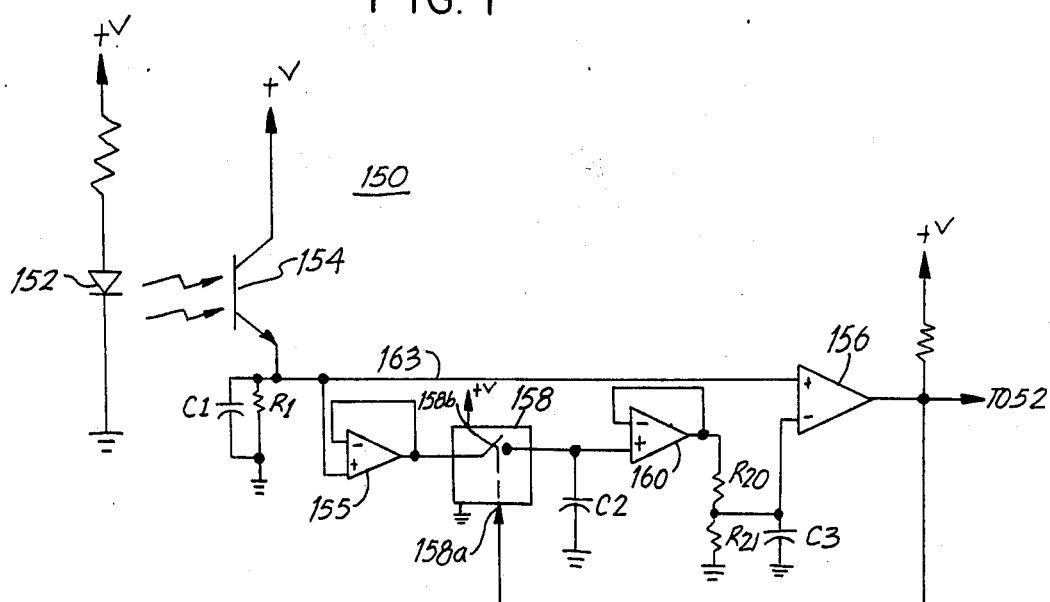
FIG. 2a

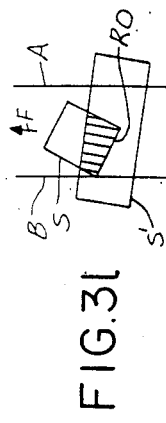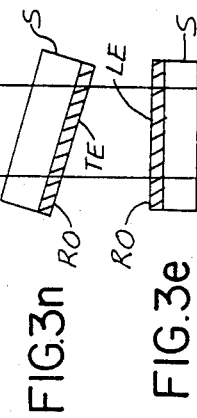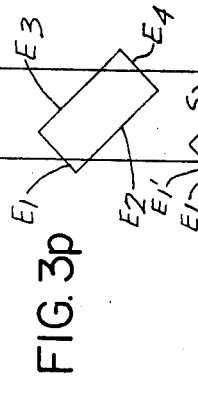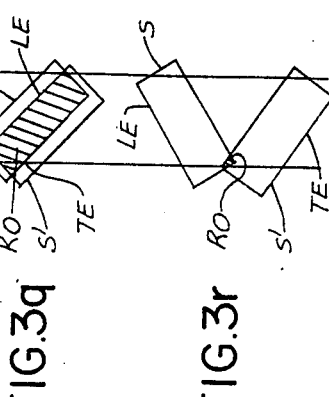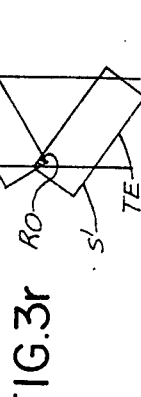
FIG.3l  FIG.3m  FIG.3n  FIG.3o  FIG.3p  FIG.3q  FIG.3r
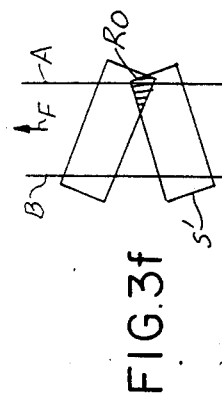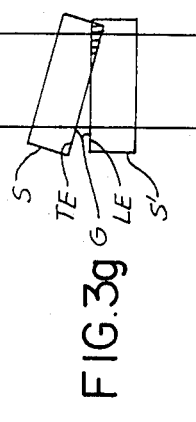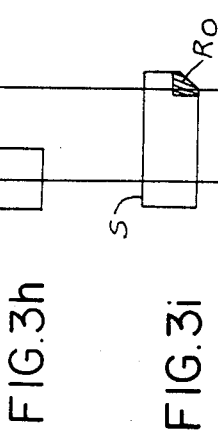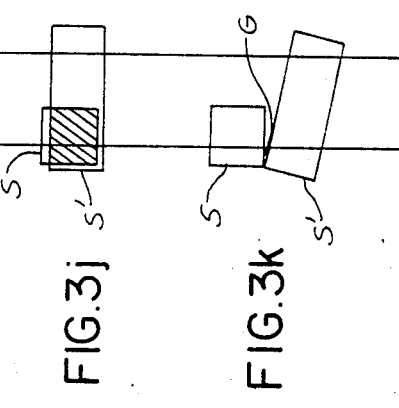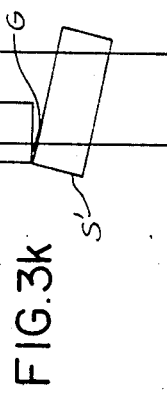
FIG.3f  FIG.3g  FIG.3h  FIG.3i  FIG.3j  FIG.3k
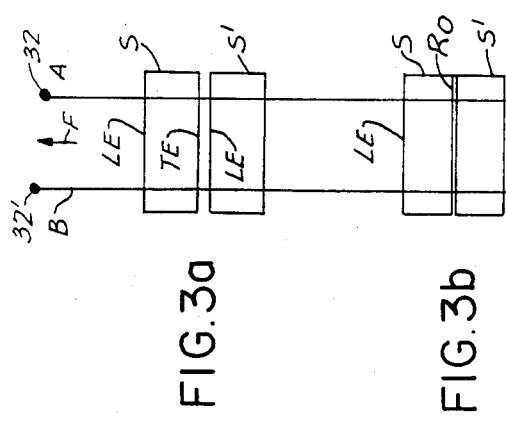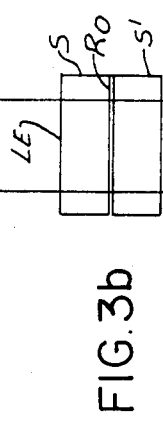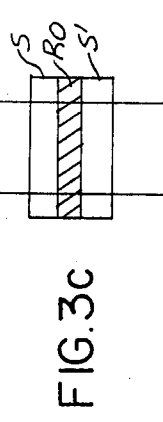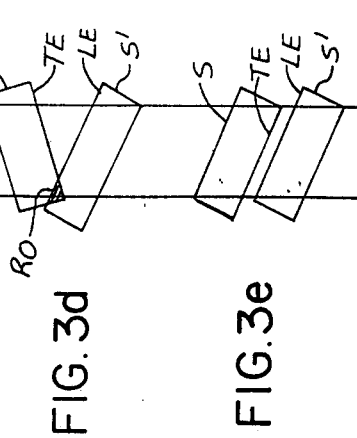
FIG.3a  FIG.3b  FIG.3c  FIG.3d  FIG.3e

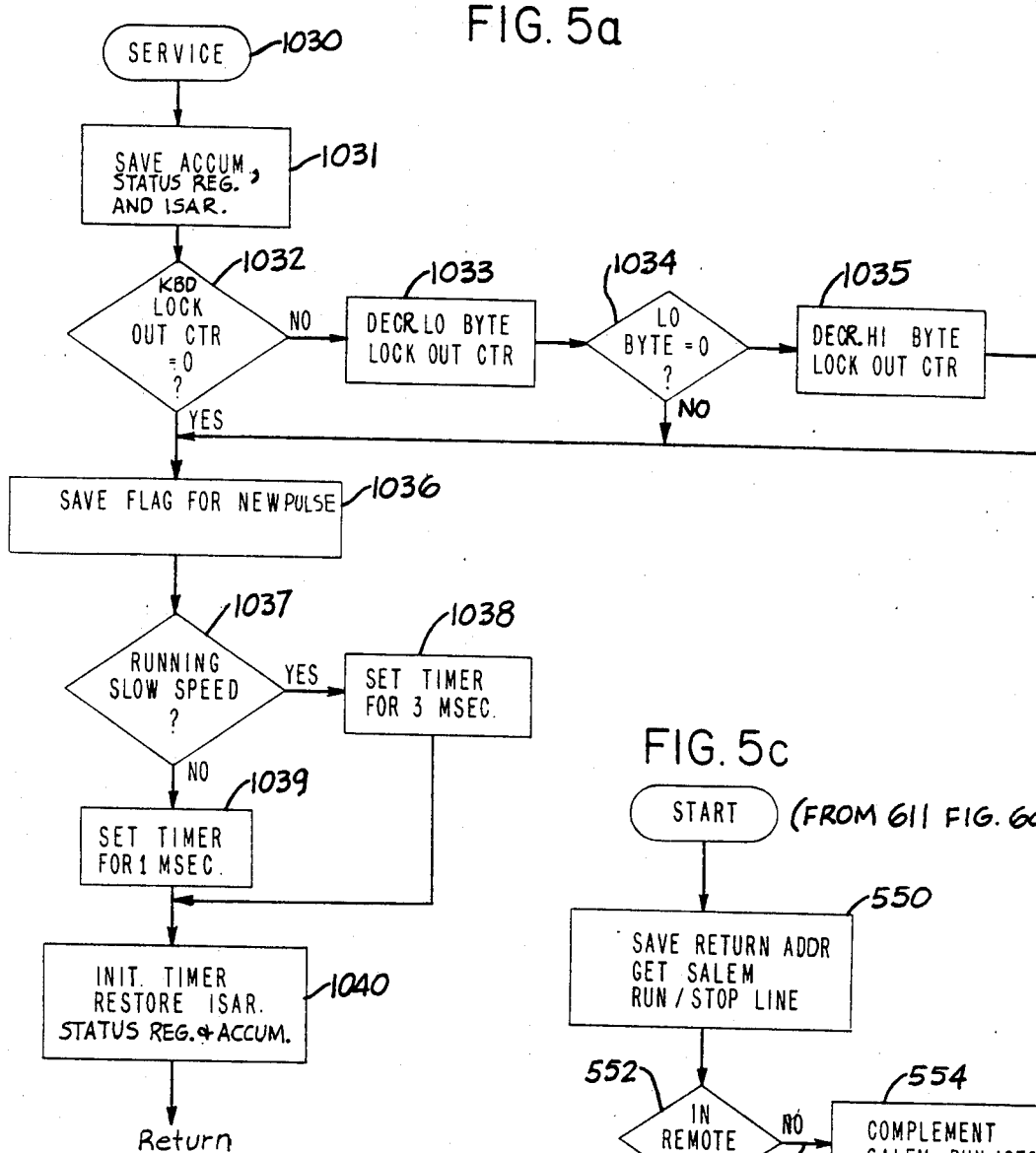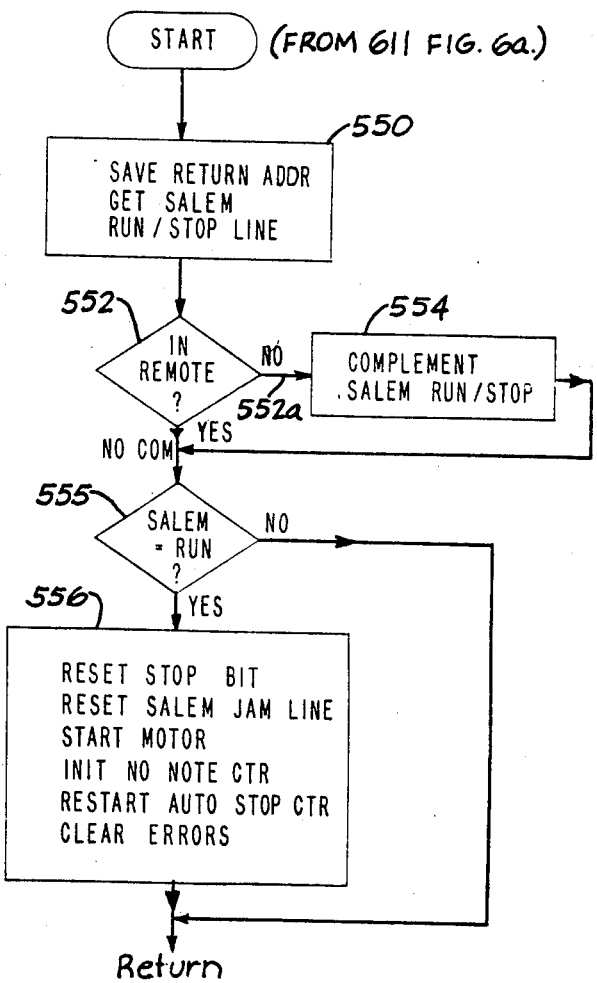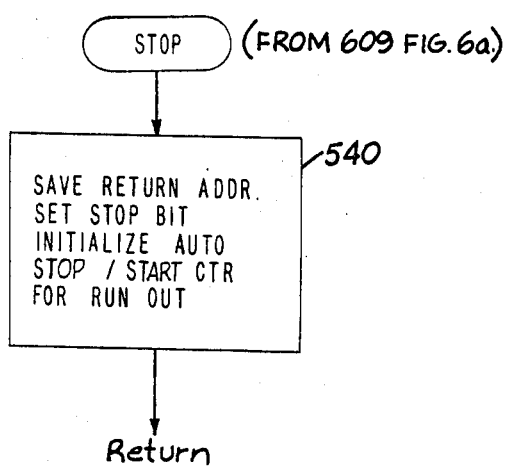

FIG. 5d

- 1100: SHUT OFF MOTOR / SET SPEED BIT / SET 20mSEC DELAY (FROM 685a FIG.6C)
- 1102: DELAY=0 ? — NO (loop) / YES
- 1104: TURN ON MOTOR AT 1/3 SPEED
- 1106: LAST DOC. GONE FROM SENSORS ? — NO (loop) / YES
- 1108: TURN OFF MOTOR
- 1110: IS SPEED BIT SET TO NORMAL ? — YES / NO
- 1112: SET MOTOR AT NORMAL SPEED
- 1114: SET MOTOR AT 1/3 NORMAL SPEED
- TO 686 FIG.6C

FIG. 7f

| FIG.7a |
| FIG.7b |
| FIG.7c |
| FIG.7d |
| FIG.7e |

FIG. 6e

| FIG.6a |
| FIG.6b |
| FIG.6c |
| FIG.6d |

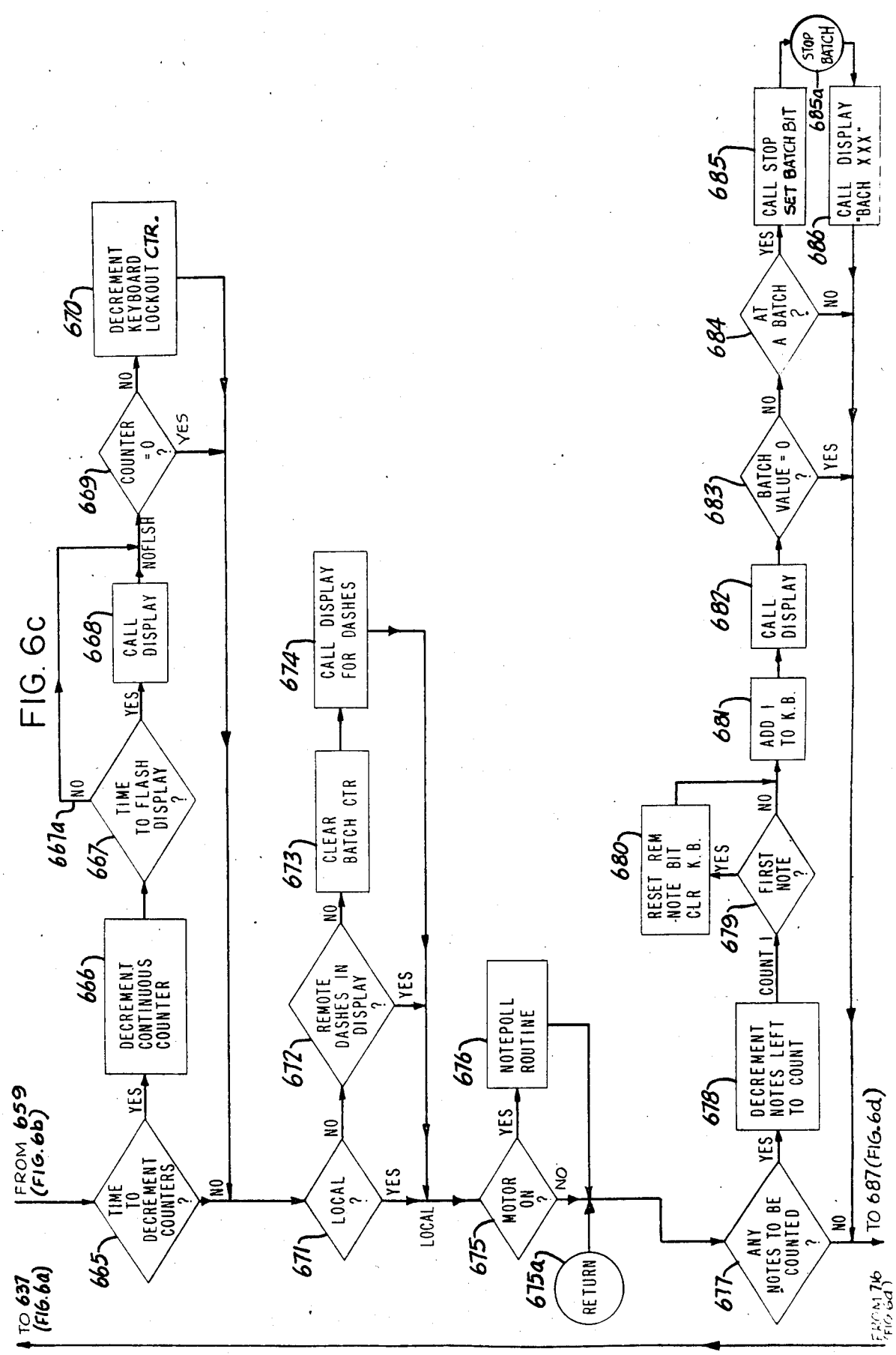

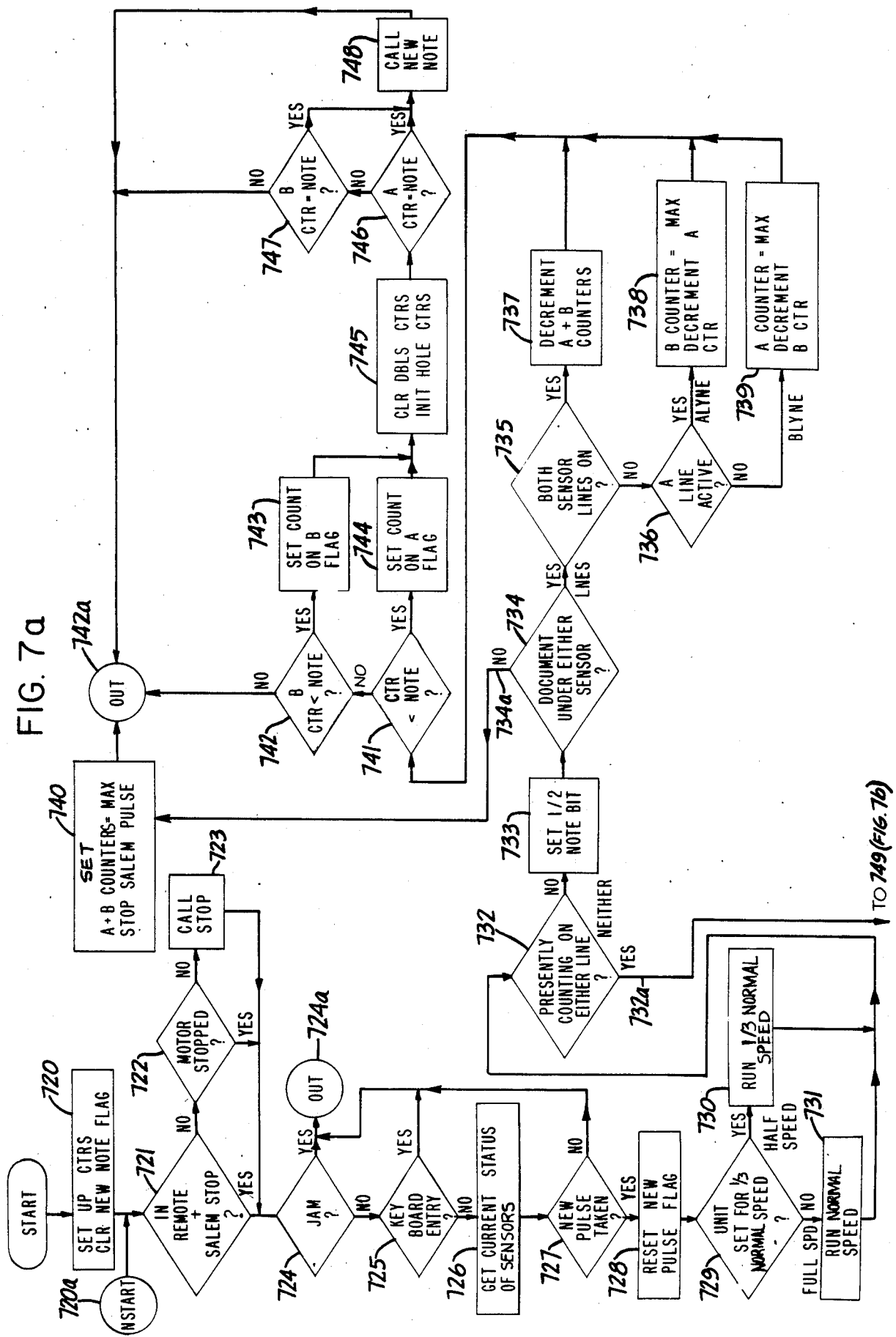

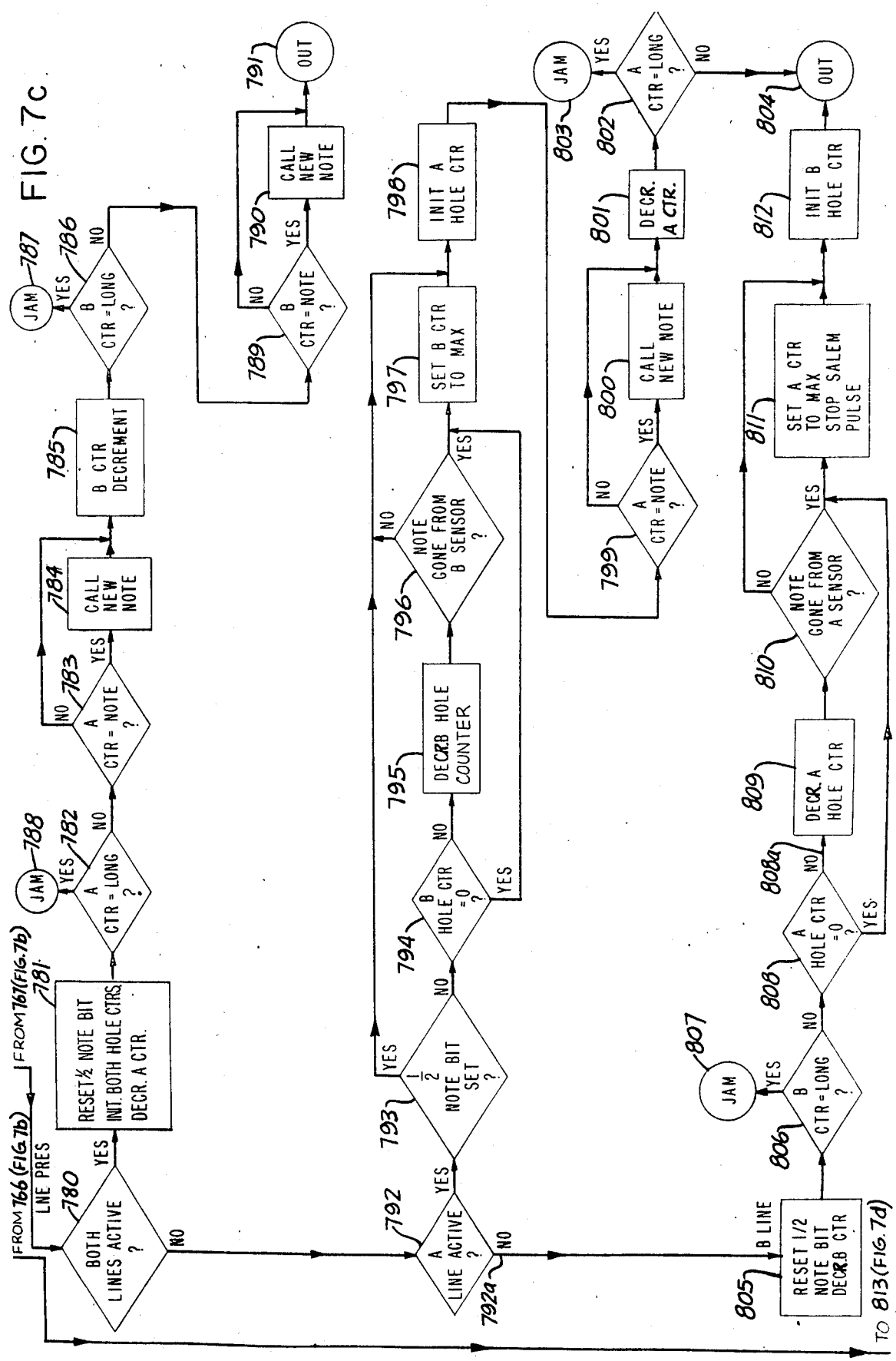

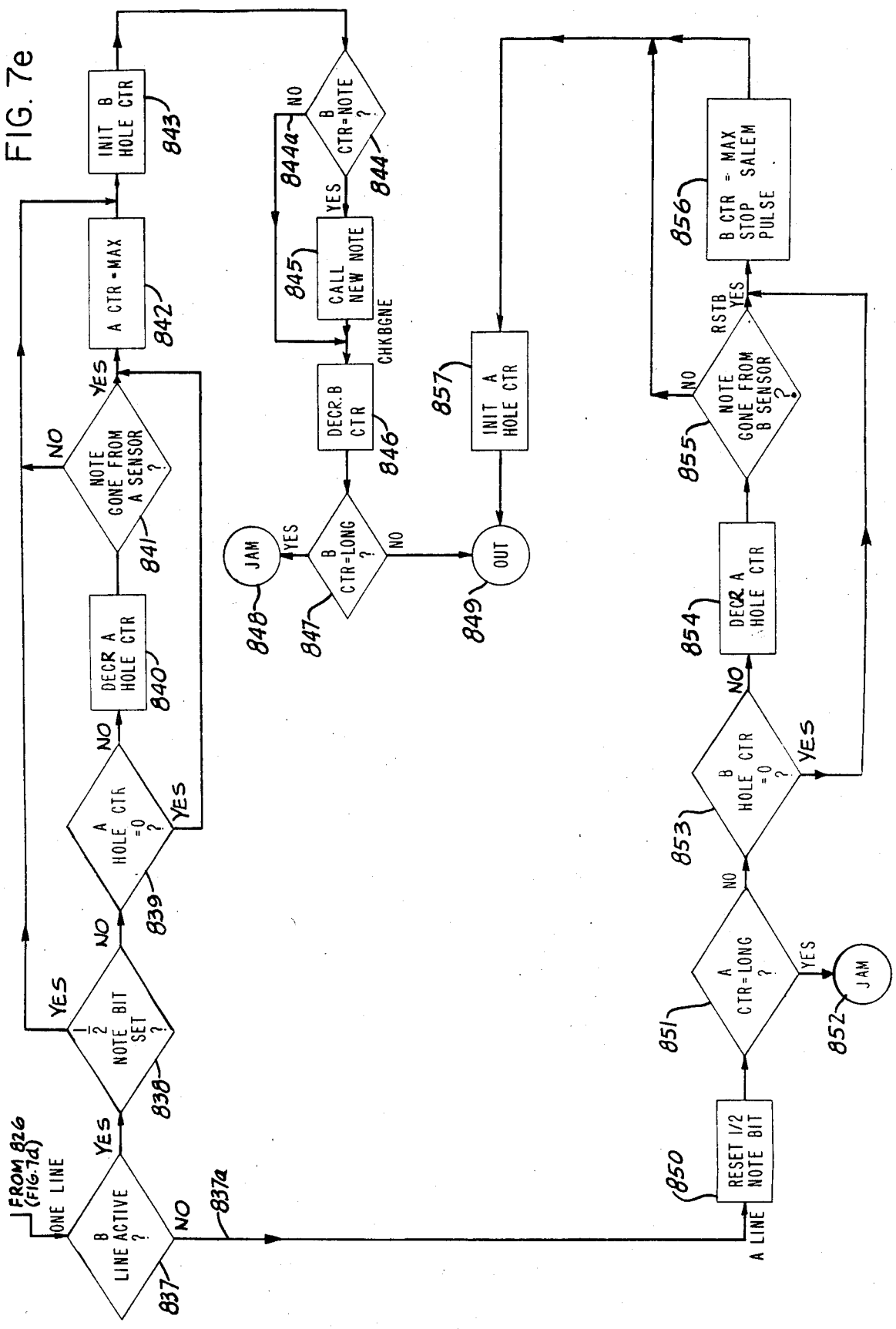

METHOD AND APPARATUS FOR COUNTING SHEETS WHICH MAY BE FED IN SKEWED AND/OR OVERLAPPING FASHION

This is a division of application Ser. No. 440,584, filed Nov. 10, 1982, now U.S. Pat. No. 4,608,704.

FIELD OF THE INVENTION

The present invention relates to document handling and counting apparatus and more particularly to novel microprocessor-based control means to provide substantially automatic operation of such apparatus during both normal counting and batching operations and for significantly enhancing the sensitivity and capability of the system for detecting the presence of multiple-fed sheets thereby enabling the accurate counting of sheets fed in a skewed and/or overlapping manner.

BACKGROUND OF THE INVENTION

Present day document handling and counting apparatus have the capability of accurately handling and counting sheets at high speed. Typically, sheets placed in an infeed hopper are separated from a stack fed on a one-at-a-time basis and at spaced intervals, the difference in transmissivity of the gap between separated sheets and the sheets themselves being utilized for counting purposes. Present day handling and counting apparatus typically operates under control of manually operable switches and buttons to perform the desired operations. For example, the apparatus is normally turned on by operating an on/off switch to the on position and operating a start switch or button to turn on the document handling apparatus. Sheets placed in the infeed hopper are separated, counted and collected at an output stacker. During normal counting, the count developed in a display counter will be retained until it is manually reset. Thus, for example, the sheets placed in the infeed hopper are separated, counted and delivered to the output stacker. If the contents of the output stacker are removed and again placed into the infeed hopper, the count will be double that of the original count, unless the count has been manually reset. Also the handling apparatus will not be turned off unless a stop button is operated.

When counting sheets in present day apparatus, unless the sheets are accurately aligned, the feeding of sheets in a skewed manner will yield an erroneous count. In addition, even among those document handling and counting devices presently capable of detecting the presence of double-fed sheets, it is extremely difficult to differentiate between two clean double-fed sheets and one dirty sheet. This capability is of great value in the counting of paper currency.

BRIEF DESCRIPTION OF THE INVENTION

The present invention is characterized by comprising a document handling and counting apparatus in which microprocessor-based control means is provided for automating operations of the document counting and handling apparatus not hereto provided for in presently available apparatus, and further having singles and doubles detection apparatus which significantly increases the sensitivity of the system to facilitate distinguishing between single-fed and double-fed sheets.

The present invention is characterized by comprising sensors arranged in the input hopper and output stacker and which, under control of a microprocessor, substantially automatically control the operation of the document handling and counting apparatus.

The document handling and counting apparatus may be of the type described in copending application Ser. No. 288,646 filed July 30, 1981, which application is assigned to the assignee of the present invention. The control means turns on the document handling apparatus when the stack of sheets is placed in the input hopper and the unit will either start automatically or when the start button is depressed, to begin operation. During a normal counting operation, when sheets are counted and delivered to the output stacker and the input hopper is emptied, the handling apparatus is turned off, but the count is retained. So long as the counted sheets have not been removed from the output stacker, when the sensor again detects the presence of sheets in the input hopper, the handling apparatus is again activated and counting automatically continues, whereupon the count of the second group of sheets placed in the input hopper is added to the pre-existing count of the first group of sheets. When the input is empty, counting stops. However, the count remains displayed. If documents are placed in the input while documents are still in the output, the count accumulates. If documents are placed in the input when the output has previously been emptied, the count resets when the documents are set into the input, i.e. the count remains displayed after documents are removed from the output and is not cleared until documents are placed in the input. Delays are provided at turn on and turn off to give the operator time to insert (or remove) a stack of sheets and remove the operator's hands from the machine.

The control apparatus operates in a similar manner during a batch mode whereupon any incomplete batch removed from the output stacker when the input hopper is empty, automatically resets the count of the portion of the batch which has been counted. If the sheets of a partial batch are not removed and sheets are placed in the infeed hopper, counting automatically continues. Thus, once the apparatus has been turned on, there is no further need to activate any manually operable buttons or switches to further automate the operation of the apparatus, and facilitate and simplify its use.

Sheets are examined and counted by first and second sensors, the handling apparatus normally feeding the sheets past the sensors one at a time at spaced intervals normally providing a gap between the trailing edge of each sheet and the leading edge of the next succeeding sheet. The difference in transmissivity of a gap and a sheet is utilized for counting purposes. Each sensor cooperates with both singles and doubles detection circuitry for detecting the presence of sheets, gaps between sheets, or holes within sheets, and further detecting the presence of double-fed sheets. Each sensor circuit is comprised of an LED and cooperating photodiode. Signals from the photodiodes are amplified by amplifying means including manually adjustable gain control means for adjusting the gain of the amplifier in accordance with the transmissivity of sheets being handled over a range from light (i.e. high transmissivity) to dark (i.e. low transmissivity). The amplified signals are further applied to a feedback circuit which regulates the current to the LED to provide optimum sensing conditions. The current regulated, amplified signal developed by each sensor is simultaneously applied to a pair of comparators for comparison against predetermined threshold levels to detect the presence of single-fed or double-fed sheets. The detection of the leading edge of a sheet causes each single sheet detection comparator to operate an electronic switch means to abruptly and significantly change the threshold level applied to both the singles and doubles detection comparators during the remainder of the detection cycle to prevent high density/and transmissivity portions of a sheet from generating a false count. The threshold circuit compensates for drift due to gradual changes in signal output resulting from aging of electronic components, accumulation of dust and the like.

Output signals from the single document detection comparators are utilized for counting purposes.

The sensor signals undergo a second stage of amplification before being applied to the double-fed document comparators, the last-mentioned amplifier being normally maintained in saturation. When the signal developed by the sensor drops significantly, the last-mentioned amplifier is driven out of saturation whereby only large negative transitions of the sensor signal drive the last-mentioned amplifier out of saturation thereby significantly enhancing the capability of the comparator circuit for detecting differences between clean, double-fed sheets and a dirty single-fed sheet, for example.

The signals developed by the first and second sensors are examined to assure the accurate counting of sheets, even in the event that they are fed in a skewed fashion. For example, if the leading edge of a sheet passes the sensors at different times, a sheet will be counted even if one sensor indicates the sheet as being present while the leading edge has yet to be detected by the remaining sensor. The signals and their time occurrence relative to one another are utilized to determine the presence of single and/or double-fed sheets as well as misaligned sheets.

Sensors are also provided within the infeed hopper and output stacker to provide signals utilized by the microprocessor to automate operation of the equipment. The sensor circuits incorporate drift adjustment means to compensate for changes in sensor output level due to component aging, dust accumulation and the like.

The document handling and counting apparatus is activated by operating an off/on switch. When a stack of sheets is placed in the input hopper, the sheet feeding apparatus is automatically energized and the sheet counter is reset, without using the start button. Sheets are separated, counted and stacked in the output stacker. When the input hopper is empty, the sensor turns off the motor of the feeding apparatus. The count is automatically reset when the next counting operation begins, i.e., when sheets are placed in the input hopper. The procedure is similar when the apparatus is operated in a batching mode. When the batch amount is collected in the output stacker, operation is halted. If the completed batch is removed from the output stacker and there are bills in the input hopper, the apparatus automatically restarts. The sensor circuits utilize solid state comparator circuits which provide extremely large input impedances forming part of the adjustable threshold circuit which prevents discharge of the capacitance element employed therein, even after a lengthy time interval between the last time the presence of a sheet was sensed and the next time that the sheets are placed into the hopper, which period can be of the order of more than an hour, without affecting the accuracy and operating efficiency of the circuitry.

The microprocessor samples the outputs of the sensors at predetermined intervals. The sampled values are accumulated in single, double and hole counters associated with each sensor. These counters are examined and their counts are utilized to count sheets, indicate jam or error conditions, and indicate the presence of half-sheets and double-fed sheets as well as identifying other conditions.

The microprocessor also controls electronic circuitry for turning on and turning off the primary drive source for the apparatus and for operating at a changed speed. This capability is also utilized to complete a batch and prevent misfeeding of the next sheet.

The microprocessor is adapted to accommodate printing calculator means and interfaces with the printing calculator to synchronize operations including the transfer of data between the microprocessor and the printing calculator and to enable either apparatus to control and/or halt the operation of the other under command.

The microprocessor stores all of the data including time delay information and the like related to operating speed. The microprocessor is also capable of changing the operating speed of the apparatus and, responsive to such a change, the timing circuits are automatically readjusted to accommodate the speed change.

The equipment is adapted to accommodate different types of keyboards without requiring any additional programming.

OBJECTS OF THE INVENTION AND BRIEF DESCRIPTION OF THE FIGURES

It is, therefore, one object of the present invention to provide a novel microprocessor based control system for document handling and counting apparatus for automating handling and counting operations.

Still another object of the present invention is to provide novel control circuitry for document handling and counting apparatus having a greatly enhanced capability of distinguishing between single and double-fed sheets passing through said apparatus.

Still another object of the present invention is to provide a novel method and apparatus for counting sheets, even though fed in a skewed and/or overlapping fashion.

Still another object of the present invention is to provide novel sensing and control means for analyzing and counting sheets regardless of their orientation as they pass through said apparatus.

Still another object of the present invention is to provide novel microprocessor based control means for document handling and counting apparatus for controlling all of the operations of the document handling and counting apparatus, as well as simplifying and automating operation of the apparatus to provide capabilities not contemplated by state of the art apparatus.

Still another object of the present invention is to provide a self-compensating threshold circuit for document sensors to prevent erroneous operation due to long delays during which no documents are present in the stacking device.

The above, as well as other objects of the present invention, will become apparent when reading the accompanying description and drawing in which:

FIG. 1 is a simplified diagram showing a document handling and counting apparatus which may be controlled by the system of the present invention.

FIG. 1a is a simplified diagram showing the manner in which sheets are examined by the sensors provided in the apparatus of FIG. 1.

FIG. 2a is a schematic diagram of a sensing circuit which may be substituted for the sensor circuits shown in FIG. 2.

FIGS. 3a through 3r show sheet feeding conditions which are useful in describing the operation and capabilities of the system of the present invention.

Figure 2:
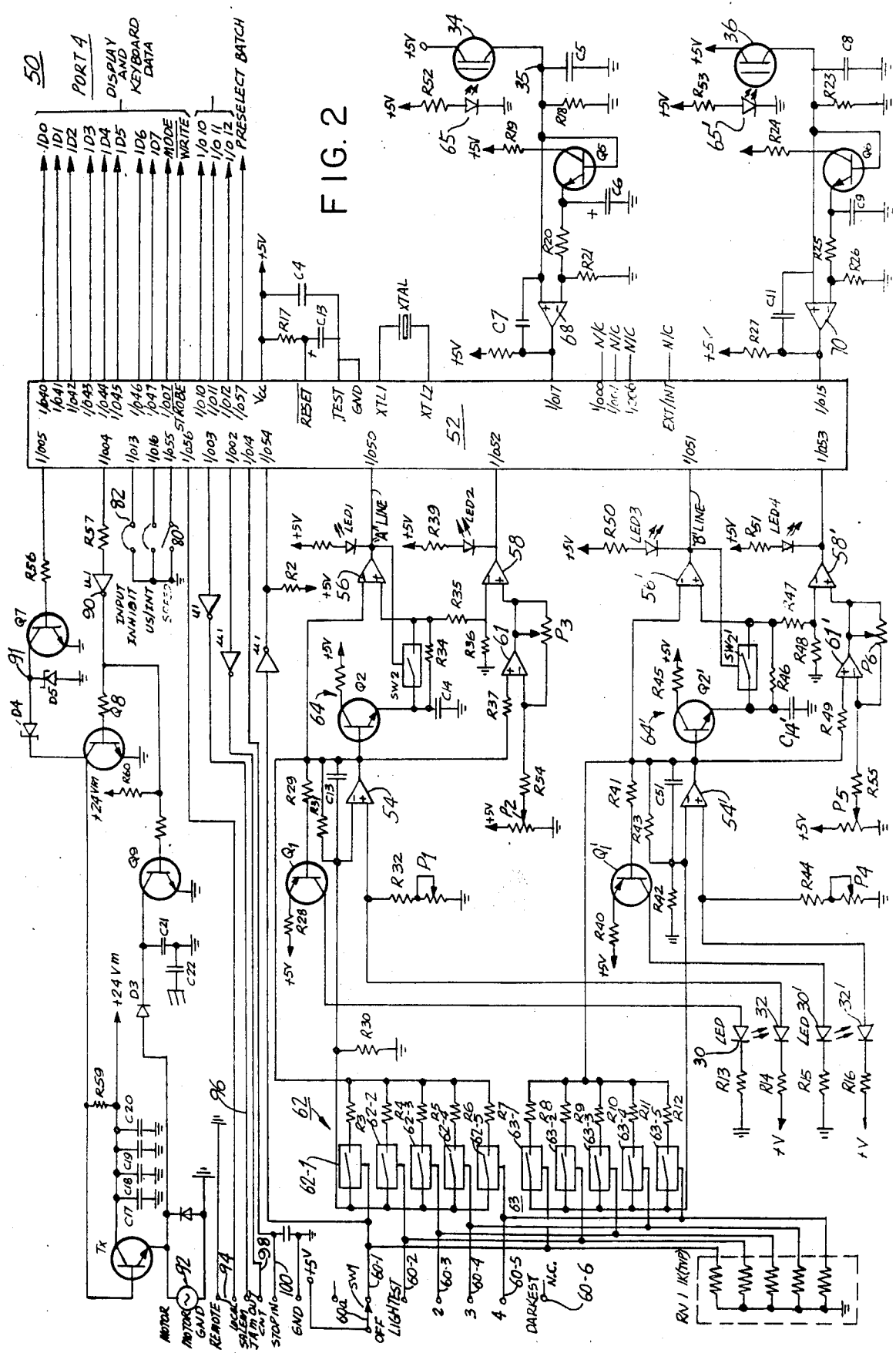
FIG. 2 shows a diagram of the electronic control system employed for controlling the apparatus of FIG. 1.
Figure 3:
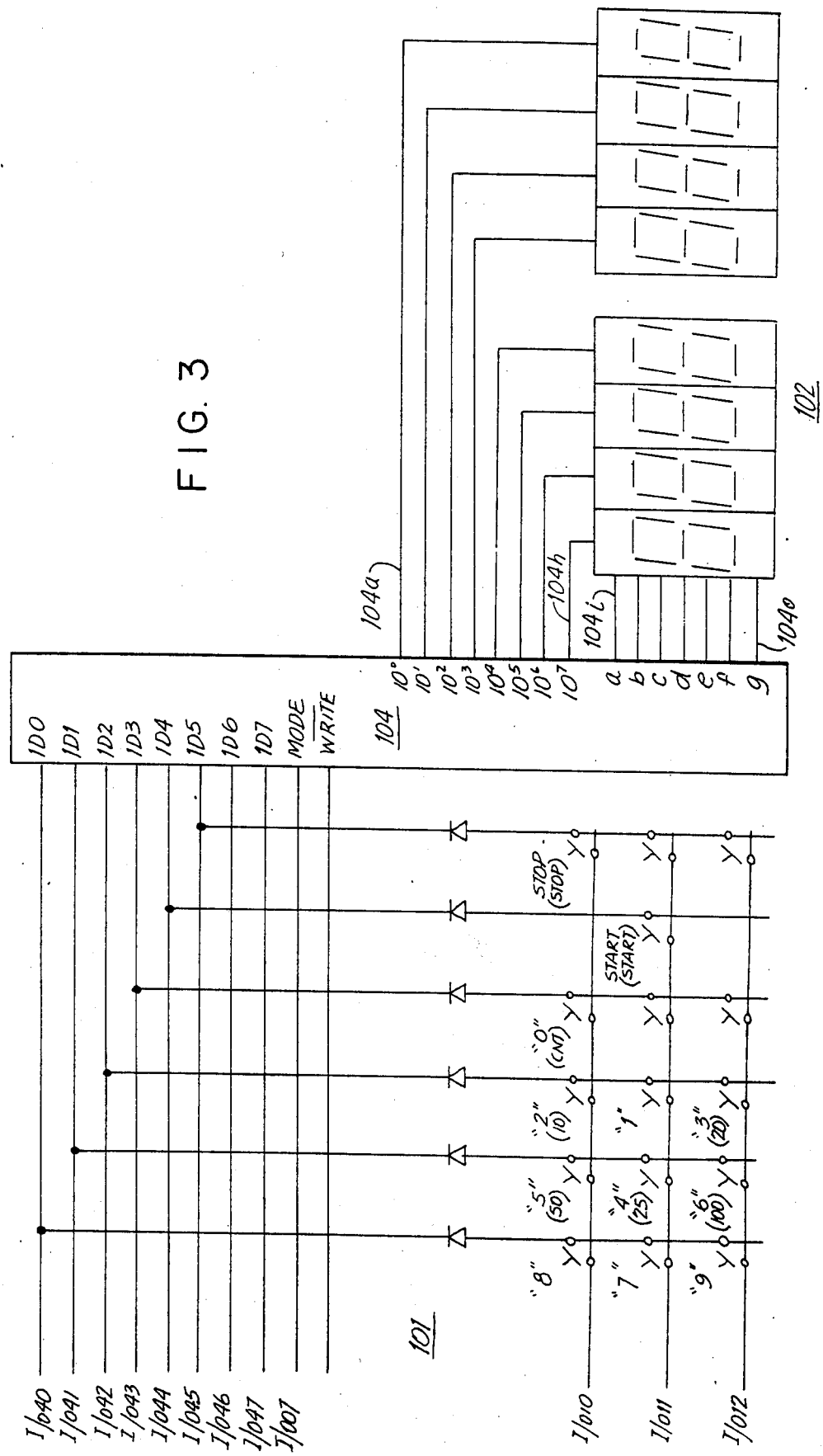
FIG. 3 is a schematic diagram of the keyboard and display means for used with the system of FIG. 2.

FIGS. 4, 5, 5a through 5d, 6a through 6d, 7a through 7e, 8a and 8b show flow diagrams indicating the manner in which the microprocessor employed in the system of FIGS. 2 and 3 controls the document handling and counting apparatus of FIG. 1 to achieve the unique capabilities of the present invention.

Figure 6A:
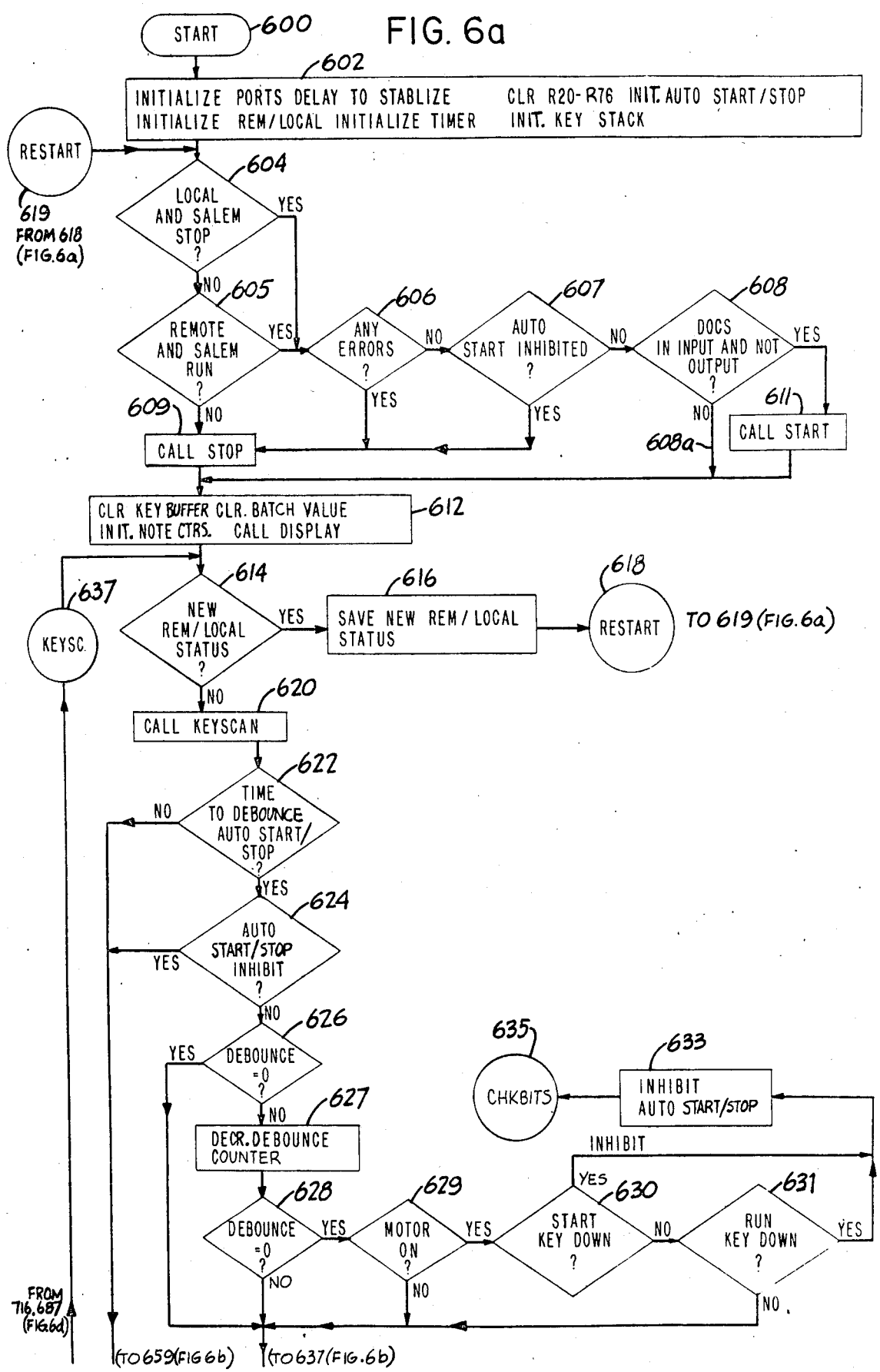

FIG. 6e shows the manner in which FIGS. 6a–6d are arranged.

Figure 7B:
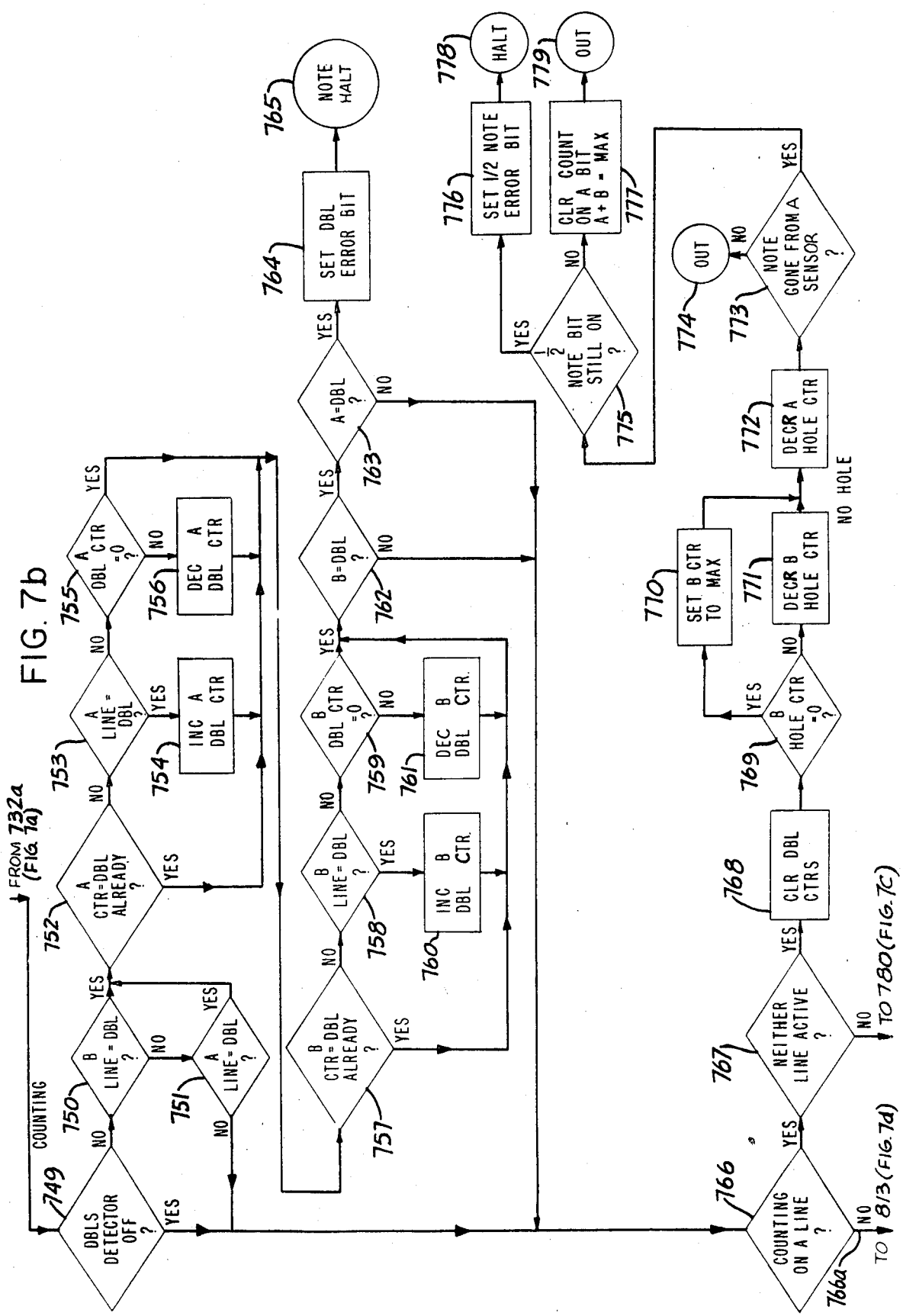

FIG. 7f shows the manner in which FIGS. 7a–7e are arranged.

DETAILED DESCRIPTION OF THE INVENTION

FIG. 1 shows a simplified view of the document handling and counting apparatus 10 with which the present invention is employed, a detailed showing and description of the apparatus 10 being contained in the aforementioned application Ser. No. 288,646. For purposes of understanding the present invention, it is sufficient to understand that the apparatus 10 receives a stack of sheets in input stacker (i.e. hopper) 12. The bottom sheet is advanced from input hopper 12 by picker wheel 14 and passes between a stationary stripper shoe 15 and a cooperating feed roller 16 rotatable about shaft 18. An idler roller (not shown) hidden behind feed roller 16 and rotatably mounted upon shaft 18, is rotated by acceleration roll 20. Single sheets fed between feed roller 16 and guide plate 22, due to the stripping action of stripper shoe 15, move into the nip formed by the idler roll and acceleration roll 20 and are rapidly accelerated toward an outfeed stacker 24 comprised of a fan assembly 26 and extendable stacker plate 28 for collection of sheets.

The accleration of sheets by accelerator roll 20 and its cooperating idler, forms a gap between adjacent sheets. The detection of the change in transmissivity between a gap and a sheet by light source 30 and cooperating light sensitive element 32 is utilized for counting purposes.

A sensor 34 and light source 65 are utilized to sense the presence of sheets in the input stacker 12 while a sensor 36 and light source 65' are utilized to sense the presence of sheets in the output stacker plate 28.

FIGS. 2 and 3 show the electronic circuitry 50 employed for controlling the document handling and counting apparatus 10 of FIG. 1. The control circuitry 50 comprises a microprocessor 52 which may, for example, be a model 3870 manufactured by Fairchild, Mostek and Standard Microsystems Corporation. Microprocessor 52 may have either 2,000 or 4,000 bytes of storage of the read-only-memory type and a scratch pad memory comprised of 64 bytes of random access memory storage all arranged on a single chip.

The sheet sensing means is comprised of a pair of light sources 30 and 30' arranged in side-by-side fashion, as shown in FIGS. 1, 1a, and 2 and cooperating with photodiodes 32, 32', which independently detect the transmissivity conditions at their respective locations, which conditions typically comprise the absence of sheets, the presence of a single sheet, and the presence of multiple sheets. The use of a pair of light sources 30, 30' and cooperating photodiodes 32, 32' permit the accurate counting of sheets in spite of the fact that sheets may be fed through the document handling and counting apparatus 10 in a skewed and/or overlapped fashion, as will be described in greater detail hereinbelow.

Each light source, 30, 30', which is preferably an infrared light emitting diode (LED), has its current controlled through a feedback circuit, to be more fully described. The photodiodes 32, 32' have their outputs coupled to operational amplifiers 54, 54' each of which amplifies the output of its photodiode and simultaneously couples the transmissivity signal to feedback transistors Q1, Q1', comparators 56, 56', comparators 58, 58', through amplifiers 61 and 61' respectively, and the transistors Q2, Q2' forming part of the self-compensating threshold circuits, to be more fully described.

The strength of the signal developed by each of the photodiodes 32, 32' is amplified by the operational amplifiers 54, 54' respectively. The amplification of each amplifier 54, 54' is a function of the input impedance, for example, resistors R30 and R42, and the feedback impedance, for example, resistors R31 and R43, respectively. The magnitude of the gain is manually adjustable by controlling the setting of switch SW1 between an OFF position 60-1 and four different brightness conditions 60-2 through 60-5. Switch arm 60a selectively controls the operation of one of the solid state switches 62-1 through 62-5 and 63-1 through 63-5 in the switch banks 62 and 63, to selectively couple one of the resistors R3 through R7 in parallel with feedback resistor R31 and, to selectively couple one of the resistors R8 through R12 in parallel with feedback resistor R43.

For example, assuming that it is desired to process brown ($1.00) food stamps, the switch arm 60-a is set to engage contact 60-4, closing switches 62-4 and 63-4 to place resistors R5 and R10 in parallel with resistors R31 and R43 respectively, thereby adjusting the gain of operational amplifiers 54, 54'. The resistors R3 through R7 and R8 through R12 have different resistivities to adjustably control the gain of the signal developed by the operational amplifiers 54 and 54'. The amplified signal is applied to the base electrodes of transistors Q1 and Q1' respectively, to control the emitter current for these transistors and thereby control the brightness of LEDs 30 and 30'.

The signals developed by photodiodes 32, 32' are also applied to the singles detection comparators 56, 56' and the doubles detection comparators 58, 58' (through the amplifiers, 61, 61' respectively). The outputs of the comparators 54, 54' are also applied to the self-adjusting threshold circuits 64, 64' as will be more fully described hereinbelow.

Each of the self-adjusting threshold circuits is comprised of a transistor Q2, Q2', and a capacitor C14, C14', coupled to each emitter electrode. Resistor R34-R36, R46-R48 respectively cooperate with capacitors, C14, C14' to develop a reference level across capacitors C14, C14', a portion of which is applied to the non-inverting input of comparators 56, 56'. The solid state switches SW2, SW2' which are coupled across resistors R34, R46 are normally open. These solid state switches are closed when comparators 56, 56' recognize the presence of the leading edge of a sheet passing their respective photodiodes 32, 32' and change state to apply a signal to solid state switches SW2, SW2' which short circuit resistors R34, R46 increasing the reference level of the non-inverting inputs of comparators 56, 56' thereby preventing any significant changes in transmissivity of the sheet being detected from being erroneously interpreted as a leading edge signal. As soon as the trailing edge of a sheet passes each light sensing element 32, 32', the output levels of comparators 56, 56' change to reopen solid state switches SW2, SW2'.

The outputs of comparators 56, 56' are also coupled to associated inputs of microprocessor 52 and are employed for counting purposes as well as evaluating the transmissivity of the sheets being processed.

The light sensing elements 32, 32' are coupled through operational amplifiers 54, 54' to the high gain amplifiers 61, 61' whose outputs are coupled to the non-inverting inputs of comparators 58, 58'. The amplifiers 61, 61' are normally driven into saturation in the presence of a signal level in the range normally encountered when single sheets are passing the sensors. When multiple sheets pass the sensors, the signals developed by the sensors are considerably reduced, causing the operational amplifiers 61, 61' to move out of saturation. The amplified signals of amplifiers 61, 61' are applied to the non-inverting inputs of comparators 58, 58' where they are compared against the reference level applied to the inverting input of comparators 58, 58', whose outputs are coupled to respective inputs of microprocessor 52 for processing. The outputs of comparators 58, 58' are utilized for detecting the presence of double or multiple fed sheets.

Potentiometers P1, P4, shown in FIG. 2, are utilized to compensate for differences in the operating characteristics of photodiodes 32, 32', coupled to the comparators 54, 54' respectively. Potentiometers P2, P3 are respectively provided to adjust the bias and gain of amplifier 61. Potentiometer P2 is adjusted to operate amplifier 61 at its upper saturation point. Potentiometers P5, P6 operate in a similar fashion to control the gain and operating level of amplifier 61'.

The sensors 34, 36, (see FIGS. 1 and 2) respectively located in the infeed hopper and outfeed stacker of the document handling and counting apparatus 10, cooperate with the LEDs 65, 65' to detect the presence of sheets to provide substantially automatic operation, as will be more fully described. Since both of these sensing circuits are substantially identical in design and operation, only one will be described herein for purposes of simplicity.

When no sheets are in the infeed stacker, capacitor C5 is charged by the current from phototransistor 34 and transistor Q5 is turned on, charging capacitor C6. The output at terminal 35 is now high. When sheets are inserted into the input tray 12, capacitor C5 discharges through R18 and the level at the non-inverting input of comparator 68, which is coupled to terminal 35, goes low, due to the significant reduction in light intensity of the light of LED 65, which is blocked from reaching phototransistor 34. At this time transistor Q5 is in cutoff and capacitor C6 normally discharges at a slower rate than capacitor C5, causing the output of comparator 68 to go low when the level at its non-inverting input drops below the level at its inverting input. This signal is applied to microprocessor 52, to indicate that sheets are present in the input tray. As soon as the input tray is empty, the level at terminal 35 goes high and, even though transistor Q5 conducts to charge capacitor C6, the voltage divider circuit comprised of resistors R20 and R21 applies a level to the non-inverting input which is lower than the level at terminal 35, causing the output of comparator 68 to go high.

If a large number of sheets are placed in the input tray, capacitor C6 discharges slowly over a longer period of time than the discharge of capacitor C5, whereby the stored voltage level across C6 may fall below the level at the non-inverting input of comparator 68, causing the output of comparator 68 to go high. Feedback capacitor C7 couples this high level to the base of Q5.

Feedback capacitor C7 thus resets transistor Q5 to recharge capacitor C6 when the output of comparator 68 goes high. Thus, there is a momentary pulse at the output of comparator 68 which terminates upon abrupt recharging of capacitor C6, i.e. when the voltage at the inverting input of comparator 68 is greater than the level at its non-inverting input. These momentary pulses ("glitches") appear at the output of comparator 68. In order that these pulses be ignored as indicative of the absence of documents, the microprocessor 52 is programmed to look at the output of comparator 68 over a predetermined time interval to be assured that the high level persists for a sufficient time interval.

The circuit components Q5, C6, R20 and R21, also comprise a drift adjustment circuit which automatically adjust for aging of the sensing circuit electrical components as well as the gradual accumulation of dust and dirt upon the LED 65 and/or phototransistor 34.

In order to be assured that the aforementioned "glitches" are not accepted by the microprocessor 52 as an indication of the absence of sheets, the circuitry of FIG. 2a may be used in place of the circuit described above.

FIG. 2a shows a circuit arrangement which may be substituted for the sensor circuit arrangements of FIG. 2 and which is designed to prevent the generation of erroneous document presence signals ("glitches") described above.

As shown in FIG. 2a, the alternative circuit arrangement 150 is comprised of an LED 152 cooperating with a phototransistor 154 whose emitter is coupled in common with the parallel coupled resistor and capacitor R1, C1, the non-inverting input of operational amplifier 155 and the non-inverting input of comparator 156. The output of operational amplifier 155 is coupled to the input of solid state switch 158, having a control input 158a for controlling the opening and closing of the sold state switch, which is shown in simplified fashion as having a mechanical switch arm 158b. The output of switch 158 is coupled to capacitor C2 and the non-inverting input of operational amplifier 160 which may be a type TL072 produced by Texas Instruments. Operational amplifier 155 may also be of the same type. The output of operational amplifier 160 is coupled to the voltage divider circuit R20, R21, whose common terminal is coupled to the inverting input of comparator 156 and to ground through capacitor C3.

In operation, when no sheets are present, lines 161 and 163 are high. The high level at output 161 is applied to the control input 158a of switch 158 to maintain the switch closed. Operational amplifier 155 charges capacitor C2 substantially instantaneously through closed switch 158. The level across capacitor C2 is coupled through operational amplifier 160, which has an input impedance of the order of $10^6$ Mohms, to resistors R20, R21. A voltage across R21 is developed across capacitor C3.

When sheets are placed in the input tray, the level across R1–C1 goes low, causing the output of comparator 156 to go low, thereby opening switch 158. The discharge path for capacitor C2 is through the $10^6$ Mohm input impedance of operational amplifier 160. Thus, capacitors C2, C3 discharge at an extremely slow rate, requiring of the order of one hour before being discharged, substantially preventing any erroneous sheet presence signal from being developed. Resistors R20, R21 and capacitor C3 function as a drift adjustment circuit in the same manner as resistors R20, R21 and capacitor C6, shown in FIG. 2.

Microprocessor 52, shown in FIG. 2, is utilized to control a motor control circuit, comprised of transistors Q7, Q8 and Q9, as well as transistor $T_x$. The control signal derived from microprocessor 52 is selectively applied to the base of Q7 to control transistor Q7. When the control signal is low, transistor Q7 is driven into cut-off placing a level at the base of $T_x$ which is the sum of the values across zener diodes D4 and D5 to operate motor 92 at normal speed. When the control signal is high, transistor Q7 conducts, grounding terminal 91, reducing the level at the base of $T_x$ to the value across zener diode D4, to operate motor 92 at one-third normal speed.

Transistor Q8 receives a control signal from the microprocessor 52 through inverter 90 to shunt the base of $T_x$ to ground, for controlling the current applied to motor 92. The signal applied to the base of transistor Q8 is also coupled to the base of transistor Q9, which is connected across motor 92 and serves to provide dynamic braking for motor 92. Diode D3 limits the magnitude of the current spike developed when regulator transistor $T_x$ and Q9 are both on momentarily. Motor 92, under control of microprocessor 52, is thus capable of being operated at normal speed, one-third normal speed or being deenergized and abruptly halted. Inverter 90 isolates the +24 VDC supplying the bases of Q8 and Q9 from terminal I/O 04.

As will be explained hereinbelow, microprocessor 52 automatically selects those values stored in its memory which relate to the operation of the apparatus 10 at normal speed. In the event that the apparatus 10 is operated at one-third normal speed, microprocessor 52, in addition to reducing the current to motor 92, selects those values stored in its memory which are related to operation of apparatus 10 at one-third normal speed.

The speed switch 80 is utilized to select the operating speed of motor 92. Jumper 82 is utilized to inhibit the signal from the input tray of the apparatus 10 to disable the automatic start capability of the apparatus, as will be more fully described.

The electronics shown in FIG. 2 may be utilized in combination with an accounting device (not shown) marketed by the assignee of this invention under the name SALEM and which is capable of developing the monetary totals of currency counted by apparatus 10. Switch 94 is operable to select remote or local operation, such that when switch 94 is open, microprocessor 52 operates independently and when switch 94 is closed, microprocessor 52 operates as a "slave" to the accounting system. Line 98 applies count pulses of the currency being counted from microprocessor 52 to the remote accounting apparatus for use in the accounting operation. LIne 96 is coupled to the accounting apparatus (hereinafter "SALEM") for advising SALEM that a jam has occurred. Line 100 couples SALEM to an associated input of microprocessor 52 to halt operation of the feed mechanism, controlled by microprocessor 52, pending the completion of an accounting operation which is still in process.

Microprocessor 52 scans the input keyboard 101 shown in FIG. 3 through the input/output lines I/O 40 through I/O 45 and is coupled to a digital display 102 through the input/output lines I/O 40 through I/O 47, the mode line I/O 07 and the STROBE line ($\overline{\text{WRITE}}$). The afforementioned lines are coupled to solid state circuit 104 which stores the incoming seven-segment character signals sequentially applied at outputs 104a through 104h and repetitively couples the segment selection signals appearing at outputs 104i through 104o to the proper digit position.

Solid state circuit 104 is a type 7218 manufactured by INTERSIL, and capable of receiving each byte of a character to be displayed in a segment code format storing eight such bytes and thereafter scanning and refreshing the display units of display 102, when the eight bytes have been transferred thereto.

The keyboard 100 is of a matrix type and is provided with a plurality of push-button type keys. The key set may be a "0" through "9" key set including function keys, namely a start key and a stop key. Alternatively, the keys (as shown in FIG. 3 in brackets) may be fixed amount batch keys for forming batches of 10, 20, 25, 50 and 100 sheets plus function keys including start, stop and count keys. The software is selected according to the key set being used. Input/output lines I/O 10 through I/O 12 are coupled to the horizontal matrix lines of the keyboard 101 and are examined by microprocessor 52 as each line I/O 40–I/O 45 is scanned. Dependent upon the numeric key or function key which has been closed, the signals will be coupled to one of the input/output lines I/O 10 through I/O 12. This provides a multiplexed utilization of the input/out lines, reducing the number of lines required for connection between keyboard 100 and microprocessor 52. The line of group I/O 40–I/O 45 is enabled and the line I/O 10–I/O 12 which returns the enabled condition, determine the code selected from a look-up table in the microprocessor 52, which look-up table is part of the ROM. Each register stores an eight bit byte. Seven of the eight bits represent an associated one of the segments of the seven-segment display. The eighth bit represents the decimal point. Each register is associated with one of the output lines I/O 40–I/O 45 and one of the return lines I/O 10–1/012. The byte selected from the look-up table is transferred to the display buffer (a register in microprocessor 52) for transfer to circuit 104 as will be more fully described.

Display 102 is operated in a multiplex fashion, wherein a byte representing the selected character segments is transferred to solid state circuit 104. When eight bytes have been transferred to circuit 104, circuit 104 is placed in the display mode whereby the characters are sequentially generated and the sequence is repeated a sufficient number of times at a sufficient repetition rate to cause the display 102 to appear, to the humen eye, to provide a "steady" illumination.

Figure 2B:
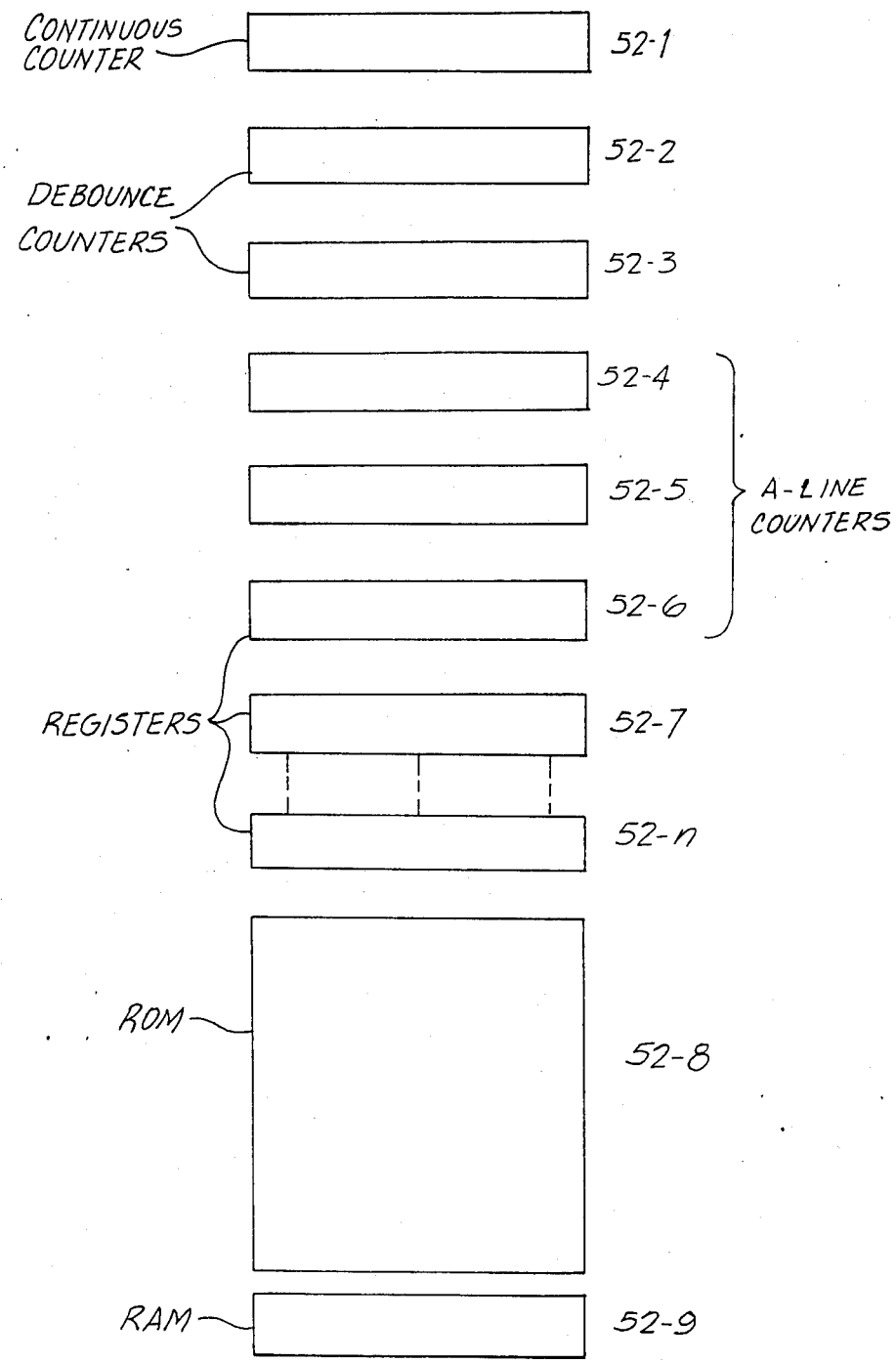
FIG. 2b is a simplified block diagram showing some of the circuitry forming an integral part of the microprocessor shown in FIG. 2.

FIG. 2b shows a simplified view of some of the contents of microprocessor 52 which, among other components, includes continuous counter 52-1, debounce counters 52-2 and 52-3, counters 52-4, 52-5 and 52-6 for storing counts representative of the presence of a single sheet (A counter) a hole within a sheet (A hole counter) and double feed sheet (A double counter). These counters are associated with the "A" line (see FIG. 2) which is coupled to light sensor 32. A similar set of three counters is also associated with the "B" line (FIG. 2), which is coupled to the light sensor 32'. The counters for the B line have been omitted merely for purposes of simplicity. It should be understood that these counters are substantially identical in design and function to counters 52-4 through 52-6.

The microprocessor 52 further includes at least one register 52-7 for storing flag and status bits, such as half-note, jam, local, remote, run, stop and continue conditions, as well as other conditions which will be more fully described hereinbelow. Similar registers serve as the keyboard buffer, and registers for storing addresses, as well as an accumulator. The 2000 byte read only memory (ROM) 52-8 stores the program routines to be described.

Microprocessor 52 further incorporates a 64 byte memory, such as for example, a random access memory (RAM). Some of these memory locations have been shown in simplified fashion as box 52-9 in FIG. 2a for storing data words and the like which are employed for control and/or display purposes for storing the table look-up information, and so forth. Each ROM address of the table look-up stores a byte representing the segments of an associated one of the numbers or alphabetic characters capable of being displayed by the display 102. What is going out of port 4 (i.e. out of the I/O lines 40 through 47) and what is coming into port 10 (i.e. one of the I/O lines 10 through 12) identifies a specific location in ROM.

FIGS. 3a through 3s shown a variety of different conditions which may occur in the feeding and handling of sheets, (i.e. notes or paper currency), which conditions are capable of being recognized by the system of the present invention. As was described hereinabove, the sensors 32, 32' are capable of sensing basically three different intensity ranges, namely a high intensity range during which no sheets are present between each LED (30, 30') and its cooperating light sensing element (32, 32') or during which time a hole or opening in a sheet is arranged between each LED and its light sensing element. The medium light intensity range is present when the light intensity is reduced due to the passage of a single sheet between the LEDs 32, 32' and light sources 30, 30'. It should be understood that the actual transmissivity is a function of the condition of the bill (i.e., clean or dirty) and is also a function of the ink density of the portion of the bill passing between the LEDs and light sources and hence constitutes a range of intermediate light intensity. The third low light intensity range is that which occurs when two (or more) sheets are passing between the LEDs and light sources wherein, assuming, for example, that all of the bills are in the same condition and have the same transmissivity, the light intensity picked up by the light sensitive elements 32, 32' during the presence of two sheets will be approximately one-half the intensity sensed by sensors 32, 32' when a single sheet is passing between the LEDs and the light sources.

Under normal conditions, detection of an abrupt change in light intensity from the upper range to the intermediate or lower range is indicative of the fact that a leading edge is passing between the LEDs and light sources. At this time, the A and B counters are set to a maximum count, as will be more fully described. In one preferred embodiment, this count is a count of 90. The sensor elements are examined every millisecond (when operating at normal speed) to examine their state. A change in light intensity from the high range to the mid range detects the leading edge of a sheet. When the mid range condition is present, the counter for their particular sensor is decremented by one count each millisecond, i.e. from 90 to 89, from 89 to 88, and so forth.

In accordance with the criteria established in one preferred embodiment, the presence of a medium range intensity signal during three consecutive samplings of a sensor is detected as the presence of a sheet, despite the fact that the sensor level of each signal continues to be examined during the presence of a note beyond the count of 87.

The feed rate of notes in the preferred embodiment is such that the A and B counters will be decremented by 25 counts, since it takes about 25 milliseconds for a bill to pass the sensor, given that the standard width of a bill (measured in the feed direction) is 66 millimeters, the paper note is being fed at the rate of 26.4 meters per second, or better than 1000 inches per second.

As further criteria in the preferred embodiment, if the A or B line counters are decremented to a zero count, i.e. if the single sheet condition is present during ninety consecutive samplings, which is more than 3.6 times the time normally required for a single bill to pass the light sensors, this criteria gives each single bill more than sufficient time within which to move through the sensing location. Hence, a count of zero (i.e. an accumulated count of 90) is interpreted as a jam condition.

The hole counters are each capable of accumulating at least a count of 5 and are operated as up/down counters which are incremented during the presence of a hole or gap and which are decremented during the presence of either a single fed sheet or double fed sheet condition, with the only other proviso being that no decrementing takes place if the counter has already been decremented to a zero count. In the preferred embodiment, when the hole counter reaches a count of 5, it is interpreted as a gap between adjacent sheets.

The doubles counters for each sensor 32, 32' are operated in a manner similar to the single note counters, in that they are initially set to a maximum count and, whenever a low range light intensity is detected, indicating the presence of a double feed condition, the double counter associated with that sensor is decremented unless it has already reached a zero count. When a hole condition is present, the double counter is reset to maximum. In the preferred embodiment described herein, it is assumed that a double fed condition is present if the double counter accumulates at least five counts. Thus, when set to a maximum count of 5, a double feed condition is present when the double counter has been decremented to zero.

Considering the variety of possible conditions, which may occur during document handling and counting and as are shown in FIGS. 3a through 3r, the manner in which these conditions are identified as follows:

FIG. 3a shows an arrangement wherein sheets S, S' are moving in the feed direction, as represented by arrow F. Imaginary lines A and B represent the lines along which the sensor elements 32, 32' lie. In the example shown in FIG. 3a, this represents the normal counting condition. When the leading edge LE passes the sensors in the A and B lines, their A and B line counters begin decrementing. When they are decremented to a count of 87, a count pulse is generated. The counters continue to be decremented. Under normal feed conditions, the trailing edge TE of sheet S will pass beyond the sensors before the A and B line counters are decremented to zero. A sufficient number of hole conditions (5) will occur between the trailing edge TE of sheet S and the leading edge LE of sheet S' to have this condition interpreted as a gap between two adjacent sheets. When the A and B hole counters are decremented to zero, the A and B counters are reset to the maximum count. When the leading edge of sheet S' covers the A and B line sensors, the A and B line counters are decremented once every millisecond.

FIG. 3b shows an arrangement in which sheets S, S' are fed in a slightly overlapped fashion, so that the overlapped (shaded) region $R_O$ will cause the accumulation of several counts in the double counter for each of the A and B lines. The apparatus 10 will generate a "long" count when the sensors 32, 32' are covered for a period necessary to move almost four (4) overlapped bills past sensors 32, 32'.

Considering FIG. 3c, the overlapping of sheets S and S' (the region Ro), which can be seen to be significantly greater than the overlap in FIG. 3b, will cause the accumulation of at least five counts in both the A and B line double counters, which causes a setting of a double error bit, which is followed by a jump to the NOTE HALT routine, as will be described hereinbelow in connection with FIG. 8a. The NOTE HALT routine identifies the nature of the error and thereafter returns to the main program.

Considering the example of FIG. 3d, wherein sheets S, S' are fed in a skewed fashion, it can be seen that the sheets partially overlap in the region of the B line sensor, as represented by the shaded area $R_O$. The gap between the trailing edge TE of sheet S and the leading edge LE of sheet S' is detected by the A line sensor and is of a length sufficient to be interpreted as a gap between sheets. The A line counter is reset to maximum as soon as the hole counter is decremented to zero and thereafter begins decrementing as soon as the leading edge LE of sheet S' covers the A line sensor.

The critiera established in the preferred embodiment described herein is such that a double condition is not considered to be present unless both the A line and B line double counters accumulate a count of at least five or more. Thus, sheets S, S' will each be counted as one sheet, despite the fact that the overlapping region $R_O$ causes the B line double counter to accumulate eight pulses.

FIG. 3e shows a possible feed condition wherein sheets S, S' are fed in a skewed fashion and wherein the gap between the trailing edge TE of sheet S and the leading edge LE of sheet S' is sufficient in the region of the imaginary lines to cause both the A line and B line hole counters to accumulate a count of 5, Thus, both sheets S, S' will be counted, despite the fact that they are skewed when fed through the sensor location. The B line counter will stop counting before the A line counter, due to the skewed alignment of sheet S. The B line hole counter will begin to count holes before the A line hole counter. In addition, the sheet will be counted as soon as the B line counter is reduced to a count of 87. When this happens, the A line counter is reduced to a count of 86 to prevent the A line counter from generating an erroneous count which would cause sheet S to be counted as two sheets.

When the A line hole counter reaches a count of 5, this is interpreted as a gap between sheets S and S' and the A line counter is immediately reset to maximum count. The A line counter and hole counter operate in a similar but, delayed fashion relative to the B line counter due to the skewed alignment of sheets S, S'.

The possible feed condition shown in FIG. 3f is substantially identical to that shown in FIG. 3d, except that the overlapped (shaded) region $R_O$ passes beneath the A line sensor, while the gap region between sheets S, S' passes beneath the B line sensor. The result of evaluation of the condition shown in FIG. 3f will be the proper counting of sheets S and S'.

In the embodiment shown in FIG. 3g, the A line double counter accumulates double counts representative of the overlapped (shaded region) $R_O$, whereas the B line hole counter accumulates less than 4 counts due to the small gap spacing G between the trailing edge TE of sheet S and the leading edge LE of sheet S'. Thus, the count in the B line hole counter will be interpreted as a "hole" in a sheet, as opposed to a gap between sheets and the passage of sheets S, S' will be interpreted as the passage of one sheet since the passage of two overlapped sheets is insufficient to generate a "long" count in the A and B line counters.

In the feed condition shown in FIG. 3h, the passage of a single sheet S, beneath only one of the sensors, develops a half note error condition. This is accomplished by setting a half-note bit when neither the A and B lines are covered and resetting the half-note bit only if both lines are covered. When at least one of the A and B line hole counters have decremented to zero (5 counts after the leading edge of half sheet S), the half-note bit is examined. Since it is still set, this condition is interpreted as a half-note error. When the A and B line sensors are covered, the half-note bit is reset to prevent the interpretation of the presence of a half-note when both A and B lines are covered and their counters have started decrementing.

In the feed condition shown in FIG. 3i, sheet S is counted as one sheet, despite the fact that the doubles (shaded) region $R_O$ passes beneath the A line sensor and causes double pulses to be accumulated in the A line double counter. The sheet S is interpreted as one sheet and not as a double feed since the criteria of the preferred embodiment requires that both the A and B line double counters reach the zero count.

In the feed condition shown in FIG. 3j, wherein the half note S overlaps the left-hand portion of note S', this condition is interpreted as the passage of a single note, since, as was set forth hereinabove, a doubles error is present only when both the A and B line double counters accumulate at least five counts.

In the feed condition shown in FIG. 3k, due to the small gap G in the region between half notes S and normal note S', the B line hole counter is prevented from accumulating at least five counts. Thus, the count will be interpreted as a "hole" within a document and the resultant count in the B line single sheet counter will indicate the presence of one document.

Considering the feed condition of FIG. 3l, although the half note S overlaps the following normal size note S' by an amount sufficient to accumulate five counts in the doubles counter, none of the overlapping (shaded) region $R_O$ passes beneath the A line sensor, and only a small portion of the overlapping region passes the B line sensor. Therefore, the condition shown in FIG. 3l will result in the count of one note.

The feed condition in FIG. 3m causes the A line hole counter to develop a count of 5 if the hole H is long enough to cause sheet S to be counted as two sheets. If the hole H is small enough to cause the A line hole counter to develop a count of less than 5, the sheet would be counted as only one sheet. The operation is the same if there are holes (H and H') passing both sensors. Holes not lined up with the sensor lines A and B are not detectable.

The examples given in FIGS. 3n and 3o, indicate that a portion of the sheet in each figure is folded over, or has a piece of opaque material or tape affixed thereto. If the shaded region $R_O$, at the trailing edge TE in FIG. 3n, or at the leading edge LE of FIG. 3o, causes the accumulation of at least five pulses in both the A line and B line double counters, the condition shown in FIGS. 3n and 3o indicates the presence of a double feed error.

In the example of FIG. 3n, in accordance with the criteria of the preferred embodiment, the double counters cannot be reset until both the A and B line sensors are uncovered. Thus, the double count of the B line double counter is retained until the A line double count reaches the doubles count or until the A line sensor is uncovered (i.e. senses a gap). Thus, only if both the B and A line doubles counters reach a count of 5, the sheet S will be interpreted as a double.

In the example of FIG. 3o, the doubles condition will also be detected as soon as the A line sensor provides 5 pulses to the A line double counter (the A line double counter reaches the count of 5 later than the B line double counter, since the sheet S is slightly skewed).

In the feed condition shown in FIG. 3p, edge E2 passes beyond the B line sensor before edge E3 moves beneath the A line sensor, resulting in the detection of a half note error. This condition will only be avoided if edge E3 passes beneath the A line sensor before edge E2 passes beyond the B line sensor. Thus, extremely skewed notes will be interpreted as a half note error condition in the example shown in FIG. 3p.

In the example of FIG. 3q, edge $E_1$ of sheet S passes the B line sensor. However, edge $E_1'$ of sheet S' passes the B line sensor before a note count is accumulated. The B line double counter begins to accumulate double counts. Even though the B line double counter reaches a double count, the A line double count does not.

When the trailing edge TE of sheet S passes the B line sensor, the B line double counter is decremented. By the time the leading edge LE of sheet S' begins to pass the A line sensor, the B line double counter may be below the count of 5 (depending on the length of the shaded region passing the B line sensor). The A line sensor does not see the double condition. Thus, this condition will not be interpreted as a double condition but will be counted as one sheet. However, if the A line double counter were to reach a count of 5 when the B line double counter contains a count of 5, this will yield a double error condition.

In the example given in FIG. 3r, this condition will provide a count of two sheets, since the A line sensor, when uncovered, resets the A line counter when the A line hole counter reaches a count of five (5).

Figure 5:
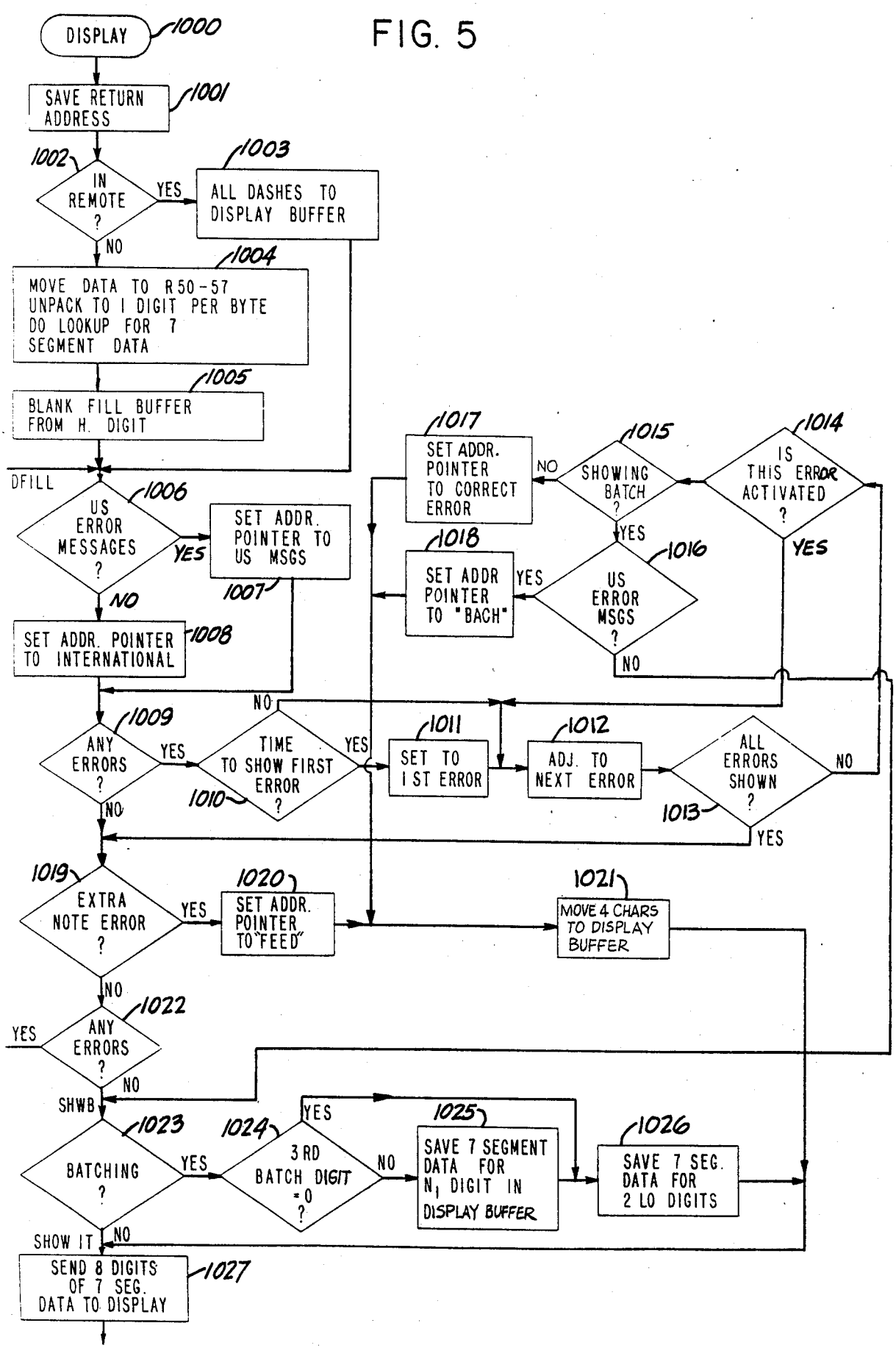

Turning now to a consideration of the control of apparatus 10 by microprocessor 52 and considering FIGS. 6a through 6d, the turn on of the apparatus 10 initiates the start of the program at 600, in which, at program step 602, the microprocessor 52 ports, remote/local, timer, key stack, and automatic start/stop conditions are all initialized. Registers R20 through R76 of the scratch pad memory are cleared and a delay is imposed for a length of time sufficient to allow the power supplies to stabilize before normal operation begins. The local/remote and SALEM stop/run conditions are examined at 604. If the remote and SALEM run conditions are present, the run condition of the SALEM (i.e., the remote accounting device) is examined at 605. If no run condition is detected, or an error is present (606) or the auto-start is inhibited (608), the STOP routine is called at 609. The STOP routine is shown in FIG. 5b and sets the stop bit, allows a delay before stopping the motor and then returns to program step 612. In the event that either the local mode or SALEM run and remote conditions are present, microprocessor 52 examines for the presence of error conditions (stored in a memory register) at 606, for the presence of an an auto start inhibit condition (jumper 82 in FIG. 2) at 607, and examines to determine if documents are present in the input and not in the output. If no documents are present in the input, the program branches at 608a to step 612. If documents are present in the input and not the output, the START routine is called at program step 611. The START routine is shown in FIG. 5c and starts up the apparatus 10 as will be more fully described. The program then returns to the routine shown in FIG. 6a to step 612 to clear the key buffer which stores the previously inputted key code; to clear the batch value, to call the DISPLAY routine and to initialize the note counters. The DISPLAY routine which is shown in FIG. 5 and will be described below, clears and updates the display 102 and returns to step 614. At program step 614, the local/remote status is again examined. If a new local/remote status is detected at 614, this status is saved (in memory) at 616 and the program branches back through RESTART 618 to program step 604 through RESTART 619.

If the remote/local status is not changed, the KEY SCAN routine is called at 620.

Figure 4:
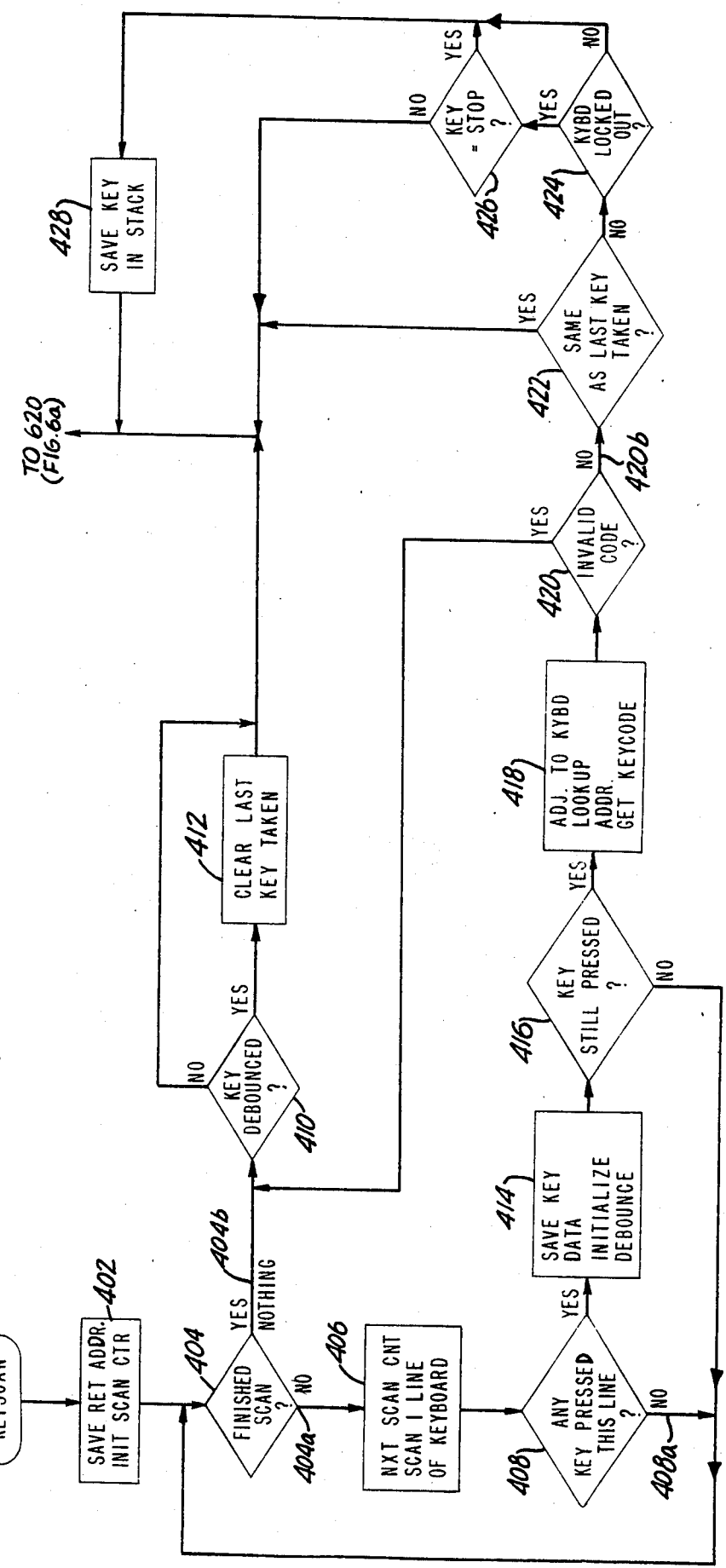

The KEY SCAN routine is shown in FIG. 4. At program step 402 the return address of the program is retained in a register in microprocessor 52 and the keyboard scan counter is initialzed. If the scan has not been completed (step 404) the scan count is increased. In the event that the scan is completed, the key debounce counter of microprocessor 52 is examined. If the debounce counter has not counted out the program returns to step 622 (FIG. 6a). If the debounce counter has counted out (410), the register in memory storing the last key condition is cleared and replaced by an invalid code (412). The program then returns to step 622 (FIG. 6a).

Returning to step 404, if the scan count has not been completed, the scan count is incremented at 406 and the next line to the keyboard associated therewith is scanned. At 408 the return lines are examined for any depressed keys. In the event that no keys are depressed, the program recycles to step 404 until the scan is complete.

If any key is depressed, the key data is stored at step 414 and the debouncing routine is initialized. During the debouncing routine, a counter is set and is decremented. When the counter reaches zero the debounce interval is completed. In the event that the key is no longer depressed, which condition is examined at step 416, the program recycles back to step 404. In the event that the key is still depressed, the program advances to step 418 to determine the key code based upon the out and return line representing the key closure. This is accomplished in a look-up table. The code is examined at step 420. If the code is invalid, then the debounce counter is decremented at step 410. If not debounced, the program returns to step 622 in FIG. 6*a*. If debounced, the key code stored is cleared at 412 and replaced with an invalid code and the program jumps back to step 622, shown in FIG. 6*a*. In the event that the code is not invalid, the program branches at 420*b* to step 422 to determine if the code is the same as the last key taken (and stored at 414). In the event that the answer is yes, the program resumes at step 622; in the event that the key is different from the last key taken, the program, at step 424, examines to see if the keyboard is still locked out. The lock-out condition prevents keys accidentally operated from being acted upon during a normal counting operation. The only key which will be honored during a counting operation is the STOP key (FIG. 3). In the event that the keyboard is not locked out, the key condition is saved in the key stack (428). In the event that the keyboard is still locked out, if the Stop key has been pressed, this condition is saved in the key stack at 428 and operation resumes at program step 622. In the event that the Stop key has not been depressed, the program returns to step 622.

At step 622 (FIG. 6*a*), if the key entry indicates the apparatus 10 should be turned on, the automatic start/stop counter is reset. If no key has been taken to start the machine, the program jumps to step 659, shown in FIG. 6*b*, to examine the condition responsible for preventing the running of the apparatus 10, as will be described hereinbelow. If the automatic stop/start operating interval is initiated, the program advances to step 624 to examine the jumper 82 connection to determine if the automatic start inhibit condition has been selected or disabled. If the automatic start/stop operation has not been inhibited, the program advances to step 626. If the jumper 82 has been coupled (see FIG. 2), the program advances to step 659.

At program step 626 the debounce counter is examined. If the debounce count has not reached zero, the debounce counter is decremented at step 627. The debounce counter is again examined at program step 628. If the debounce count is not zero, the input hopper sensor 34 is examined at step 637 (FIG. 6*b*) to determine if a change has occurred. If the debounce count has reached zero, the program advances to program step 629 to determine the state of the motor 92. If the motor is not on, the program advances to step 637 to determine if there has been an input hopper sensor change. If the motor is on, the keyboard is examined at step 630 to determine if the start key has been depressed. If neither the start key, nor the run key have been depressed for two seconds, (examined at step 631), the program advances to step 637. If either the start or run key has been operated after two seconds, the automatic stop is inhibited at step 633 and the program jumps to step 659 (FIG. 6*b*) from step 635. This permits the machine to be examined with the motor running. This condition is terminated by depressing the stop key or by running a sheet through the machine.

Figure 6B:
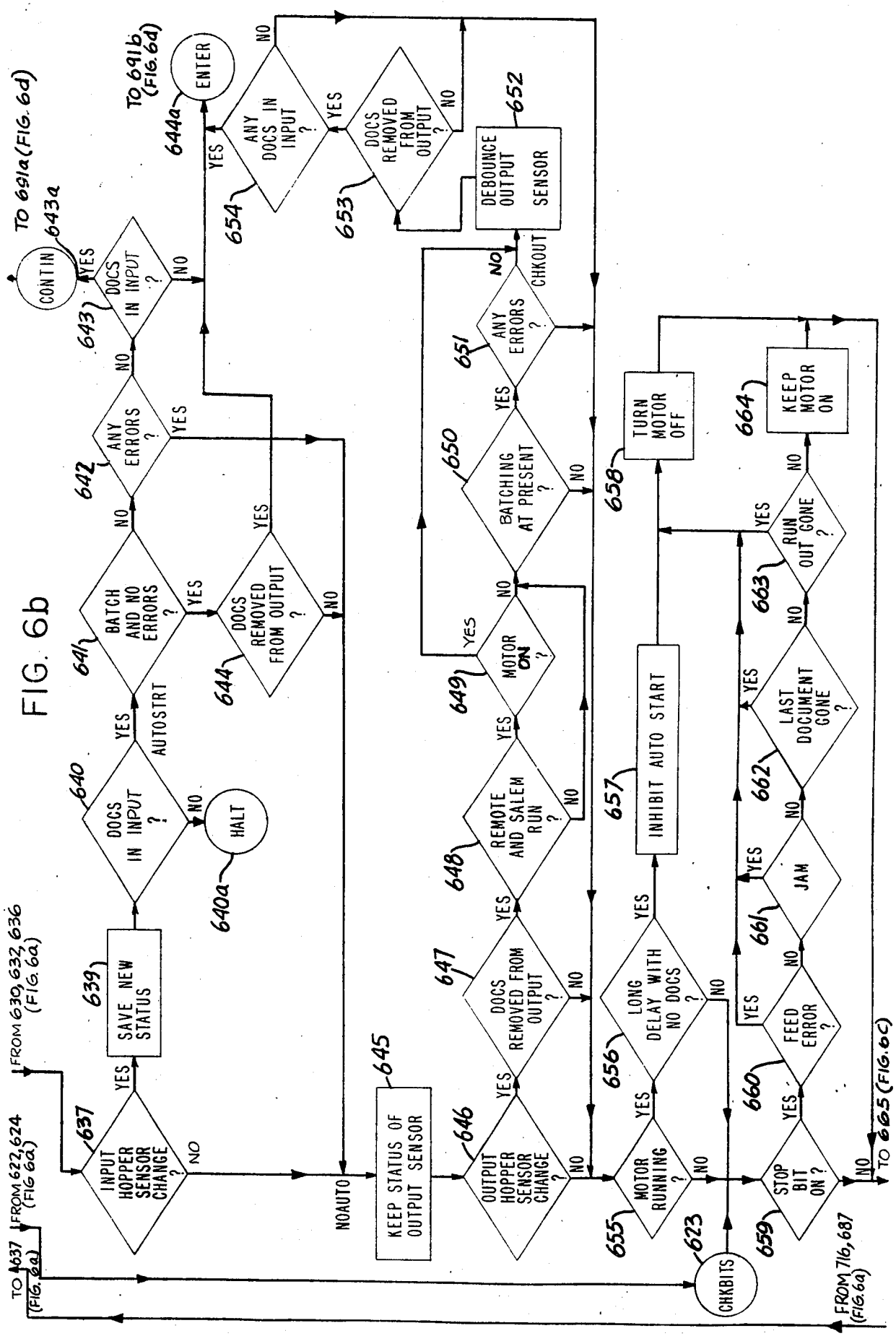

Turning to FIG. 6*b*, the input hopper sensor 34 is examined at 637 to see if any change has occurred. If any change has occurred, its new status is stored in memory at 639. The input stack sensor 34 is examined to see if notes are present at 640. If no notes are present, the operation is halted at 640*a*. If notes are present in the input, the apparatus is examined at 641 to determine if a batch has been completed (by comparing the batch count against the number of notes counted) and that there are no errors in the batch count. At step 644 the output stacker sensor 36 is examined to determine if notes have been removed from the output. If so, the program jumps to the ENTER step 644*a* to return the program to step 691*b*–FIG. 6*d*. If the notes have not been removed from the output, the program advances to step 645.

In the event that the batch has not been completed, the program branches to step 642 to determine if any errors are present. If errors are present, the program advances to step 645. If no errors are present, the program advances to step 643 to determine if there are any documents in the input and, if so, the program branches at 643*a* and advances to the continue step 691*a* in FIG. 6*d*.

As was mentioned hereinabove, if there has been either no input hopper sensor change, or if documents have not been removed from the output, or if any errors are present, the status of the output sensor is retained at step 645. The output hopper sensor 36 is again examined for a change at step 646. If notes are removed from the output stacker 28 when examined at step 647, the program advances to step 648 to determine if the apparatus is presently in the remote status and the SALEM is in the run state. If the answer is negative, the program advances to step 650 to determine if the apparatus 10 is in the batching mode. If the apparatus 10 is in the remote status and the SALEM is running, the motor 92 is examined at 649. If the motor is off, the apparatus is examined at step 650 to determine if the batching mode is present. If the motor is on, the debounce subroutine is initiated at step 652 for debouncing the output sensor 36 to prevent the motor 92 from being turned off for a delay period equal to the time required to count out the debounce counter.

If the apparatus is in the batching mode and any errors are present, the program advances to step 655. If no errors are present, the debounce subroutine is initiated at step 652 and advances to step 653. At step 653, the output sensor 36 is examined to determine if notes have been removed from the output stacker 28. If notes have not been removed from the output, the program advances to step 655. If notes have been removed from the output, and no notes are in the input, the program advances to step 655. However, if there are notes in the input, the program advances to step 644*a* and thereafter to step 691*b* of FIG. 6*d* to initiate the auto start, as will be described hereinbelow.

At program step 655, the motor is examined to determine its operating state. If the motor is running and there has been a long delay, during which no notes have been seen by the A and B counter sensors (step 656), the auto start condition is inhibited at 657 and the motor is turned off at 658. The program then advances to step 665.

In the event that the motor is found to be turned off at program step 655, the program searches for the cause of motor turn-off. At step 659, the stop bit is examined. If the stop bit is off, the program advances to step 665. If the stop bit is on, the program at steps 660–663 determines the cause of the stop, namely a feed error, jam, passage of the last note, or termination of the run out. If any of these conditions is present, the motor is turned off at step 658 and the program advances to step 665. If none of these conditions is present, the motor is maintained on and the program advances to step 665 (FIG.

6c). In the event that it is not yet time to decrement the counters, the program advances to step 671.

At step 665, an eight-bit counter which is continuously decremented at a predetermined rate, is examined. When the time to decrement has arrived, the counter is decremented at 666. At a predetermined count, the display is presented. When this count occurs (step 667) the DISPLAY routine is called at 668. If the count is not present, the program branches at 667a to examine the continuous counter. If the count is zero, the program advances to step 671. If the count is not zero, the keyboard lockout counter is decremented. The keyboard lockout counter is set each time the leading edge of a bill is detected and provides a delay interval during which every keyboard entry except for the stop key is ignored. The program then advances to step 671.

If the apparatus is in the local mode (step 671) and the motor 92 is on (step 675), the program advances to step 677. If the apparatus 10 is not in the local mode, the remote display is examined to determine if dashes are present at 672. If dashes are present in the remote display, the program advances to step 675. If not, the batch counter is cleared at 673 and the DISPLAY routine is called at 674 for providing dashes in the display 102. The DISPLAY routine is shown in FIG. 5 and will be described in detail hereinbelow.

As was mentioned hereinabove, the condition of the motor 92 is examined at step 675. If the motor is on, the NOTE POLL routine is called at step 676. If the motor if off, the program (at 677) determines if any notes detected by the NOTE POLL routine are present to be counted.

The NOTE POLL routine takes priority over the DISPLAY routine and tracks notes, regardless of whether the count is displayed, at the rate at which notes are tracked. As a result, a count of one or more notes may be accumulated at step 677 before the count in display 102 is updated. If there is at least one note to be counted, the accumulated count is decremented at 678. If it is the first note of the count, the remember note bit is reset and the key buffer is cleared (step 680). If it is not the first note, one count is added to the K (count) buffer used to store the accumulated count at 681. The DISPLAY routine is called at 682.

If the apparatus is not in the batch mode, i.e. if the batch value is zero, the program advances to step 687 (FIG. 6d).

If the batch value is other than zero, the program step 684 looks to see if a batch has been completed. If so, the STOP routine is called and the batch bit is set at 685, the STOP BATCH routine (to be described below in connection with FIG. 5d) is performed at 685a, and the DISPLAY routine is called at 686 to generate an eight digit display "BACH XXXX". Thereafter, the program advances to step 687 (FIG. 6d). The apparatus 10 remains halted until the completed batch of sheets is removed from the output stacker 28 (FIG. 1).

Assuming that key conditions have been entered into the key stack and remain to be carried out, they are removed at step 688 (FIG. 6d) and examined, starting with step 689 which looks for the presence of a control key. If a control key is present in the key stack, during the program steps 690, 698 and 699, the key stack is examined to determine the presence of either a run, stop or continue key condition. In the event that the run condition is present, and notes are in the output stacker (step 691), the program branches at 691a to step 700. If no notes are present in the output, the program branches at step 691b to step 693, in which the auto start counter is initialized to just starting. If there is a key board entry, the START program (FIG. 5c) is called at 696. If not, the new batch value is stored at 695 and the START subroutine is thereafter called at 696. At program step 697 the K (count) buffer and error conditions are cleared and the one-half note and enter bits are set, then the program advances to step 716 at which step the DISPLAY subroutine is called. In the event that the Stop key has been operated, which condition is examined at step 698 and causes the auto start to be inhibited and the run out (of notes) to be eliminated at step 704 and causes a halt at 704a.

If the CONTINUE key has not been operated, which condition is examined at step 699, the program advances to step 693 which was described hereinabove. If the CONTINUE key has been operated, the program searches for a remote entry at step 700. If there is no remote entry at step 700, no keyboard entry at 701, no feed error at 702 and a batch count has not been reached, the auto start is initialized to the just starting condition at 705, the start routine is called at 706 and the error bits are cleared, whereupon the program advances to step 716 to call the DISPLAY routine. If any of the conditions of keyboard entry, feed error or batch completion has been detected at program steps 701-703, respectively, the auto start delay counter is initialized to the just started condition at step 693, as was described hereinabove.

If no control keys are present and the apparatus is operating in the remote mode, the DISPLAY routine is called at 716 from program step 707. If the apparatus 10 is not in the remote mode, the program branches at 707a to step 708 which clears any errors stored and clears the batch value. The keyboard is examined at 709 to determine if a present batch is present. If so, the new batch value is stored at step 712 and the DISPLAY routine is called at 716. If the keyboard is not set at a present batch and the first digit is present, the keyboard buffer is cleared at 713. If the first digit is not present, the program branches at 710a to determine if there is room for a digit at step 711. If the digit is the first digit, the key buffer is cleared, the DISPLAY routine is called at 716. If so, the digit is saved and the keybuffer entry bit is reset at 714 and the STOP subroutine is called at 715. The keybuffer enter bit identifies the fact that the first digit has been entered. This is examined at step 710.

The NOTE POLL routine is shown in FIGS. 7a-7e and is called at step 676 (FIG. 6c) after all of the desired keyboard inputs have been entered and examined and indicates that counting can proceed.

The NOTE POLL subroutine is initiated at step 720 in FIG. 7a. Noting FIG. 1a, each sheet S of paper currency is advanced through the apparatus 10, shown in FIG. 1, in the direction shown by arrow A and is arranged to pass between the sensors 32, 32' and the associated LEDs 30, 30'. The presence of gaps between sheets indicated by light of substantially maximum intensity, while the movement of a note (whether single, double or multiple fed) is indicated by significant drop in the intensity of light reaching sensors 32, 32', which dropp in intensity is a function of the transmissivity of each sheet and the number of sheets moving between the light sources 30, 30' and the associated light sensing elements 32, 32'. Each sensor 32, 32' is associated with three counters, single, double and hole, in microprocessor 52, sensor 32 being associated with counters "A" and sensor 32' being associated with single, double and hole counters "B". When a sheet is passing between the light source 30 and cooperating light sensing element 32 associated with the counter, pulses are applied to the counter. If ninety or more counts are accumulated, the document is identified as being "long". Pulses are applied to the counters at a rate of one every millisecond when counting at normal speed and a rate of one every three milliseconds when counting at one-third normal speed. In the preferred embodiment, the A and B counters are set to a maximum value (i.e. 90) and are decremented toward zero. The occurrence of three successive counts (i.e. a count of 87) is interpreted as the presence of a note.

The occurrence of five successive hole counts is interpreted as the presence of a gap between sheets. These counts are accumulated in a hole counter provided for each of the A and B lines (see FIGS. 3a–3r). Less than five counts is interpreted as a hole in a note. The accumulation of five counts during a doubles condition is interpreted as the presence of double fed sheets. These counts are accumulated in a double counter provided for each of the A and B lines (FIGS. 3a–3s).

The NOTE POLL routine begins at step 720, at which time all of the above-mentioned counters are reset and the new note flag is cleared. If the SALEM has called for a stop when the apparatus 10 is in the remote mode, and a jam condition has been detected, at steps 721 and 724, respectively, the OUT subroutine is called at 724a. If the SALEM is not in the stop condition during the remote mode, and the motor 92 has not stopped, the STOP subroutine is called at 723. If the motor has stopped, or after the STOP routine is completed, the jam bit is examined to see if a jam condition is present at step 724. If there is no jam condition and a keyboard entry is detected at step 725, the program jumps to the OUT subroutine at step 724a. If no keyboard entry is detected, the current status of the sensors (32, 32') is determined at 726.

The A and B counters are examined at step 732. If either counter is counting, the program advances to step 749, shown in FIG. 7b, as will be more fully described. If neither line is presently counting, the one-half note bit is set at 733. This bit is stored in a predetermined one of the scratch pad memory locations. If a document is present under either sensor at 734 and if both sensor lines are on as detected at step 735, both the A and B counters are decremented by one count at 737 and the program advances to step 741. When only one sensor line is on, if only the A line is active (i.e. covered), the B counter is set to maximum count and the A counter is decremented. If the A line is not active, the A counter is set to maximum and the B counter is decremented, whereupon the program advances to step 741.

In the event that a document is not under either sensor, the program branches at 734a, both A and B counters are set to their maximum count and pulses to the SALEM are terminated at 740, at which time the program advances to the OUT subroutine at 742a.

After one or both of the A and B counters have been decremented at any of the steps 737 through 739 and the A counter has a count less than one note (i.e. 87 or less), the A count flag is set. If the count in the A counter is not less than one note, and the count in the B counter indicates a count of less than one note, the B count flag is set at 743. If the B counter indicates a count of less than one note (i.e. less than 87), the OUT subroutine is called at 742a.

As soon as one of the A or B count flags is set, the program then advances to step 745, whereupon the A and B doubles counters are cleared and the A and B hole counters are initialized. The A and B count flags indicate which counter arrived at the count of 87 first. The A and B counters are examined at 746 and 747 to determine if their count is equal to the count for one note (i.e. 87). If the A counter has a count equal to one note, the NEW NOTE subroutine is called at 748. If the A counter is not equal to one note but the B counter is equal to one note, the NEW NOTE subroutine is called at 748. If neither the A nor the B counter has a count equal to one note, the program advances to the OUT subroutine at 742a, as will be more fully described. The count 87 is the only count which will call the NEW NOTE routine, i.e. which will add one note to the count.

If counting on either line is taking place when examined at program step 732, the program branches at 732a to program step 749, shown in FIG. 7b. If the doubles detector is on, and either the B line or the A line indicates a double feed condition at steps 750 and 751 respectively, the A double counter is examined at step 752 to determine whether a double count, (i.e. 5), has already been accumulated. If so, the program advances to step 757 wherein the same examination is made of the B double counter. If the B double counter indicates a double count, then at steps 762 and 763 the presence of these simultaneous double conditions cause the double error bit to be set at 764, whereupon the program advances to the NOTE HALT subroutine, shown in FIG. 8a, which subroutine, as will be more fully described, sets the appropriate error bit and then returns to the program, as shown in FIG. 6c.

In the event that either the A or the B double counter has not reached a double count (see program steps 752 and 757), the A and B line sensors are examined for a double condition at 753 and 758. If the double condition is present, the respective double counter is incremented. If the double condition is not present and the double counter is not equal to zero, the respective counter is decremented.

In the event that either one or both of the A and B double counters has not reached a double count, the program advances to step 766. If counting is occurring on the A line, and neither line is active, i.e. neither sensor is covered (step 767), the double counters are cleared at 768 since this indicates the presence of a "hole" condition at both sensors. The B hole counter is examined at 769. The hole counters in the preferred embodiment are set to a count of 5 and are decremented towards zero. A zero count indicates the presence of a gap between notes.

If the count in the B hole counter is zero, the B counter is set to maximum in readiness for counting the next note. This technique enables even skewed notes to be accurately counted. If the count in the B-hole counter is not equal to zero, the B-hole counter is decremented. These operations take place in program steps 770 and 771. Thereafter, the A-hole counter is decremented and the A-sensor is examined at 773. If a note is no longer covering the A-sensor and the half-note bit is still on (at program step 775), the half-note error bit is set at 776 and the apparatus is halted at step 778. If the half-note bit is not on, the A count bit is cleared and the A and B counters are set to maximum, whereupon the program jumps to the OUT subroutine at 779.

If one of the A and B lines is found active (i.e. the associated sensor is covered) at step 767, the program advances to program step 780 (FIG. 7c), at which time both lines A and B are examined to determine if they are active. If both lines are active, i.e. both sensors are covered, the half-note bit is reset at step 781, both hole counters are initialized to their maximum count and the A-counter is decremented. The A-counter is examined at step 782 and if the count indicates a long note, the program jumps to the JAM routine at 788. If the count does not indicate the presence of a long note and indicates the presence of a count equal to a note (at step 783), the NEW NOTE routine is called at 784. If the count in the A-counter is not equal to the note count (87), the B-counter is decremented and is then examined to see if its count is that for a long note or is equal to the note count (87) at steps 786 and 789. If a long count is present, the JAM subroutine is called at 787. If the long count is not present, and a note count is present, the NEW NOTE subroutine is called and the program jumps to the OUT subroutine at 791. The program jumps to the OUT sub-routine directly if the B-counter fails to indicate the count of a note. It should be noted that the NEW NOTE subroutine sets both the A and B counters to a count of NOTE-1 (i.e. 86) to prevent the B counter from giving a count (step 789) after the A counter has given a count (step 783) for the same sheet.

In the event that only one of the A and B lines are active when examined at step 780, the program advances to step 792 to examine the A-line sensor. If the A-line is active, i.e. if the A line sensor is covered by a note, and the half-note bit is set, the A-hole counter is initialized (set to maximum) at 798, the A-counter is examined at 799 to see if the count equals a note and if so, the NEW NOTE subroutine is called at step 800. If the count is not equal to the count for a note, the A-counter is decremented at 801. If the count in the A-counter is equal to a long count when examined at step 802, the program jumps to the JAM subroutine at 803. If a long count is not present, the program jumps to the OUT subroutine at 804.

Returning to step 794, if the B hole counter is not zero, it is decremented (since only the A line is covered) at 795. If the B hole counter becomes zero (at step 796) after being decremented, the B counter is reset to maximum at 797. If the B hole counter has not yet reached zero, the A hole counter is initialized at 798.

In the event that the A-line is not active, the program branches at 792a to step 805, at which time the half-note bit is reset and the B-counter is decremented. If the B-counter contains a long count at step 806, the program jumps to the JAM subroutine at 807. If the B-counter does not contain a long count, the program examines the A-hole counter at step 808. If the count equals zero, the A-counter is set to maximum and the pulse to the SALEM device is stopped at 811. Thereafter, the B hole counter is initialized and the program advances to the OUT subroutine at step 804.

In the event that the count in the A-hole counter is not equal to zero, the program branches at 808a, the A-hole counter is decremented at 809, and if the A hole counter steps from one to zero, the program advances to program step 811, as was previously described. If the count in the A hole counter is greater than zero, the B-hole counter is initialized at 812 and the program jumps to the OUT subroutine at 804.

Figure 7D:
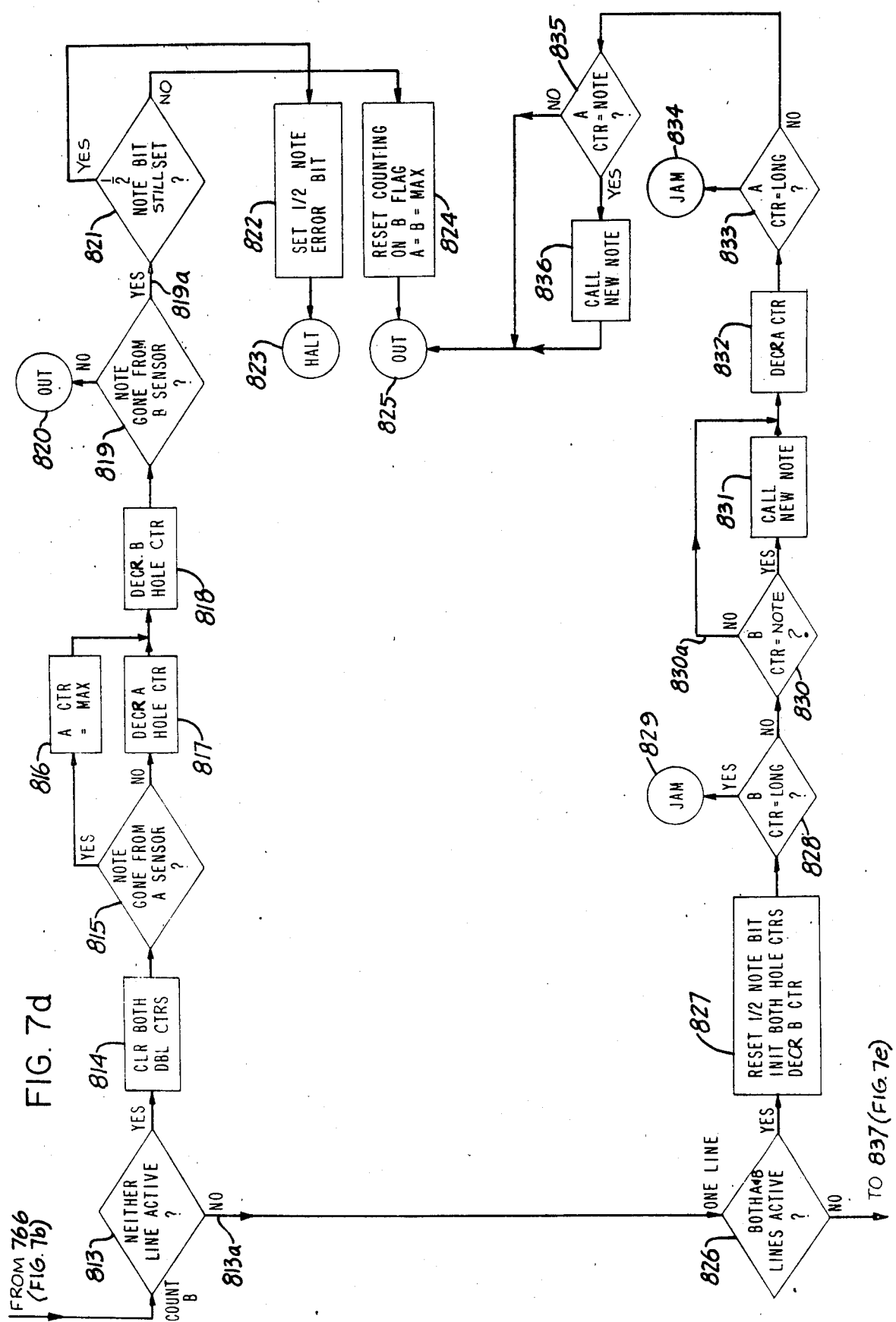

Returning to the program step 766 (FIG. 7b), if the A-line is not counting, the program branches at 766a to program step 813 in FIG. 7d. Both the A and B line sensors are examined. If neither is active, both double counters are cleared at 814, and the A-sensor is examined. If the A hole counter note has decremented from one to zero, the A-counter is set to maximum. If the count is one or more, the A-hole counter is decremented, said operations occurring at program steps 816 and 817. Thereafter, the B-hole counter is decremented at 818, and the B hole counter is examined at 819 and if it has not decremented from one to zero, the program jumps to the OUT subroutine at 820. If the note is gone from the B-sensor, the program branches at 819a, whereupon the half-note bit is examined at 821. If the half-note bit is still set, the half-note error bit is set at 822 and the apparatus 10 is halted at 823. If the half-note bit is not set, the B-flag counting bit is reset and the A and B counters are set to maximum at step 824 in readiness for counting the next note, whereupon the program advances to the OUT subroutine at 825.

In the event that at least one sensor line is active when examined at step 813, the program branches at 813a to step 826, at which time both A and B line sensors are examined. If both lines are active, the half-note bit is reset, the A and B hole counters are initialized and the B-counter is decremented. If the B-counter when examined at step 828 contains a long count, the program jumps to the JAM subroutine at 829. If the B-counter does not contain a long count, but contains a count equal to a note (at step 830), the NEW NOTE subroutine is called at 831. If the count in the B-counter is not equal to a note, the program branches at 830a to step 832, whereupon the A-counter is decremented. The A-counter is examined at 833. If the count is equal to a long document, the program jumps to the JAM subroutine at step 834. If the A-counter does not contain a long count, the A-counter is examined at step 835 to determine if it contains a count equal to a note. If not, the program jumps to the OUT subroutine at 825. If the A-counter contains a count equal to a note, the NEW NOTE subroutine is called at 836 and thereafter advances to the OUT subroutine. As set forth above, the NEW NOTE routine called at 831 prevents the NEW NOTE routine from being called at 836 by setting the A and B counters to counts of "86".

Returning to program step 826, if the examination of the A and B lines indicates that both lines are not active, i.e. the sensors 32, 321 are not covered, the B-line is examined at step 837, as shown in FIG. 7e, to determine if it is not active.

Program steps 826 through 849 (FIGS. 7d and 7e) are substantially identical to program steps 780 through 804 (FIG. 7c). If the B-line is active, the half-note bit is examined at step 838. If the half-note bit is set, the B-hole counter is initialized at 843, and the B counter is examined at 844. If the count is equal to a note, the NEW NOTE sub-routine is called at 845, the B counter is decremented at 846, and the B-note counter is examined at 847 to determine if a long count is present, and if so, the JAM subroutine is called at 848, and if not, the OUT subroutine is called at 849. In the event that the B-note counter does not contain a count equal to a note at step 844, the routine branches at 844a to decrement the B counter at 846 and then to again examine the B counter for a long count at step 847, as was described hereinabove.

If the B-line, when examined at step 837, indicates that the B-line is not active, the program branches at 837a to step 850 to reset the half-note bit. The A counter is examined at 851. If a long count is present, the program advances to the JAM subroutine at 852. If a long count is not present, the B-hole counter is examined at 853. If the B-hole counter is at a zero count, the B counter is set to maximum and the SALEM pulse is stopped at step 856. If the count in the B-hole counter is not equal to zero, the A-hole counter is decremented at 854, and the B-hole counter is examined at step 855 to determine if the B-hole counter has decremented from one to zero. If so, the program advances to step 856 as was previously described. If the B-hole counter is one or greater, the program advances directly to step 857 which initializes the A-hole counter and then steps to the OUT subroutine.

The JAM sub-routine is shown in FIG. 8a and, whenever the JAM subroutine is called, the program is entered at step 900 and thereafter to step 901, at which time the jam error bit is set. At step 903, the note routine JAM bit is set and the double error bit is examined at 904. If the double error bit is on, the one-half note bit is reset at step 905. If the double error bit is not on, the program branches to step 906 to determine if a half-note error is present. If a half-note error is present, and the doubles are found to be inhibited at 907, the half-note bit is reset and the A and B counting bit is reset. If the doubles counting has not been inhibited, the program branches at 907a to step 908, where the STOP routine is called and the jam line to the Salem is set. Thereafter, the program advances to step 909 as was previously described, and then to step 910 which examines the apparatus 10 to determine if the apparatus is in the remote mode. If the apparatus is in the remote mode, the program advances to the RETURN step 912 which in turn causes the program to jump to the RETURN step 675a of FIG. 6c, at which time the program determines if there are any further notes to be counted at step 677 of FIG. 6c.

The OUT subroutine which is also shown in FIG. 8a is initiated at step 914 which advances to step 915 to determine the count accumulated by the A counter. If 20 pulses have been accumulated, the count pulse to SALEM is terminated at 917. If, in the alternative, 20 pulses have been accumulated on line B as examined at step 916, the count pulse to SALEM is terminated. This assures adequate separation between count pulses delivered to SALEM by the microprocessor 52 to assure accurate counting by SALEM. If neither the A nor the B counters have accumulated 20 pulses, the program advances to step 918 to examine the jam error bit. If the jam error bit has been set, the keyboard lockout is cleared at step 919. If the jam error bit is not set, the program advances to step 920, at which time the apparatus is examined for either a new note or a jam condition. If either of these conditions occur, and the system is in the remote mode as examined at step 910, the program leaves the OUT routine at 912 and returns to update the note count and call the DISPLAY routine at step 677 of FIG. 6c. If a new note or jam condition is not present, the lines A and B are examined to determine if counting is still occurring at step 921. If counting is still occurring, the program branches at 922 to program step 720a shown in FIG. 7a to reinitiate the NOTE POLL routine. If counting is not occurring on either the A or the B line, but if either count line is active, as examined at step 923, the program advances to the NOTE START routine at 922. If neither count line is active, the program branches at 923a to program step 910, as was previously described.

At the START subroutine shown in FIG. 5c, the program jumps to step 550, at which time the return address is stored and the SALEM run/stop line is examined. At step 552, the local/remote switch status is examined. If the switch is not in the remote status, the program branches at 552a to 554 to complement the SALEM run/stop status to the local/remote status of the apparatus 10.

In the event that the switch is in the remote status, the program branches to step 554 to examine the status of the SALEM. In the event that the SALEM is not at the run state, the program returns to the main start program to initiate program step 612.

The call STOP program step 609 causes the program to advance to the STOP subroutine shown in FIG. 5b, causing the selection of program step 540, at which time the return address at the time of the jump is stored, the stop bit is set and the automatic stop/start counter is initialized for run out. The program then returns to program step 612.

The SERVICE routine is called by a time-out of a timer which may, for example, be any of the counters 52-7 through 52-n shown in FIG. 2b which form part of the random access memory of microprocessor 52. The timer is set for an interval of one millisecond. Upon time-out an interrupt condition is generated, halting whatever routine (or sub-routine) is in progress and automatically jumping to the SERVICE routine.

The SERVICE routine is entered at step 1030 at which time the identity of the step that was interrupted is remembered. The routine then advances to step 1031 where the contents of the accumulator, status register and ISAR are saved. The status register stores bits representing the carry of a sum operation, the results of a compare operation, etc. The ISAR is the pointer to the scratch pad memory (RAM).

At 1032, the two byte keyboard lock-out counter is examined, if it has not stepped to zero, the low byte of the keyboard lockout counter is decremented. If the low byte has stepped to zero (step 1034), the high byte is decremented at 1035. If the low byte is zero or after the high byte is decremented, the flag for the new pulse is stored (in a location in one register of the scratch pad memory). The speed switch is examined at 1037. If at one third normal speed the timer is set to sample the A and B sensors every 3 milliseconds (at 1038). If set to normal speed, the timer is set to sample the sensors every millisecond (at 1039). The timer is initialized, the contents of the ISAR is restored, as is the status register and the accumulator (at 1040). Upon completion of the SERVICE routine, the program jumps back to the step that was interrupted when the timer timed out, the identity of the interrupted step being the step saved at step 1030. Since the timer is initialized again at step 1040, there will be another interrupt and a jump to the SERVICE routine the next time the timer times out, i.e., one millisecond after being initialized (i.e. reset). This operation repeats itself every millisecond. The SERVICE routine is executed within one-tenth of a millisecond. Thus, the microprocessor 52 tends to the other routines during the other nine-tenths of each millisecond. In other words, ninety percent (90%) of the operating time is allocated to all routines other than the SERVICE routine and the SERVICE routine is performed during the remaining ten percent (10%) of the time. The SERVICE routine thus assures that operation of all other routines is updated every millisecond, the updating operating requiring only one tenth of a millisecond (i.e. 0.1 msec.).

FIG. 5d shows the STOP BATCH routine 685a of FIG. 6c in greater detail. When the count of notes equals the count of the present batch quantity 684 and the STOP routine has been called and the batch bit has been set (685), the routine branches at 685a to step 1100 whereupon the motor 92 is turned off, a speed bit is set to remember the operating speed, and a delay period is begun by initializing and decrementing a counter. Thus, counting occurs during the braking mode. When the counter reaches a predetermined count (20 msecs-step 1102) the motor 92 is turned on to operate at one third normal speed. At this time, the note is still covering sensors 32, 32'. When the note passes the sensors 32, 32' (step 1106), the motor is turned off. The program then returns to program step 686, FIG. 6c. This routine assures accurate feeding and stacking of a batch by braking the motor M when the A and/or B counters reach a count of 87 and resetting the motor 92 to operate at one third normal speed and shutting off the motor after the note has passed the sensors 32, 32' to assure the completion of a batch well before the note for the next group of notes to be counted is advanced to the output stacker 28.

Although the flow diagrams adequately describe the operation of the sensing and control electronics, a program listing has been provided and accompanies this specification. The language is assembly language for use in programming the F8 processor manufactured by both Fairchild and Mostek. The data is stored in hexadecimal format.

The program listing is comprised of four modules, i.e., KEYENTER (steps 0000 to 0300); KEYSCAN (steps 0302 to 0468); NOTEPOLL (steps 0469 to 07A0); and LOOKUP (steps 07A2 to 07FF).

The columns of each module, reading from left to right identify: memory address; the OP Code (operating code); line number; operation to be performed; operand; and programmer's comments. The asterisks aid in the visualization of program segments within each module.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

```
              0001  *
              0002  *****    862               *****
              0003  *****    OCT 16, 1981      *****
              0004  *****    KEYENTER          *****
              0005  *
              0006  *
              0007           GLOBAL   KEYSC
              0008           GLOBAL   CLEAR
              0009           GLOBAL   DISP
              0010           GLOBAL   KEYSCAN
              0011           GLOBAL   NOTEPOLL
              0012           GLOBAL   RETURN
              0013           GLOBAL   STOP
              0014           GLOBAL   START
              0015           GLOBAL   PREBATCH
              0016  KEYENTR  PSECT    ABS
)0000         0017           ORG      H'00'
0000  201C    0018           LI       H'1C'      SHUT DOWN DISPLAY DURING DELAY
0002  B0      0019           OUTS     0
0003  70      0020           CLR
0004  B1      0021           OUTS     1
0005  B4      0022           OUTS     4
0006  B5      0023           OUTS     5
0007  20PC    0024           LI       H'PC'      INIT PORT 0
0009  B0      0025           OUTS     0
000A  52      0026           LR       2,A        DELAY FOR SENSORS
000B  1F      0027  WAIT     INC                 TO STABILIZE
000C  92FE    0028           BNC      WAIT
000E  32      0029           DS       2          APPROX 1 SECOND
000F  94FB    0030           BNZ      WAIT
0011  67      0031           LISU     7
0012  6F      0032           LISL     7
0013  A5      0033           INS      5
0014  2140    0034           NI       H'40'      GET INITIAL REM/LOC STATUS
0016  51      0035           LR       1,A
0017  A1      0036           INS      1
0018  2110    0037           NI       H'10'
001A  C1      0038           AS       1
001B  5C      0039           LR       S,A
001C  2032    0040           LI       50         TIMER CONSTANT FOR FULL SPEED
001E  9054    0041           BR       AROUND     INTERRUPT ROUTINE
              0042  *
              0043  *
)0020         0044           ORG      H'0020'    INTERUPT SERVICE ROUTINE
0020  58      0045  SERVICE  LR       8,A        SAVE ACCUMULATOR
```

```
0021  1E       0046        LR    J,W       SAVE STATUS
0022  0A       0047        LR    A,IS      SAVE ISAR
0023  57       0048        LR    7,A
0024  63       0049        LISU  3
0025  6C       0050        LISL  4
0026  70       0051        CLR             CHECK FOR R34=0
0027  CE       0052        AS    D         IF SO DON'T DECREMENT
0028  8405     0053        BZ    EQZR
002A  3D       0054        DS    I         DEC R 33
002B  9402     0055        BNZ   EQZR
002D  3C       0056        DS    S         IF R33=0 THEN DEC R34
002E  A0       0057 EQZR   INS   0         FLASH LED FOR ENTER KEY
002F  2110     0058        NI    H'10'     IF AUTO-START IS INHIBITED
0031  8426     0059        BZ    NOBLINK   MOTOR ON=DON'T BLINK
0033  A1       0060        INS   1         AUTO START JUMPER
0034  2108     0061        NI    8         IN PLACE?
0036  9421     0062        BNZ   NOBLINK   YES=DON'T BLINK
0038  6A       0063        LISL  2         R 32 HAS INHIBIT STATUS
0039  2010     0064        LI    H'10'     CHECK FOR START INHIBITED
003B  FC       0065        NS    S
003C  9407     0066        BNZ   DOBLINK   START INHIBITED
003E  62       0067        LISU  2
003F  77       0068        LIS   7         ERRORS MEAN
0040  FD       0069        NS    I         MACHINE WON'T
0041  CE       0070        AS    D         AUTO START
0042  8415     0071        BZ    NOBLINK   NO ERRORS
0044  6D       0072 DOBLINK LISL 5         TIMER FOR BLINK
0045  A1       0073        INS   1         RUNNING 1/3/SPEED?
0046  2120     0074        NI    H'20'
0048  9407     0075        BNZ   NOT3RD    NO
004A  3C       0076        DS    S         DEC THREE TIMES FOR 1/3 SPEED
004B  8407     0077        BZ    BLINK
004D  3C       0078        DS    S
004E  8404     0079        BZ    BLINK
0050  3C       0080 NOT3RD DS    S
0051  940A     0081        BNZ   NTBTIME   NOT TIME TO BLINK
0053  A0       0082 BLINK  INS   0
0054  2301     0083        XI    1         ALTERNATE THE LED
0056  9004     0084        BR    OUTBLNK
0058  A0       0085 NOBLINK INS  0
0059  2201     0086        OI    1         LED OFF
005B  B0       0087 OUTBLNK OUTS 0
005C  67       0088 NTBTIME LISU 7
005D  6D       0089        LISL  5
005E  71       0090        LIS   1
005F  5C       0091        LR    S,A       SAVE NEW PULSE FLAG
0060  A0       0092        INS   0
0061  2120     0093        NI    H'20'     RUNNING 1/3 SPEED?
0063  2032     0094        LI    50        NO INTERR = 1.0 MSEC
0065  9403     0095        BNZ   RATE
0067  2096     0096        LI    150       YES = 3.0 MSEC PER PULSE
0069  B7       0097 RATE   OUTS  7         SET TIMER TO CORRECT INTERVAL
006A  20AA     0098        LI    H'AA'     RE-INITIALIZE INTERRUPT
006C  B6       0099        OUTS  6
006D  47       0100        LR    A,7
006E  0B       0101        LR    IS,A      RESTORE ISAR
006F  1D       0102        LR    W,J       RESTORE STATUS
0070  48       0103        LR    A,8       RESTORE ACCUMULATOR
0071  1B       0104        EI
0072  1C       0105        POP
0073  B7       0106 AROUND OUTS  7
0074  20AA     0107        LI    H'AA'     ENABLE TIMER
0076  B6       0108        OUTS  6
0077  1B       0109        EI              ENABLE INTERRUPTS
0078  76       0110        LIS   6         INITIAL STATUS
0079  50       0111        LR    0,A
007A  0B       0112 CLRR   LR    IS,A      CLR REGS TO 76
007B  70       0113        CLR
007C  5C       0114        LR    S,A
007D  0A       0115        LR    A,IS
007E  1F       0116        INC
007F  253F     0117        CI    0'77'     DONE CLR?
0081  94F8     0118        BNZ   CLRR
```

```
0083  63          0119         LISU   3
0084  6A          0120         LISL   2          INITIALIZE AUTO START/STOP
0085  A1          0121         INS    1          STATUS
0086  2180        0122         NI     H'80'      GET SENSOR STATUS
0088  220F        0123         CI     H'0F'      INITIALIZE CTR
008A  5C          0124         LR     S,A
008B  64          0125         LISU   4
008C  6D          0126         LISL   5
008D  20FF        0127         LI     H'FF'      INITIALIZE KEY STACK
008F  5D          0128         LR     I,A        TO NO KEYS
0090  5D          0129         LR     I,A
0091  902B        0130         BR     CLREG
                  0131  *
                  0132  *
                  0133  * RESTART HERE FOR CHANGE OF REMOTE LOCAL STATUS
                  0134  *
                  0135  * R77 = NEW STATUS OF REM/LOCAL & STOP/RUN
                  0136  *
                  0137  * 00 = STOP & LOCAL  = RUN
                  0138  * 50 = RUN  & REMOTE = RUN
                  0139  * 10 = RUN  & LOCAL  = STOP
                  0140  * 40 = STOP & REMOTE = STOP
                  0141  *
                  0142  *
0093  76          0143 RESTART LIS    6
0094  50          0144         LR     0,A
0095  67          0145         LISU   7
0096  6F          0146         LISL   7
0097  70          0147         CLR
0098  CC          0148         AS     S          GET NEW REMOTE LOCAL STATUS
0099  840D        0149         BZ     GSTART     START OR STOP ON NEW STATUS
009B  2550        0150         CI     H'50'
009D  8409        0151         BZ     GSTART
009F  28FFFF   A  0152 STP     PI     STOP
00A2  28FFFF   A  0153         PI     PREBATCH STOP USING BATCH METHOD
00A5  9017        0154         BR     CLREG
00A7  62          0155 GSTART  LISU   2
00A8  6A          0156         LISL   2          DON'T START IF
00A9  4D          0157         LR     A,I        ERROR IS ON
00AA  CE          0158         AS     D
00AB  94F3        0159         BNZ    STP        STOP INSTEAD
00AD  63          0160         LISU   3          CHECK AUTO START INHIBIT
00AE  4C          0161         LR     A,S
00AF  2110        0162         NI     H'10'
00B1  94ED        0163         BNZ    STP
00B3  A1          0164         INS    1
00B4  21A0        0165         NI     H'A0'      DOCS IN INPUT
00B6  2580        0166         CI     H'80'      NOT IN OUTPUT
00B8  9404        0167         BNZ    CLREG      ELSE DON'T START
00BA  28FFFF   A  0168         PI     START
00BD  62          0169 CLREG   LISU   2
00BE  68          0170         LISL   0
00BF  70          0171         CLR
00C0  5D          0172         LR     I,A        CLR K.B.
00C1  5C          0173         LR     S,A
00C2  63          0174         LISU   3          AND BATCH VALUE
00C3  5E          0175         LR     D,A
00C4  5D          0176         LR     I,A
00C5  28FFFF   A  0177         PI     DISP
00C8  67          0178 KEYSC   LISU   7
00C9  6F          0179         LISL   7
00CA  A5          0180         INS    5
00CB  2140        0181         NI     H'40'      GET REM/LOCAL SWITCH STATUS
00CD  51          0182         LR     1,A
00CE  A1          0183         INS    1
00CF  2110        0184         NI     H'10'      AND RUN/STOP FROM SALEM
00D1  C1          0185         AS     1
00D2  51          0186         LR     1,A        SAVE STATUS
00D3  EC          0187         XS     S          SAME AS BEFORE ?
00D4  8405        0188         BZ     CNTIN      YES
00D6  41          0189         LR     A,1
00D7  5C          0190         LR     S,A        SAVE NEW STATUS IN R77
                  0191  *
```

```
                   0192 *EITHER THE SWITCH OR THE STOP LINE HAS CHANGED
                   0193 *
00D8  90BA         0194            BR      RESTART   RESTART PROCESSOR
00DA  28FFFF  A    0195 CNTIN      PI      KEYSCAN
00DD  64           0196            LISU    4
00DE  68           0197            LISL    0         LENGTHEN DEBOUNCE CTR
00DF  4C           0198            LR      A,S
00E0  213F         0199            NI      H'3F'
00E2  8404         0200            BZ      DBOK
00E4  2901A7  A    0201 TOCHKB     JMP     CHKBITS
00E7  63           0202 DBOK       LISU    3
00E8  6A           0203            LISL    2         CHECK FOR AUTO START
00E9  2010         0204            LI      H'10'     OR AUTO STOP
00EB  FC           0205            NS      S         10 BIT IS TO INHIBIT
00EC  840E         0206            BZ      NOIH      NOT INHIBITED
00EE  A1           0207            INS     1
00EF  2120         0208            NI      H'20'     KEEP GETTING CURRENT
00F1  12           0209            SR      1         STATUS OF OUTPUT HOPPER
00F2  12           0210            SR      1         IN CASE DOCS ARE REMOVED
00F3  51           0211            LR      1,A
00F4  40           0212            LR      A,0       KEEP IT IN R 0
00F5  21F7         0213            NI      H'F7'
00F7  C1           0214            AS      1
00F8  50           0215            LR      0,A
00F9  90EA         0216            BR      TOCHKB
00FB  4C           0217 NOIH       LR      A,S       GET COUNTER
00FC  15           0218            SL      4         DEBOUNCE = 0?
00FD  841C         0219            BZ      NOINHIB   NO=DON'T ACCEPT CHANGE YET
00FF  3C           0220            DS      S
0100  7F           0221            LIS     15        IS CTR NOW 0?
0101  FC           0222            NS      S
0102  9446         0223            BNZ     NOAUTO    CHECK ONLY 1 TIME FOR KEY DOWN
0104  A0           0224            INS     0         IS MOTOR ON?
0105  2110         0225            NI      H'10'
0107  9412         0226            BNZ     NOINHIB   NO
0109  2010         0227            LI      H'10'     SCAN FOR RUN KEY
010B  B4           0228            OUTS    4
010C  A1           0229            INS     1
010D  2107         0230            NI      H'07'
010F  2502         0231            CI      2         RUN KEY DOWN?
0111  9408         0232            BNZ     NOINHIB   NO
0113  4C           0233 INHIBIT    LR      A,S
0114  2210         0234            OI      H'10'     INHIBIT AUTO START/STOP
0116  5C           0235            LR      S,A
0117  2901A7  A    0236            JMP     CHKBITS
011A  A1           0237 NOINHIB    INS     1
011B  2180         0238            NI      H'80'     CHECK INPUT HOPPER
011D  51           0239            LR      1,A       SAVE IT
011E  EC           0240            XS      S         HAS LINE CHANGED?
011F  14           0241            SR      4         ELIMINATE CTR
0120  12           0242            SR      1         AND INHIBIT FLAG
0121  8427         0243            BZ      NOAUTO    NO CHANGE
0123  201F         0244            LI      H'1F'     KEEP INHIB FLAG & CTR
0125  FC           0245            NS      S
0126  C1           0246            AS      1         INSERT STATUS
0127  5C           0247            LR      S,A       OF THE LINE
0128  9104         0248            BM      AUTOSTRT
012A  2902B7  A    0249 NOTDWN     JMP     HALT      DO STOP
012D  A1           0250 AUTOSTRT   INS     1         CHECK FOR AUTO START
012E  2108         0251            NI      8         DISABLE JUMPER
0130  9418         0252            BNZ     NOAUTO    JUMPER IN PLACE
0132  62           0253            LISU    2         CHECK FOR ANY ERRORS
0133  7F           0254            LIS     15
0134  FD           0255            NS      I         DON'T START IF ERROR
0135  2508         0256            CI      8         JUST BATCH BIT ON ?
0137  9408         0257            BNZ     NOTBCH    NO
0139  A1           0258            INS     1         IF AT BATCH AND
013A  2120         0259            NI      H'20'     DOCS OUT OF OUTPUT HOPPER?
013C  8409         0260            BZ      DOENT     YES=START NEW BATCH
013E  900A         0261            BR      NOAUTO    NO = DON'T START
0140  CE           0262 NOTBCH     AS      D         CHECK R 23 ALSO
0141  9407         0263            BNZ     NOAUTO
0143  2902A8  A    0264            JMP     RUN
0146  2902FB  A    0265 DOENT      JMP     ENTER
```

| | | | | | | |
|---|---|---|---|---|---|---|
| 0149 | A1 | 0266 | NOAUTO | INS | 1 | KEEP STATUS OF OUTPUT SENSOR |
| 014A | 2120 | 0267 | | NI | H'20' | IN R0 |
| 014C | 12 | 0268 | | SR | 1 | |
| 014D | 12 | 0269 | | SR | 1 | ADJ TO 08 BIT |
| 014E | 51 | 0270 | | LR | 1,A | SAVE IT TEMPORARILY |
| 014F | 78 | 0271 | | LIS | 8 | |
| 0150 | F0 | 0272 | | NS | 0 | GET OLD STATUS |
| 0151 | E1 | 0273 | | XS | 1 | HAS IT CHANGED? |
| 0152 | 8442 | 0274 | | BZ | NOLGHT | NO |
| 0154 | 20F7 | 0275 | | LI | H'F7' | |
| 0156 | F0 | 0276 | | NS | 0 | INSERT NEW STATUS |
| 0157 | C1 | 0277 | | AS | 1 | |
| 0158 | 50 | 0278 | | LR | 0,A | SAVE NEW STATUS |
| 0159 | 70 | 0279 | | CLR | | |
| 015A | C1 | 0280 | | AS | 1 | NEW STATUS = NO DOCUMENTS? |
| 015B | 9439 | 0281 | | BNZ | NOLGHT | |
| 015D | 67 | 0282 | | LISU | 7 | |
| 015E | 6F | 0283 | | LISL | 7 | IN REMOTE & SALEM = RUN |
| 015F | 4C | 0284 | | LR | A,S | |
| 0160 | 2550 | 0285 | | CI | H'50' | |
| 0162 | 9406 | 0286 | | BNZ | NOREM | NO |
| 0164 | A0 | 0287 | | INS | 0 | |
| 0165 | 2110 | 0288 | | NI | H'10' | MOTOR OFF |
| 0167 | 940D | 0289 | | BNZ | CHKOUT | YES=START IF DOCS REMOVED |
| 0169 | 63 | 0290 | NOREM | LISU | 3 | BATCHING NOW? |
| 016A | 68 | 0291 | | LISL | 0 | |
| 016B | 4D | 0292 | | LR | A,I | |
| 016C | CC | 0293 | | AS | S | |
| 016D | 8427 | 0294 | | BZ | NOLGHT | NOT BATCHING |
| 016F | 62 | 0295 | | LISU | 2 | |
| 0170 | 6A | 0296 | | LISL | 2 | |
| 0171 | 78 | 0297 | | LIS | 8 | AT A BATCH? |
| 0172 | FC | 0298 | | NS | S | |
| 0173 | 8421 | 0299 | | BZ | NOLGHT | NO=DON'T AUTO RESTART |
| 0175 | 62 | 0300 | CHKOUT | LISU | 2 | |
| 0176 | 6A | 0301 | | LISL | 2 | |
| 0177 | 77 | 0302 | | LIS | 7 | ANY ERRORS? |
| 0178 | FD | 0303 | | NS | I | |
| 0179 | 941B | 0304 | | BNZ | NOLGHT | ERRORS = DON'T START |
| 017B | 70 | 0305 | | CLR | | |
| 017C | CC | 0306 | | AS | S | ANY FEED ERROR? |
| 017D | 9417 | 0307 | | BNZ | NOLGHT | FEED ERR= DON'T START |
| 017F | A0 | 0308 | | INS | 0 | IS MOTOR RUNNING? |
| 0180 | 2110 | 0309 | | NI | H'10' | |
| 0182 | 8412 | 0310 | | BZ | NOLGHT | YES=SKIP DELAY |
| 0184 | 2080 | 0311 | | LI | H'80' | |
| 0186 | 51 | 0312 | | LR | 1,A | DELAY TO DEBOUNCE |
| 0187 | 52 | 0313 | | LR | 2,A | AND SLOW RESPONSE |
| 0188 | 31 | 0314 | D1 | DS | 1 | TO OUTPUT HOPPER SENSOR |
| 0189 | 94FE | 0315 | | BNZ | D1 | |
| 018B | 32 | 0316 | | DS | 2 | |
| 018C | 94FB | 0317 | | BNZ | D1 | |
| 018E | A1 | 0318 | | INS | 1 | |
| 018F | 21A0 | 0319 | | NI | H'A0' | DOCS STILL GONE? |
| 0191 | 2580 | 0320 | | CI | H'80' | AND DOCS IN INPUT? |
| 0193 | 84B2 | 0321 | | BZ | DOENT | START NEW BATCH |
| 0195 | A0 | 0322 | NOLGHT | INS | 0 | |
| 0196 | 2110 | 0323 | | NI | H'10' | MOTOR RUNNING? |
| 0198 | 940E | 0324 | | BNZ | CHKBITS | NO |
| 019A | 63 | 0325 | | LISU | 3 | |
| 019B | 6C | 0326 | | LISL | 4 | |
| 019C | 70 | 0327 | | CLR | | IS R34 = 0? |
| 019D | CE | 0328 | | AS | D | STOP SINCE NO NOTES |
| 019E | 9408 | 0329 | | BNZ | CHKBITS | ARE BEING COUNTED |
| 01A0 | 6A | 0330 | | LISL | 2 | INHIBIT AUTO START |
| 01A1 | 4C | 0331 | | LR | A,S | |
| 01A2 | 2210 | 0332 | | OI | H'10' | INHIBIT |
| 01A4 | 5C | 0333 | | LR | S,A | |
| 01A5 | 9022 | 0334 | | BR | STOPIT | STOP MOTOR |
| | | 0335 | * | | | |
| | | 0336 | * | THIS WOULD BE THE CASE IF A JAM | | |
| | | 0337 | * | OCCURRED BUT THE SENSOR WAS NOT | | |
| | | 0338 | * | COVERED. MOTOR STALLED. | | |
| | | 0339 | * | | | |

```
01A7  70            0340 CHKBITS  CLR
01A8  C0            0341          AS    0              ANTICIPATED BATCH?
01A9  9122          0342          BM    NOSTOP         YES
01AB  2101          0343          NI    1              STOP BIT?
01AD  841E          0344          BZ    NOSTOP
01AF  62            0345          LISU  2
01B0  6A            0346          LISL  2
01B1  70            0347          CLR
01B2  74            0348          LIS   4              CHECK FOR JAM BIT
01B3  FC            0349          NS    S
01B4  9413          0350          BNZ   STOPIT         STOP IMMEDIATELY
01B6  A5            0351          INS   5              STOP THE MOTOR ON JAM
01B7  2103          0352          NI    3              OR WHEN BOTH COUNT LINES
01B9  2503          0353          CI    3              ARE GONE
01BB  840C          0354          BZ    STOPIT
01BD  63            0355          LISU  3
01BE  6A            0356          LISL  2              IF R32 HAS REACHED 0
01BF  7F            0357          LIS   15             DON'T RUN OUT (FOR SAFETY)
01C0  FC            0358          NS    S
01C1  8406          0359          BZ    STOPIT
01C3  A0            0360          INS   0
01C4  21EF          0361          NI    H'EF'          KEEP IT RUNNING
01C6  9004          0362          BR    OUTMOT         FOR RUN OUT
01C8  A0            0363 STOPIT   INS   0
01C9  2210          0364          OI    H'10'          STOP THE MOTOR
01CB  B0            0365 OUTMOT   OUTS  0
01CC  64            0366 NOSTOP   LISU  4
01CD  68            0367          LISL  0              LOC OF CONTINUOUS CTR
01CE  3D            0368          DS    I
01CF  9415          0369          BNZ   NOTIME         NOT TIME TO DEC ANY CTRS
01D1  3C            0370          DS    S              DEC FLASH CTR
01D2  4C            0371          LR    A,S
01D3  2107          0372 NORM     NI    H'07'
01D5  8405          0373          BZ    CHNG           TIME TO TURN ON
01D7  2504          0374          CI    H'4'           TIME TO TURN OFF?
01D9  9404          0375          BNZ   NOFLSH         NO
01DB  2800C6   A    0376 CHNG     PI    DISP
01DE  64            0377 NOFLSH   LISU  4
01DF  6A            0378          LISL  2
01E0  70            0379          CLR                  KEY BOARD LOCK OUT
01E1  CC            0380          AS    S              TIMER AFTER NOTE TAKEN
01E2  8402          0381          BZ    NOTIME
01E4  3C            0382          DS    S              DEC ENTER TIMER
01E5  A5            0383 NOTIME   INS   5
01E6  13            0384          SL    1              IN LOCAL?
01E7  8112          0385          BP    LOCAL          YES
01E9  65            0386          LISU  5
01EA  68            0387          LISL  0
01EB  4C            0388          LR    A,S
01EC  2504          0389          CI    H'04'          REMOTE IN DISP?
01EE  8409          0390          BZ    LOCAL          YES
01F0  63            0391          LISU  3
01F1  68            0392          LISL  0
01F2  70            0393          CLR
01F3  5C            0394          LR    S,A
01F4  5C            0395          LR    S,A            CLEAR BATCH CTR
01F5  2801DC   A    0396          PI    DISP           SHOW DASHES FOR REMOTE
01F8  70            0397 LOCAL    CLR
01F9  C0            0398          AS    0              ANTICIPATED BATCH?
01FA  9106          0399          BM    DOPOLL         YES
01FC  A0            0400          INS   0
01FD  2110          0401          NI    H'10'          MOTOR ON?
01FF  9404          0402          BNZ   RETURN         OFF=NO NOTEPOLL
0201  29FFFF   A    0403 DOPOLL   JMP   NOTEPOLL       JUMP=OK TO INTERRUPT
0204  67            0404 RETURN   LISU  7              RETURN FROM NOTEPOLL
0205  6C            0405          LISL  4
0206  70            0406          CLR
0207  CC            0407          AS    S              ANY NOTES TO COUNT?
0208  8439          0408          BZ    KEY            NO
020A  3C            0409          DS    S              DECREMENT NOTES TO COUNT
020B  72            0410 COUNT1   LIS   2              COUNT 1 NOTE
020C  F0            0411          NS    0              REM BIT OFF?
020D  62            0412          LISU  2
```

| Addr | Code | Line | Label | Op | Operand | Comment |
|---|---|---|---|---|---|---|
| 020E | 68 | 0413 | | LISL | 0 | TOP OF K.B. |
| 020F | 8408 | 0414 | | BZ | NOTFRST | NOT FIRST NOTE |
| 0211 | 40 | 0415 | | LR | A,0 | |
| 0212 | 21FD | 0416 | | NI | H'FD' | RESET REMOTE BIT |
| 0214 | 50 | 0417 | | LR | 0,A | |
| 0215 | 70 | 0418 | | CLR | | |
| 0216 | 5D | 0419 | | LR | I,A | |
| 0217 | 5E | 0420 | | LR | D,A | |
| 0218 | 2067 | 0421 | NOTFRST | LI | H'67' | |
| 021A | DC | 0422 | | ASD | S | ADD TO COUNT IN K.B. |
| 021B | 5D | 0423 | | LR | I,A | SAVE RESULT |
| 021C | 9205 | 0424 | | BNC | NOCRY | |
| 021E | 2067 | 0425 | | LI | H'67' | ADD 1 - HI DIG OF COUNT |
| 0220 | DC | 0426 | | ASD | S | |
| 0221 | 5C | 0427 | | LR | S,A | |
| 0222 | 2801F6 A | 0428 | NOCRY | PI | DISP | |
| 0225 | 69 | 0429 | | LISL | 1 | |
| 0226 | 63 | 0430 | | LISU | 3 | |
| 0227 | 4E | 0431 | | LR | A,D | CHECK FOR BATCH = 0 |
| 0228 | CD | 0432 | | AS | I | NO BATCH COUNT PRESENT |
| 0229 | 8418 | 0433 | | BZ | KEY | MEANS DON'T BATCH AT ALL |
| 022B | 63 | 0434 | CHKBT | LISU | 3 | CHECK FOR BATCH |
| 022C | 4C | 0435 | | LR | A,S | |
| 022D | 62 | 0436 | | LISU | 2 | |
| 022E | EE | 0437 | | XS | D | BATCH CTR & VALUE =? |
| 022F | 9412 | 0438 | | BNZ | KEY | NO |
| 0231 | 8FF9 | 0439 | | BR7 | CHKBT | |
| 0233 | 2800A0 A | 0440 | | PI | STOP | BATCH HAS BEEN REACHED |
| 0236 | 2800A3 A | 0441 | | PI | PREBATCH | STOP USING BATCH METHOD |
| 0239 | 62 | 0442 | | LISU | 2 | |
| 023A | 6A | 0443 | | LISL | 2 | |
| 023B | 4C | 0444 | | LR | A,S | |
| 023C | 2208 | 0445 | | OI | 8 | SET BATCH BIT |
| 023E | 5C | 0446 | | LR | S,A | |
| 023F | 280223 A | 0447 | | PI | DISP | DISP 'BATCH XXX' |
| 0242 | 64 | 0448 | KEY | LISU | 4 | |
| 0243 | 6D | 0449 | | LISL | 5 | KEY STACK |
| 0244 | 4C | 0450 | | LR | A,S | ANY KEYS IN STACK? |
| 0245 | 25FF | 0451 | | CI | H'FF' | |
| 0247 | 9404 | 0452 | | BNZ | NKEY | |
| 0249 | 2900CB A | 0453 | NOKEY | JMP | KEYSC | |
| 024C | 55 | 0454 | NKEY | LR | 5,A | SAVE KEY DATA |
| 024D | 20FF | 0455 | | LI | H'FF' | |
| 024F | 5C | 0456 | | LR | S,A | INSERT NO KEY INTO STACK |
| 0250 | 45 | 0457 | KEYOK | LR | A,5 | |
| 0251 | 13 | 0458 | | SL | 1 | |
| 0252 | 9142 | 0459 | | BM | CTRL | |
| 0254 | A5 | 0460 | DIGIT | INS | 5 | |
| 0255 | 13 | 0461 | | SL | 1 | IN REMOTE? |
| 0256 | 913C | 0462 | | BM | FULL | YES |
| 0258 | 40 | 0463 | | LR | A,0 | ACCEPT ANY DIGIT |
| 0259 | 217F | 0464 | | NI | H'7F' | AS NEXT BATCH VALUE |
| 025B | 2202 | 0465 | | OI | H'02' | REM ENTRY BIT ON |
| 025D | 50 | 0466 | | LR | 0,A | |
| 025E | 62 | 0467 | | LISU | 2 | |
| 025F | 6B | 0468 | | LISL | 3 | |
| 0260 | 70 | 0469 | | CLR | | CLEAR ERRORS & K.B. |
| 0261 | 5E | 0470 | | LR | D,A | |
| 0262 | 5E | 0471 | | LR | D,A | R 23 & R22 CLEAR ERRORS |
| 0263 | 5E | 0472 | | LR | D,A | R20 & R 21 CLEAR BATCH VALUE |
| 0264 | 5E | 0473 | | LR | D,A | |
| 0265 | 74 | 0474 | | LIS | 4 | K.B. ENT BIT ON |
| 0266 | F0 | 0475 | | NS | 0 | MEANS CLR BATCH FOR NEW VALUE |
| 0267 | 8405 | 0476 | | BZ | NOCB | NOT 1ST DIGIT = NO CLEAR |
| 0269 | 63 | 0477 | | LISU | 3 | CLR BATCH VALUE |
| 026A | 70 | 0478 | | CLR | | |
| 026B | 5D | 0479 | | LR | I,A | |
| 026C | 5D | 0480 | | LR | I,A | |
| 026D | A5 | 0481 | NOCB | INS | 5 | IS KEYBOARD PRESET BATCH? |
| 026E | 8114 | 0482 | | BP | DIGOK | NO |
| 0270 | 2A07A2 | 0483 | PRESET | DCI | H'7A2' | START OF LOOKUP FOR BATCHES |
| 0273 | 45 | 0484 | | LR | A,S | |
| 0274 | 8E | 0485 | | ADC | | |

| | | | | | | |
|---|---|---|---|---|---|---|
| 0275 | 8E | | 0486 | | ADC | ADJ TO START OF CORRECT BATCH |
| 0276 | 62 | | 0487 | | LISU 2 | K.B. |
| 0277 | 68 | | 0488 | | LISL 0 | |
| 0278 | 70 | | 0489 | | CLR | CLR K.B. |
| 0279 | 5D | | 0490 | | LR I,A | |
| 027A | 5E | | 0491 | | LR D,A | |
| 027B | 63 | | 0492 | | LISU 3 | |
| 027C | 16 | | 0493 | | LM | |
| 027D | 5D | | 0494 | | LR I,A | 2 LO DIGITS OF BATCH |
| 027E | 16 | | 0495 | | LM | |
| 027F | 5C | | 0496 | | LR S,A | HI DIGIT |
| 0280 | 2902F5 | A | 0497 | | JMP DKEYSC | |
| 0283 | 63 | | 0498 | DIGOK | LISU 3 | BATCH VALUE LOC |
| 0284 | 68 | | 0499 | NOT1ST | LISL 0 | HI END K.B. |
| 0285 | 4D | | 0500 | | LR A,I | GET LO 2 DIGITS |
| 0286 | 14 | | 0501 | | SR 4 | MOVE DIGITS UP |
| 0287 | 5E | | 0502 | | LR D,A | 1 PLACE IN BUFFER |
| 0288 | 4C | | 0503 | | LR A,S | |
| 0289 | 15 | | 0504 | | SL 4 | |
| 028A | C5 | | 0505 | | AS 5 | INSERT NEW DIGIT |
| 028B | 5C | | 0506 | | LR S,A | |
| 028C | 40 | | 0507 | DIGIN | LR A,0 | RESET K.B. ENTER BIT |
| 028D | 21FB | | 0508 | | NI H'FB' | |
| 028F | 50 | | 0509 | | LR 0,A | |
| 0290 | 280234 | A | 0510 | | PI STOP | |
| 0293 | 9061 | | 0511 | FULL | BR DKEYSC | |
| 0295 | 45 | | 0512 | CTRL | LR A,5 | SPECIAL KEY SORT |
| 0296 | 24BB | | 0513 | | AI H'BB' | |
| 0298 | 825F | | 0514 | | BC JKEYSC | 45=UNUSED CODE |
| 029A | 1F | | 0515 | | INC | |
| 029B | 825C | | 0516 | | BC JKEYSC | OLD CLEAR KEY(NOT USED 862) |
| 029D | 1F | | 0517 | CTRL1 | INC | |
| 029E | 8209 | | 0518 | | BC RUN | RUN KEY FOR 862 |
| 02A0 | 1F | | 0519 | CTRL2 | INC | |
| 02A1 | 820D | | 0520 | | BC STOPKEY | 42=STOP KEY |
| 02A3 | 1F | | 0521 | | INC | |
| 02A4 | 8217 | | 0522 | | BC CONTIN | 41=CONTINUE |
| 02A6 | 9054 | | 0523 | | BR ENTER | 40=START/ENTER |
| 02A8 | A1 | | 0524 | RUN | INS 1 | IF DOCUMENTS ARE IN |
| 02A9 | 2120 | | 0525 | | NI H'20' | OUTPUT HOPPER |
| 02AB | 9410 | | 0526 | | BNZ CONTIN | DO CONTINUE |
| 02AD | 904D | | 0527 | | BR ENTER | NO = ENTER |
| 02AF | 63 | | 0528 | STOPKEY | LISU 3 | |
| 02B0 | 6A | | 0529 | | LISL 2 | |
| 02B1 | 4C | | 0530 | | LR A,S | |
| 02B2 | 2180 | | 0531 | | NI H'80' | ELIMINATE RUN OUT = X0 |
| 02B4 | 2210 | | 0532 | | OI H'10' | INHIBIT AUTO START |
| 02B6 | 5C | | 0533 | | LR S,A | |
| 02B7 | 280291 | A | 0534 | HALT | PI STOP | |
| 02BA | 903D | | 0535 | ATB | BR JKEYSC | |
| 02BC | A5 | | 0536 | CONTIN | INS 5 | |
| 02BD | 13 | | 0537 | | SL 1 | REMOTE? |
| 02BE | 9118 | | 0538 | | BM CONTST | YES |
| 02C0 | 76 | | 0539 | | LIS 6 | |
| 02C1 | F0 | | 0540 | | NS 0 | GET ENTER BITS |
| 02C2 | 2502 | | 0541 | | CI H'02' | KEY BOARD ENTRY? |
| 02C4 | 8436 | | 0542 | | BZ ENTER | YES=DO 'ENTER' |
| 02C6 | 62 | | 0543 | | LISU 2 | |
| 02C7 | 6B | | 0544 | | LISL 3 | CHECK FOR FEED ERROR |
| 02C8 | 70 | | 0545 | | CLR | |
| 02C9 | CC | | 0546 | | AS S | YES= DO ENTER |
| 02CA | 9430 | | 0547 | | BNZ ENTER | TO CLEAR COUNTS |
| 02CC | 69 | | 0548 | | LISL 1 | |
| 02CD | 63 | | 0549 | ATBAT | LISU 3 | |
| 02CE | 4C | | 0550 | | LR A,S | |
| 02CF | 62 | | 0551 | | LISU 2 | |
| 02D0 | EE | | 0552 | | XS D | AT A BATCH NOW? |
| 02D1 | 9405 | | 0553 | | BNZ CONTST | NO=OK TO START(ERROR) |
| 02D3 | 8FF9 | | 0554 | | BR7 ATBAT | |
| 02D5 | 9025 | | 0555 | | BR ENTER | BATCH=DO 'ENTER' |
| 02D7 | 63 | | 0556 | CONTST | LISU 3 | |
| 02D8 | 6A | | 0557 | | LISL 2 | INITIALIZE AUTO |
| 02D9 | 208F | | 0558 | | LI H'8F' | STOP/START TO JUST STARTED |

```
02DB  5C              0559           LR    S,A
02DC  2800BB   A      0560           PI    START
02DF  62              0561           LISU  2
02E0  6A              0562           LISL  2
02E1  70              0563           CLR
02E2  5D              0564           LR    I,A
02E3  5C              0565           LR    S,A          CLR ERROR BITS
02E4  9010            0566           BR    DKEYSC       CONT=START BUT DON'T RESET CTRS
02E6  2802DD   A      0567  DOSTRT   PI    START
02E9  78              0568  CLRINIT  LIS   8            KEEP SENSOR STATUS
02EA  F0              0569           NS    0
02EB  2246            0570           OI    H'46'        1/2 NOTE & ENTER BITS
02ED  50              0571           LR    0,A          STATUS
02EE  62              0572  CLRERR   LISU  2
02EF  68              0573           LISL  0
02F0  70              0574           CLR
02F1  5D              0575           LR    I,A          CLR K.B.
02F2  5D              0576           LR    I,A          AND
02F3  5D              0577           LR    I,A
02F4  5C              0578           LR    S,A          CLEAR ERROR BITS
02F5  280240   A      0579  DKEYSC   PI    DISP
02F8  2900C8   A      0580  JKEYSC   JMP   KEYSC
02FB  63              0581  ENTER    LISU  3
02FC  6A              0582           LISL  2            INITIALIZE AUTO
02FD  208F            0583           LI    H'8F'        TO JUST STARTED
02FF  5C              0584           LR    S,A
0300  90C5            0585           BR    DOSTRT
                      0586           END

0001  *
                      0002  ********       862         ********
                      0003  ********    OCT 16, 1981   ********
                      0004  ********    SUBROUTINES    ********
                      0005  *
                      0006  *
                      0007           GLOBAL  DISP
                      0008           GLOBAL  START
                      0009           GLOBAL  STOP
                      0010           GLOBAL  KEYSC
                      0011           GLOBAL  KEYSCAN
                      0012           GLOBAL  PREBATCH
                      0013           PSECT   ABS
)0302                 0014           ORG     H'302'
0302  08              0015  KEYSCAN  LR    K,P          SAVE RETURN ADDRESS
0303  1B              0016           EI
0304  64              0017           LISU  4
                      0018  *
                      0019  *THIS PROCEDURE MINIMIZES THE KEYBOARD LOOK UP TABLE
                      0020  *
0305  76              0021  DOKEY    LIS   6            HI LOOK UP DATA
0306  52              0022           LR    2,A          OF LOWER LOOK UP ADDR
0307  2040            0023           LI    H'40'
0309  55              0024           LR    5,A          INIT SCAN CNT
030A  32              0025  DECSC    DS    2            ADJ FOR LOOK UP
030B  45              0026           LR    A,5
030C  12              0027           SR    1            ADJ TO NXT CNT
030D  55              0028           LR    5,A
030E  8442            0029           BZ    NOTHING
0310  B4              0030  LOOKEY   OUTS  4            SCAN
0311  A1              0031           INS   1            GET DATA
0312  2107            0032           NI    H'07'        ONLY DATA
0314  84F5            0033           BZ    DECSC        NO KEY THIS SCAN
0316  56              0034  KFND     LR    6,A          SAVE KEY DATA
0317  6F              0035           LISL  7            DEBOUNCE CTR LOC
0318  2070            0036           LI    H'70'        50 MSEC DEBOUNCE
031A  5E              0037           LR    D,A
031B  A1              0038           INS   1
031C  2107            0039           NI    H'07'        GET DATA
031E  E6              0040           XS    6            KEY STILL DOWN?
031F  94EA            0041           BNZ   DECSC        NO
```

```
0321  74          0042          LIS    4
0322  55          0043          LR     5,A
0323  46          0044          LR     A,6      CONVERT 1 OF 3 LINES
0324  15          0045          SL     4
0325  35          0046  ADJLK   DS     5        TO SIMPLE OCTAL #
0326  13          0047          SL     1
0327  81FD        0048          BP     ADJLK
0329  45          0049          LR     A,5
032A  13          0050          SL     1
032B  13          0051          SL     1
032C  13          0052          SL     1
032D  C2          0053          AS     2        GET LOOK UP ADDR
032E  24E0        0054          AI     H'E0'    ADJ TO LOOK UP
0330  07          0055          LR     QL,A     KEY LOOK UP ADDR
0331  77          0056          LIS    7
0332  06          0057          LR     QU,A     LOOK UP ADDR
0333  0F          0058          LR     DC,Q
0334  16          0059          LM              GET KEY CODE
0335  25FF        0060          CI     H'FF'    INVALID KEY CODE?
0337  8419        0061          BZ     NOTHING  YES
0339  56          0062          LR     6,A
033A  EC          0063          XS     S        SAME AS LAST KEY TAKEN?
033B  841C        0064          BZ     OUT      YES
033D  4C          0065  NOTSAME LR     A,S
033E  1F          0066          INC             WAS LAST CODE=NO KEY?
033F  9218        0067          BNC    OUT      NO
0341  6A          0068  NEWKEY  LISL   2
0342  70          0069          CLR
0343  CC          0070          AS     S        KEY BOARD LOCK OUT GONE?
0344  8406        0071          BZ     KEYOK    YES-ANY KEY IS VALID
0346  46          0072          LR     A,6
0347  2542        0073          CI     H'42'    STOP KEY?
0349  9407        0074          BNZ    NOTHING  IF NOT DON'T TAKE IT
034B  6D          0075  KEYOK   LISL   5
034C  46          0076          LR     A,6      GET NEW KEY DATA
034D  5D          0077          LR     I,A      SAVE KEY IN STACK
034E  5C          0078          LR     S,A      SAVE IN LAST KEY TAKEN
034F  9008        0079          BR     OUT
0351  6F          0080  NOTHING LISL   7
0352  3E          0081          DS     D        DEBOUNCE CTR
0353  9404        0082          BNZ    OUT      NOT 8 PASSES YET
0355  20FF        0083          LI     H'FF'
0357  5C          0084          LR     S,A      CLR LAST KEY TAKEN
0358  0C          0085  OUT     PK
                  0086  *
                  0087  *
0359  08          0088  DISP    LR     K,P      SAVE RETURN ADDRESS
035A  65          0089          LISU   5
035B  6F          0090          LISL   7
035C  A5          0091          INS    5
035D  13          0092          SL     1        REMOTE?
035E  8107        0093          BP     NR       NO
0360  74          0094          LIS    4
0361  5D          0095  STRREM  LR     I,A      DASHES TO DISPLAY
0362  8FFE        0096          BR7    STRREM
0364  9034        0097          BR     DFILL
0366  207B        0098  NR      LI     H'7B'    ZERO FOR DISP
0368  5D          0099  ZFILL   LR     I,A      ZERO FILL DISP BUFFER
0369  8FFE        0100          BR7    ZFILL
036B  2011        0101  NOTOT   LI     O'21'    SOURCE FOR OTHER DATA
036D  51          0102          LR     1,A
036E  6B          0103          LISL   3        DESTINATION=R50--53
036F  65          0104  SVDEST  LISU   5
0370  0A          0105          LR     A,IS
0371  52          0106          LR     2,A      DESTINATION FOR DATA
0372  41          0107  MOVE    LR     A,1
0373  0B          0108          LR     IS,A     SOURCE
0374  4E          0109          LR     A,D      GET DATA
0375  53          0110          LR     3,A      TEMP SAVE DATA
0376  0A          0111          LR     A,IS
0377  51          0112          LR     1,A      NEXT SOURCE LOC
0378  42          0113          LR     A,2
0379  0B          0114          LR     IS,A     DESTINATION
```

```
037A  43         0115         LR     A,3
037B  14         0116         SR     4              HI DIGIT
037C  2A07B6     0117         DCI    H'7B6'         DIGIT LOOKUP TABLE
037F  0E         0118         LR     Q,DC
0380  8E         0119         ADC                   FOR NO DECODE DIGIT DATA
0381  16         0120         LM                    CODE FOR DIGIT
0382  5E         0121         LR     D,A
0383  7F         0122         LIS    H'F'
0384  F3         0123         NS     3              LO DIGIT
0385  0F         0124         LR     DC,Q
0386  8E         0125         ADC                   FOR NO DECODE DIGIT DATA
0387  16         0126         LM                    CODE FOR DIGIT
0388  5E         0127         LR     D,A
0389  0A         0128         LR     A,IS
038A  52         0129         LR     2,A            NEXT DESTINATION LOC
038B  8FE6       0130         BR7    MOVE           GET ANY MORE DIGITS
038D  4C         0131 BLNK    LR     A,S
038E  257B       0132         CI     H'7B'          ZERO?
0390  9408       0133         BNZ    DFILL          DIGIT NOT ZERO-DONE FILL
0392  70         0134         CLR
0393  5E         0135         LR     D,A
0394  0A         0136         LR     A,IS           DONE FILLING?
0395  2529       0137         CI     O'51'
0397  94F5       0138         BNZ    BLNK           NO
0399  2A07D0     0139 DFILL   DCI    H'7D0'         DEFAULT TO ENGLISH
039C  A1         0140         INS    1
039D  13         0141         SL     1
039E  8104       0142         BP     LADD           LANGUAGE ADDRESS
03A0  2A07BC     0143         DCI    H'7BC'         INTERNATIONAL
03A3  0E         0144 LADD    LR     Q,DC           SAVE IT
03A4  62         0145         LISU   2              LANGUAGE ADDR-4
03A5  6A         0146         LISL   2
03A6  7F         0147         LIS    H'F'           CHECK FOR ANY ERRORS
03A7  FC         0148         NS     S
03A8  842F       0149         BZ     ALLSHWN NONE?
03AA  20F0       0150         LI     H'F0'
03AC  FC         0151         NS     S              WHICH IS NOW SHOWN?
03AD  9402       0152         BNZ    NOTFRST
03AF  78         0153         LIS    8              START WITH FIRST ERROR
03B0  51         0154 NOTFRST LR     1,A
03B1  41         0155 NXT     LR     A,1
03B2  13         0156         SL     1              SHIFT TO ADJ NEXT ERROR
03B3  51         0157         LR     1,A
03B4  7F         0158         LIS    H'F'           GET ERROR CODE
03B5  FC         0159         NS     S
03B6  C1         0160         AS     1              INSERT WHICH IS DISPLAYED
03B7  5C         0161         LR     S,A            SAVE IN R22
03B8  14         0162         SR     4
03B9  841E       0163         BZ     ALLSHWN        ALL ERRORS HAVE BEEN SHOWN
03BB  FC         0164         NS     S              THIS ERROR BIT ON?
03BC  84F4       0165         BZ     NXT            NO
03BE  70         0166         CLR
03BF  C1         0167         AS     1              GET ERROR TO BE SHOWN
03C0  8108       0168         BP     NOTB           NOT BATCH MSG
03C2  A1         0169         INS    1
03C3  13         0170         SL     1              MESSAGES IN ENGLISH?
03C4  9122       0171         BM     SHWB           NO=SHOW BATCH FIGURE
03C6  7C         0172         LIS    H'C'           LOC OF BACH MSG
03C7  9004       0173         BR     MADDR          ENGLISH='BACH'
03C9  41         0174 NOTB    LR     A,1
03CA  12         0175         SR     1
03CB  12         0176         SR     1              MSG # * 4 = ADJ
03CC  8E         0177 MADDR   ADC                   CORRECT MSG ADDDR
03CD  65         0178 MOVEMSG LISU   5
03CE  6F         0179         LISL   7
03CF  74         0180         LIS    4              4 BYTES / MESSAGE
03D0  51         0181         LR     1,A
03D1  16         0182 MOVM    LM
03D2  5E         0183         LR     D,A            MOVE MESSAGE R54-57
03D3  31         0184         DS     1
03D4  94FC       0185         BNZ    MOVM
03D6  9031       0186         BR     SHOWIT
03D8  6B         0187 ALLSHWN LISL   3              CHECK FOR XTRA NOTE BIT
```

```
03D9  71      0188           LIS   1              FEED ERROR
03DA  FE      0189           NS    D
03DB  8407    0190           BZ    NOTXTRA NO
03DD  0F      0191           LR    DC,Q           START OF LANGUAGE
03DE  2014    0192           LI    H'14'          ADJ TO 'FEED' MSG
03E0  8E      0193           ADC
03E1  90EB    0194           BR    MOVEMSG
03E3  7F      0195 NOTXTRA   LIS   H'F'
03E4  FC      0196           NS    S              ANY ERRORS?
03E5  94B3    0197           BNZ   DFILL
03E7  63      0198 SHWB      LISU  3              SHOW BATCH IF THERE IS ONE
03E8  68      0199           LISL  0
03E9  4D      0200           LR    A,I            GET 2 LO DIGITS
03EA  5C      0201           LR    S,A            SAVE THEM FOR LATER
03EB  CD      0202           AS    S              HI=0?
03EC  841B    0203           BZ    SHOWIT         BATCH = 0 = NONE TO SHOW
03EE  2A07B6  0204           DCI   H'7B6'         DIGIT SEGMENT DATA LOOK UP
03F1  0E      0205           LR    Q,DC
03F2  70      0206           CLR
03F3  CE      0207           AS    D              HI = 0?
03F4  65      0208           LISU  5              DISP BUFF HI
03F5  8405    0209           BZ    LO2            YES
03F7  8E      0210           ADC
03F8  16      0211           LM
03F9  6F      0212           LISL  7
03FA  5C      0213           LR    S,A            SAVE HI DIGIT
03FB  6E      0214 LO2       LISL  6              LOW TWO BATCH DIGITS
03FC  42      0215           LR    A,2            GET LO 2 DIGITS
03FD  14      0216           SR    4
03FE  0F      0217           LR    DC,Q
03FF  8E      0218           ADC
0400  16      0219           LM
0401  5E      0220           LR    D,A            SAVE TENS DIGIT
0402  7F      0221           LIS   H'F'
0403  F2      0222           NS    2              GET LO DIGIT
0404  0F      0223           LR    DC,Q
0405  8E      0224           ADC
0406  16      0225           LM                   GET DIGIT DATA
0407  5E      0226           LR    D,A
0408  A0      0227 SHOWIT    INS   0
0409  217F    0228           NI    H'7F'          ENABLE MODE LINE
040B  B0      0229           OUTS  0
040C  2040    0230           LI    H'40'          NO DECODE DATA COMING
040E  B4      0231           OUTS  4              SEND MODE CHAR
040F  A0      0232           INS   0
0410  2280    0233           OI    H'80'          DISABLE MODE LINE
0412  B0      0234           OUTS  0
0413  65      0235           LISU  5
0414  68      0236           LISL  0
0415  4D      0237 NEXT      LR    A,I            GET NEXT DIGIT
0416  18      0238           COM
0417  B4      0239           OUTS  4
0418  8FFC    0240           BR7   NEXT
041A  4D      0241           LR    A,I            GET LAST DIGIT
041B  18      0242           COM
041C  B4      0243           OUTS  4
041D  0C      0244           PK
              0245   *
              0246   *
041E  08      0247 START     LR    K,P            SAVE RETURN ADDRESS
041F  A5      0248           INS   5
0420  13      0249           SL    1              REMOTE?
0421  9105    0250           BM    NOCOM          COM FOR LOCAL OPERATION
0423  A1      0251           INS   1
0424  18      0252           COM
0425  9002    0253           BR    OKAY
0427  A1      0254 NOCOM     INS   1
0428  2110    0255 OKAY      NI    H'10'          SALEM RUN-STOP ALLOW START?
042A  8418    0256           BZ    DSTART         NO
042C  40      0257 NOTRM     LR    A,0
042D  217E    0258           NI    H'7E'          RESET STOP & NEAR BATCH BIT
042F  50      0259           LR    0,A
0430  A0      0260           INS   0
```

```
0431  2208        0261         OI       8           RESET SALEM JAM BIT
0433  21EF        0262         NI       H'EF'       MOTOR ON
0435  B0          0263         OUTS     0
0436  63          0264         LISU     3
0437  6C          0265         LISL     4           SET FLAG FOR NO NOTES TAKEN
0438  78          0266         LIS      8           TIMER FOR NO NOTES
0439  5E          0267         LR       D,A         TAKEN - R33 & 34
043A  6A          0268         LISL     2
043B  4C          0269         LR       A,S         GET R 32
043C  220F        0270         OI       H'0F'       RESTART COUNTER
043E  5C          0271         LR       S,A
043F  62          0272         LISU     2
0440  70          0273         CLR                  CLEAR ALL ERRORS
0441  5D          0274         LR       I,A
0442  5C          0275         LR       S,A
0443  0C          0276 DSTART  PK
                  0277 *
                  0278 *
0444  08          0279 STOP    LR       K,P         SAVE RETURN ADDRESS
0445  40          0280         LR       A,0
0446  2201        0281         OI       1           SET STOP BIT
0448  50          0282         LR       0,A
0449  63          0283         LISU     3
044A  6A          0284         LISL     2
044B  A0          0285         INS      0           IS THE MOTOR ON?
044C  2110        0286         NI       H'10'       MOTOR OFF = DON'T INIT
044E  9405        0287         BNZ      STP         RUN OUT CTR
0450  4C          0288         LR       A,S         SET R32 TO XF
0451  220F        0289         OI       H'F'        TO TIME RUN OUT
0453  5C          0290         LR       S,A         FOR MAXIMUM
0454  0C          0291 STP     PK
0455  08          0292 PREBATCH LR      K,P
0456  A5          0293         INS      5
0457  2120        0294         NI       H'20'       RUNNING SLOW SPEED?
0459  940E        0295         BNZ      SLOWSPD     YES=DON'T TURN IT OFF
045B  63          0296         LISU     3
045C  6E          0297         LISL     6
045D  2014        0298         LI       20          20 MSEC OFF TIME
045F  5C          0299         LR       S,A         AT START OF BATCH NOTE
0460  40          0300         LR       A,0         SET ANTICIPATE BATCH BIT
0461  2280        0301         OI       H'80'       AFTER 20 MSEC RUN 1/3 SPEED
0463  50          0302         LR       0,A
0464  A0          0303         INS      0           STOP MOTOR
0465  2210        0304         OI       H'10'
0467  B0          0305         OUTS     0
0469  0C          0306 SLOWSPD PK
                  0307         END

0001 *
                  0002 **********   862       **********
                  0003 **********   OCT 16, 1981  **********
                  0004 **********   NOTEPOLL    **********
                  0005 *
)005A             0006 MAXNOTE EQU    90           AFTER 90 PULSES JAM
)0005             0007 DOUBLE  EQU    5            5 COUNTS = DOUBLE
)0005             0008 HOLE    EQU    5            MAX HOLE = 5
)00EF             0009 SALEM   EQU    H'EF'        COMPLEMENT 16 PULSES FOR SALEM
                  0010 *
                  0011 *
                  0012 *       GENERATE A PULSE EVERY 1.0 MSEC IN FAST SPEED
                  0013 *              3.0 MSEC IN SLOW SPEED
                  0014 *       90 MSEC = DOC TOO LONG = JAM
                  0015 *       5 PULSES = JUST OVER 1/4 INCH HOLE & DBL
                  0016 *
                  0017 *       THERE IS SOME ROOM HERE FOR SPEED VARIATIONS
                  0018 *
                  0019 *
                  0020         GLOBAL NOTEPOLL
                  0021         GLOBAL STOP
                  0022         GLOBAL START
```

```
                        0023            GLOBAL   RETURN   RETURN FROM NOTEPOLL
                        0024            PSECT    ABS
)0469                   0025            ORG      H'469'
                        0026   *
                        0027   *
0469   205A             0028   NOTEPOLL LI       MAXNOTE
046B   52               0029            LR       2,A
046C   2057             0030            LI       MAXNOTE-3
046E   53               0031   SVNTE    LR       3,A          TAKE NOTE AT THIS CNT
046F   54               0032            LR       4,A
0470   34               0033            DS       4            R4=NOTE-1
                        0034   *
                        0035   *        R2=LONG NOTE COUNT
                        0036   *        R3=TAKE NOTE AT THIS COUNT (LONG-3 )
                        0037   *        R4=NOTE -1
                        0038   *
0471   70               0039            CLR
0472   55               0040            LR       5,A          CLEAR NEW NOTE FLAG
0473   62               0041   NSTART   LISU     2
0474   6A               0042            LISL     2
0475   74               0043            LIS      4            JAM CONDITION?
0476   FC               0044            NS       S
0477   67               0045            LISU     7
0478   944F             0046            BNZ      JOUT         IF SO DON'T DO NOTEPOLL.
047A   74               0047            LIS      4
047B   F0               0048            NS       0            K.B. ENTER BIT OFF?
047C   844B             0049            BZ       JOUT         YES (DON'T CHK REM)
047E   A5               0050            INS      5            GET CNT & DBL LINES
047F   210F             0051            NI       H'0F'        ONLY CNT & DBL LINES
0481   2303             0052            XI       H'03'        COMPLEMENT CNT LINES
0483   56               0053            LR       6,A
0484   6D               0054            LISL     5            R75=FLAG FOR NEW PULSE
0485   70               0055            CLR
0486   CC               0056            AS       S            NEW PULSE?
0487   70               0057            CLR
0488   5C               0058            LR       S,A          RESET FLAG
0489   843E             0059            BZ       JOUT         NO NEW PULSE FOUND
048B   C0               0060            AS       0            CHK ANTICIPATED BATCH BIT
048C   8112             0061            BP       CHKBBIT      BIT NOT ON
048E   63               0062            LISU     3
048F   6E               0063            LISL     6            TIMER FOR OFF TIME
0490   3C               0064            DS       S            DEC TIMER
0491   941F             0065            BNZ      NOCHG        LEAVE IT OFF
0493   40               0066            LR       A,0          RESET ANTICIPATED BATCH
0494   217F             0067            NI       H'7F'        BIT
0496   50               0068            LR       0,A
0497   73               0069            LIS      3
0498   F6               0070            NS       6            NOTE STILL THERE?
0499   8417             0071            BZ       NOCHG        NO = LEAVE MOTOR OFF
049B   A0               0072            INS      0
049C   21EF             0073            NI       H'EF'        MOTOR BACK ON
049E   B0               0074            OUTS     0
049F   71               0075   CHKBBIT  LIS      1            STOP BIT ON?
04A0   F0               0076            NS       0
04A1   940B             0077            BNZ      HALFSPD      YES=RUN OUT LAST DOC 1/3/SPEED
04A3   A5               0078            INS      5            CHECK FOR RUNNING
04A4   2120             0079            NI       H'20'        SLOW SPEED
04A6   9406             0080            BNZ      HALFSPD      YES
04A8   A0               0081   FULLSPD  INS      0
04A9   2220             0082            OI       H'20'        RUN FULL SPEED
04AB   9004             0083            BR       OUTMTR
04AD   A0               0084   HALFSPD  INS      0
04AE   21DF             0085            NI       H'DF'        RUN HALF SPEED
04B0   B0               0086   OUTMTR   OUTS     0
04B1   67               0087   NOCHG    LISU     7
04B2   69               0088            LISL     1
04B3   40               0089            LR       A,0
04B4   2130             0090            NI       H'30'        COUNTING ON EITHER?
04B6   9455             0091            BNZ      COUNTING          YES
04B8   40               0092   NEITHER  LR       A,0          SET 1/2 NOTE BIT
04B9   2240             0093            OI       H'40'
04BB   50               0094            LR       0,A
04BC   73               0095            LIS      3            GET COUNT LINES
```

```
04BD  F6            0096         NS     6         EITHER COUNT LINE?
04BE  940C          0097         BNZ    LNES
04C0  69            0098         LISL   1
04C1  42            0099         LR     A,2       GET COUNT VALUE
04C2  5D            0100         LR     I,A       A = 80
04C3  5D            0101         LR     I,A       B = 80
04C4  A0            0102         INS    0
04C5  2204          0103         OI     H'04'     STOP SALEM PULSE
04C7  B0            0104         OUTS   0
04C8  2906F0   A    0105 JOUT    JMP    OUT
04CB  73            0106 LNES    LIS    3
04CC  F6            0107         NS     6         GET COUNT STATUS
04CD  2503          0108         CI     H'03'     BOTH LINES ACTIVE?
04CF  9410          0109         BNZ    NOTBOTH
04D1  3D            0110         DS     I         DEC A
04D2  3E            0111         DS     D         DEC B
04D3  69            0112 CHK4NOTE LISL  1
04D4  43            0113         LR     A,3       GET VALUE FOR NOTE
04D5  18            0114         COM
04D6  CD            0115         AS     I         A COUNT < NOTE
04D7  9212          0116         BNC    CNTA      YES
04D9  43            0117         LR     A,3       NOTE CONSTANT
04DA  18            0118         COM
04DB  CC            0119         AS     S         B NOW < COUNT?
04DC  9219          0120         BNC    CNTB      YES
04DE  90E9          0121         BR     JOUT
04E0  2501          0122 NOTBOTH CI     H'01'     A LINE ACTIVE?
04E2  940D          0123         BNZ    BLYNE     NO
04E4  6A            0124 ALYNE   LISL   2         B= 80 COUNTS
04E5  42            0125         LR     A,2       B=COUNT CONSTANT
04E6  5E            0126         LR     D,A
04E7  3C            0127         DS     S         DEC A CTR
04E8  90EA          0128         BR     CHK4NOTE
04EA  40            0129 CNTA    LR     A,0
04EB  2210          0130         OI     H'10'     COUNT ON A FLAG
04ED  50            0131         LR     0,A
04EE  900B          0132         BR     STRTCNT   TAKE THIS NOTE
04F0  69            0133 BLYNE   LISL   1
04F1  42            0134         LR     A,2
04F2  5D            0135         LR     I,A       A = 80
04F3  3C            0136         DS     S         DEC B
04F4  90DE          0137         BR     CHK4NOTE
04F6  40            0138 CNTB    LR     A,0
04F7  2220          0139         OI     H'20'     COUNT ON B FLAG
04F9  50            0140         LR     0,A
04FA  6B            0141 STRTCNT LISL   3
04FB  75            0142         LIS    HOLE      CLEAR DBL CTRS
04FC  5C            0143         LR     S,A       B HOLE CTR = 4
04FD  68            0144         LISL   0
04FE  5D            0145         LR     I,A       A HOLE CTR = 4
04FF  4D            0146         LR     A,I
0500  E3            0147         XS     3         A COUNT=NOTE?
0501  8405          0148         BZ     CNT1
0503  4C            0149         LR     A,S
0504  E3            0150         XS     3         B COUNT=NOTE?
0505  9404          0151         BNZ    SKIP      YES = NEW NOTE
0507  28073B   A    0152 CNT1    PI     NEWNOTE
050A  90BD          0153 SKIP    BR     JOUT
050C  A5            0154 COUNTING INS   5         ALRDY COUNTING ON 1 LINE
050D  2110          0155         NI     H'10'     DOUBLES TURNED OFF?
050F  945A          0156         BNZ    NODBL     YES
0511  6B            0157         LISL   3
0512  4C            0158         LR     A,S       GET B DBL CTR
0513  14            0159         SR     4
0514  2505          0160         CI     DOUBLE    B DOUBLE YET?
0516  68            0161         LISL   0
0517  9407          0162         BNZ    CHK4DBL   NO
0519  4C            0163         LR     A,S       GET A DBL CTR
051A  14            0164         SR     4
051B  2505          0165         CI     DOUBLE    A DOUBLE YET?
051D  844C          0166         BZ     NODBL     YES BOTH DOUBLE
      0167 *                                      DON'T TAKE DOUBLE AGAIN
051F  68            0168 CHK4DBL LISL   0
```

| | | | | | | |
|---|---|---|---|---|---|---|
| 0520 | 4C | | 0169 | | LR | A,S |
| 0521 | 14 | | 0170 | | SR | 4 |
| 0522 | 2505 | | 0171 | | CI | DOUBLE | A DOUBLE ALREADY? |
| 0524 | 8414 | | 0172 | | BZ | CHKBDBL | YES |
| 0526 | 74 | | 0173 | | LIS | 4 |
| 0527 | F6 | | 0174 | | NS | 6 | DOUBLE ON A LINE? |
| 0528 | 8407 | | 0175 | | BZ | NOADBL | NO |
| 052A | 4C | | 0176 | | LR | A,S |
| 052B | 2410 | | 0177 | | AI | H'10' | INC A DBL CTR |
| 052D | 5C | | 0178 | | LR | S,A |
| 052E | 900A | | 0179 | | BR | CHKBDBL |
| 0530 | 20F0 | | 0180 NOADBL | LI | H'F0' |
| 0532 | FC | | 0181 | | NS | S | A DBL CTR = 0? |
| 0533 | 8405 | | 0182 | | BZ | CHKBDBL | YES |
| 0535 | 4C | | 0183 | | LR | A,S |
| 0536 | 24F0 | | 0184 | | AI | H'F0' | DEC A DBL CTR |
| 0538 | 5C | | 0185 | | LR | S,A |
| 0539 | 6B | | 0186 CHKBDBL | LISL | 3 |
| 053A | 4C | | 0187 | | LR | A,S | GET B CTR |
| 053B | 14 | | 0188 | | SR | 4 |
| 053C | 2505 | | 0189 | | CI | DOUBLE | B DOUBLE ALREADY? |
| 053E | 8414 | | 0190 | | BZ | DBLCHK | YES |
| 0540 | 78 | | 0191 | | LIS | 8 |
| 0541 | F6 | | 0192 | | NS | 6 | DOUBLE ON B? |
| 0542 | 8407 | | 0193 | | BZ | NOBDBL | NO |
| 0544 | 4C | | 0194 | | LR | A,S |
| 0545 | 2410 | | 0195 | | AI | H'10' | INC B DBL CTR |
| 0547 | 5C | | 0196 | | LR | S,A |
| 0548 | 900A | | 0197 | | BR | DBLCHK |
| 054A | 20F0 | | 0198 NOBDBL | LI | H'F0' |
| 054C | FC | | 0199 | | NS | S | B DBL CTR = 0? |
| 054D | 8405 | | 0200 | | BZ | DBLCHK | YES |
| 054F | 4C | | 0201 | | LR | A,S |
| 0550 | 24F0 | | 0202 | | AI | H'F0' | DEC B DBL CTR |
| 0552 | 5C | | 0203 | | LR | S,A |
| 0553 | 6B | | 0204 DBLCHK | LISL | 3 |
| 0554 | 4C | | 0205 | | LR | A,S | GET B DBL CTR |
| 0555 | 14 | | 0206 | | SR | 4 |
| 0556 | 2505 | | 0207 | | CI | DOUBLE | B DOUBLE? |
| 0558 | 9411 | | 0208 | | BNZ | NODBL |
| 055A | 68 | | 0209 | | LISL | 0 |
| 055B | 4C | | 0210 | | LR | A,S | GET A DBL CTR |
| 055C | 14 | | 0211 | | SR | 4 |
| 055D | 2505 | | 0212 | | CI | DOUBLE | A DOUBLE? |
| 055F | 940A | | 0213 | | BNZ | NODBL | NO |
| 0561 | 62 | | 0214 | | LISU | 2 |
| 0562 | 6A | | 0215 | | LISL | 2 |
| 0563 | 4C | | 0216 | | LR | A,S |
| 0564 | 2202 | | 0217 | | OI | 2 | DBL ERROR BIT |
| 0566 | 5C | | 0218 | | LR | S,A |
| 0567 | 67 | | 0219 | | LISU | 7 |
| 0568 | 9048 | | 0220 | | BR | HALT |
| 056A | 2010 | | 0221 NODBL | LI | H'10' |
| 056C | F0 | | 0222 | | NS | 0 | COUNTING ON A ? |
| 056D | 9404 | | 0223 | | BNZ | COUNTA |
| 056F | 29064D | A | 0224 | | JMP | COUNTB | NO |
| 0572 | 73 | | 0225 COUNTA | LIS | 3 |
| 0573 | F6 | | 0226 | | NS | 6 | GET COUNT LINES |
| 0574 | 9404 | | 0227 | | BNZ | LNEPRES | A LINE IS PRESENT |
| 0576 | 2905D9 | A | 0228 | | JMP | NOLINE | NEITHER ACTIVE |
| 0579 | 2503 | | 0229 LNEPRES | CI | H'03' | BOTH ACTIVE? |
| 057B | 8404 | | 0230 | | BZ | BOTH | YES |
| 057D | 290605 | A | 0231 | | JMP | ONELINE |
| 0580 | 40 | | 0232 BOTH | LR | A,0 |
| 0581 | 21BF | | 0233 | | NI | H'BF' | RESET 1/2 NOTE BIT |
| 0583 | 50 | | 0234 | | LR | 0,A |
| 0584 | 6B | | 0235 | | LISL | 3 |
| 0585 | 4C | | 0236 | | LR | A,S |
| 0586 | 21F0 | | 0237 | | NI | H'F0' | GET ONLY DBL CTR |
| 0588 | 2405 | | 0238 | | AI | HOLE | B HOLE CTR = 4 |
| 058A | 5C | | 0239 | | LR | S,A |
| 058B | 68 | | 0240 | | LISL | 0 |
| 058C | 4C | | 0241 | | LR | A,S |

| | | | | | |
|---|---|---|---|---|---|
| 058D | 21F0 | | 0242 | NI | H'F0' | GET ONLY DBL CTR |
| 058F | 2405 | | 0243 | AI | HOLE | A HOLE CTR = 4 |
| 0591 | 5D | | 0244 | LR | I,A | |
| 0592 | 3C | | 0245 | DS | S | DEC A |
| 0593 | 8416 | | 0246 | BZ | JAM | A LONG |
| 0595 | 4D | | 0247 | LR | A,I | |
| 0596 | E3 | | 0248 | XS | 3 | A=NOTE VALUE? |
| 0597 | 9404 | | 0249 | BNZ | NOTNEW | NO |
| 0599 | 28073B | A | 0250 | PI | NEWNOTE | |
| 059C | 6A | | 0251 NOTNEW | LISL | 2 | |
| 059D | 3C | | 0252 | DS | S | DEC 'B' |
| 059E | 840B | | 0253 | BZ | JAM | B DOC TOO LONG |
| 05A0 | 4E | | 0254 | LR | A,D | |
| 05A1 | E3 | | 0255 | XS | 3 | NEW NOTE? |
| 05A2 | 9404 | | 0256 | BNZ | GOUT | NO |
| 05A4 | 28073B | A | 0257 | PI | NEWNOTE | |
| 05A7 | 2906F0 | A | 0258 GOUT | JMP | OUT | |
| 05AA | 62 | | 0259 JAM | LISU | 2 | |
| 05AB | 6A | | 0260 | LISL | 2 | |
| 05AC | 4C | | 0261 | LR | A,S | |
| 05AD | 2204 | | 0262 | OI | 4 | |
| 05AF | 5C | | 0263 | LR | S,A | ERROR BIT FOR 'ERR' |
| 05B0 | 67 | | 0264 | LISU | 7 | |
| 05B1 | 45 | | 0265 HALT | LR | A,5 | |
| 05B2 | 2208 | | 0266 | OI | H'08' | JAM BIT FOR NOTE ROUTINE |
| 05B4 | 55 | | 0267 | LR | 5,A | |
| 05B5 | 62 | | 0268 | LISU | 2 | |
| 05B6 | 6A | | 0269 | LISL | 2 | |
| 05B7 | 72 | | 0270 | LIS | 2 | IS DOUBLE BIT ON? |
| 05B8 | FC | | 0271 | NS | S | |
| 05B9 | 8404 | | 0272 | BZ | NDBL | NO |
| 05BB | 7E | | 0273 | LIS | H'E' | IF SO NO HALF BIT ALLOWED |
| 05BC | FC | | 0274 | NS | S | |
| 05BD | 5C | | 0275 | LR | S,A | |
| 05BE | 7F | | 0276 NDBL | LIS | H'F' | GET ERROR BITS |
| 05BF | FC | | 0277 | NS | S | |
| 05C0 | 2501 | | 0278 | CI | 1 | ONLY HALF BIT? |
| 05C2 | 9406 | | 0279 | BNZ | NOTHALF | NO |
| 05C4 | A5 | | 0280 | INS | 5 | |
| 05C5 | 2110 | | 0281 | NI | H'10' | DOUBLE INHIBITED? |
| 05C7 | 940A | | 0282 | BNZ | NOHST | YES = DON'T STOP |
| 05C9 | 28FFFF | A | 0283 NOTHALF | PI | STOP | STOP MOTOR |
| 05CC | 62 | | 0284 | LISU | 2 | |
| 05CD | 6A | | 0285 | LISL | 2 | |
| 05CE | A0 | | 0286 | INS | 0 | |
| 05CF | 21F7 | | 0287 | NI | H'F7' | JAM LINE TO SALEM |
| 05D1 | B0 | | 0288 | OUTS | 0 | |
| 05D2 | 40 | | 0289 NOHST | LR | A,0 | |
| 05D3 | 210F | | 0290 | NI | H'0F' | RST HALF NOTE CNT LINES |
| 05D5 | 50 | | 0291 | LR | 0,A | |
| 05D6 | 29072D | A | 0292 TD | JMP | NTEDONE | |
| 05D9 | 68 | | 0293 NOLINE | LISL | 0 | NEITHER LINE ACTIVE |
| 05DA | 7F | | 0294 | LIS | H'F' | NEITHER LINE ACTIVE |
| 05DB | FC | | 0295 | NS | S | |
| 05DC | 5C | | 0296 | LR | S,A | CLEAR BOTH DBL CTRS |
| 05DD | 6B | | 0297 | LISL | 3 | |
| 05DE | 7F | | 0298 | LIS | H'F' | |
| 05DF | FC | | 0299 | NS | S | |
| 05E0 | 5C | | 0300 | LR | S,A | |
| 05E1 | 8404 | | 0301 | BZ | B00 | B HOLE = 00 ALREADY |
| 05E3 | 3E | | 0302 | DS | D | DEC B HOLE CTR |
| 05E4 | 9404 | | 0303 | BNZ | NOBHOLE | |
| 05E6 | 6A | | 0304 B00 | LISL | 2 | |
| 05E7 | 42 | | 0305 | LR | A,2 | GET COUNT CONSTANT |
| 05E8 | 5C | | 0306 | LR | S,A | B = 80 |
| 05E9 | 68 | | 0307 NOBHOLE | LISL | 0 | |
| 05EA | 3C | | 0308 | DS | S | DEC A HOLE CTR |
| 05EB | 94BB | | 0309 | BNZ | GOUT | NO HOLE IN A |
| 05ED | 2040 | | 0310 | LI | H'40' | |
| 05EF | F0 | | 0311 | NS | 0 | HALF NOTE STILL ON? |
| 05F0 | 840A | | 0312 | BZ | NOHALF | |
| 05F2 | 62 | | 0313 HALF | LISU | 2 | |
| 05F3 | 6A | | 0314 | LISL | 2 | |

| | | | | | | |
|---|---|---|---|---|---|---|
| 05F4 | 4C | | 0315 | | LR | A,S |
| 05F5 | 2201 | | 0316 | | OI | 1 | HALF NOTE ERROR BIT
| 05F7 | 5C | | 0317 | | LR | S,A |
| 05F8 | 67 | | 0318 | | LISU | 7 |
| 05F9 | 90B7 | | 0319 | | BR | HALT |
| 05FB | 40 | | 0320 | NOHALF | LR | A,0 |
| 05FC | 21EF | | 0321 | | NI | H'EF' | RESET COUNTING ON A
| 05FE | 50 | | 0322 | | LR | 0,A |
| 05FF | 42 | | 0323 | | LR | A,2 | GET COUNT CONSTANT
| 0600 | 69 | | 0324 | | LISL | 1 |
| 0601 | 5D | | 0325 | | LR | I,A | SET A = 80
| 0602 | 5C | | 0326 | | LR | S,A | SET B = 80
| 0603 | 9029 | | 0327 | | BR | TOUT |
| 0605 | 71 | | 0328 | ONELINE | LIS | 1 |
| 0606 | F6 | | 0329 | | NS | 6 |
| 0607 | 8428 | | 0330 | | BZ | BLINE | A LINE NOT ON
| 0609 | 2040 | | 0331 | ALINE | LI | H'40' | CHK FOR HALF NOTE BIT
| 060B | F0 | | 0332 | | NS | 0 | YES=B HASN'T STARTED YET
| 060C | 940E | | 0333 | | BNZ | BNGONE |
| 060E | 6B | | 0334 | | LISL | 3 |
| 060F | 7F | | 0335 | | LIS | H'F' |
| 0610 | FC | | 0336 | | NS | S | GET B HOLE CTR
| 0611 | 8406 | | 0337 | | BZ | RSTTB |
| 0613 | 3C | | 0338 | | DS | S | DEC B HOLE CTR
| 0614 | 4E | | 0339 | | LR | A,D |
| 0615 | 15 | | 0340 | | SL | 4 |
| 0616 | 9404 | | 0341 | | BNZ | BNGONE |
| 0618 | 6A | | 0342 | RSTTB | LISL | 2 |
| 0619 | 42 | | 0343 | | LR | A,2 | GET COUNT CONSTANT
| 061A | 5C | | 0344 | | LR | S,A | B = 80
| 061B | 68 | | 0345 | BNGONE | LISL | 0 |
| 061C | 20F0 | | 0346 | | LI | H'F0' |
| 061E | FC | | 0347 | | NS | S |
| 061F | 2405 | | 0348 | | AI | HOLE | A HOLE CTR = 4
| 0621 | 5D | | 0349 | | LR | I,A |
| 0622 | 4C | | 0350 | | LR | A,S |
| 0623 | E3 | | 0351 | | XS | 3 | A = NOTE?
| 0624 | 9404 | | 0352 | | BNZ | CHKAGNE |
| 0626 | 28073B | A | 0353 | | PI | NEWNOTE |
| 0629 | 69 | | 0354 | CHKAGNE | LISL | 1 |
| 062A | 3C | | 0355 | | DS | S | A TOO LONG?
| 062B | 8449 | | 0356 | | BZ | GJAM | YES
| 062D | 2906F0 | A | 0357 | TOUT | JMP | OUT |
| 0630 | 40 | | 0358 | BLINE | LR | A,0 |
| 0631 | 21BF | | 0359 | | NI | H'BF' | RESET 1/2 NOTE BIT
| 0633 | 50 | | 0360 | | LR | 0,A |
| 0634 | 6A | | 0361 | | LISL | 2 |
| 0635 | 3C | | 0362 | | DS | S | DEC 'B' CTR
| 0636 | 843E | | 0363 | | BZ | GJAM | B DOC TOO LONG
| 0638 | 68 | | 0364 | | LISL | 0 |
| 0639 | 7F | | 0365 | | LIS | H'F' |
| 063A | FC | | 0366 | | NS | S | GET A HOLE CTR
| 063B | 5C | | 0367 | | LR | S,A |
| 063C | 8404 | | 0368 | | BZ | RSTA | HOLE CTR = 0
| 063E | 3C | | 0369 | | DS | S | DEC A HOLE CTR
| 063F | 9408 | | 0370 | | BNZ | BHCNT |
| 0641 | 69 | | 0371 | RSTA | LISL | 1 | A COUNTER LOC
| 0642 | 42 | | 0372 | | LR | A,2 | COUNT CONSTANT
| 0643 | 5D | | 0373 | | LR | I,A | SET 'A' = 80
| 0644 | A0 | | 0374 | | INS | 0 |
| 0645 | 2204 | | 0375 | | OI | H'04' | STOP SALEM COUNT PULSE
| 0647 | B0 | | 0376 | | OUTS | 0 |
| 0648 | 6B | | 0377 | BHCNT | LISL | 3 |
| 0649 | 75 | | 0378 | | LIS | HOLE | HOLE CTR = 4, DBL = 0
| 064A | 5C | | 0379 | | LR | S,A |
| 064B | 90E1 | | 0380 | | BR | TOUT |
| 064D | 73 | | 0381 | COUNTB | LIS | 3 |
| 064E | F6 | | 0382 | | NS | 6 | GET COUNT LINES
| 064F | 8431 | | 0383 | | BZ | NOLNE | NEITHER LINE ACTIVE
| 0651 | 2503 | | 0384 | | CI | H'03' | BOTH ACTIVE
| 0653 | 9453 | | 0385 | | BNZ | ONELNE | ONLY ONE LINE
| 0655 | 40 | | 0386 | BOTHL | LR | A,0 |
| 0656 | 21BF | | 0387 | | NI | H'BF' | RESET 1/2 NOTE BIT

```
0658  50           0388         LR    0,A
0659  68           0389         LISL  0
065A  4C           0390         LR    A,S
065B  21F0         0391         NI    H'F0'       GET DBL CTR ONLY
065D  2405         0392         AI    HOLE
065F  5C           0393         LR    S,A         A HOLE CTR = 4
0660  6B           0394         LISL  3
0661  4C           0395         LR    A,S
0662  21F0         0396         NI    H'F0'       GET DBL CTR ONLY
0664  2405         0397         AI    HOLE        B HOLE CTR = 4
0666  5E           0398         LR    D,A
0667  3C           0399         DS    S           DEC B
0668  840C         0400         BZ    GJAM        B LONG
066A  4E           0401         LR    A,D
066B  E3           0402         XS    3           B=NOTE?
066C  9404         0403         BNZ   NONEW       NO
066E  28073B  A    0404         PI    NEWNOTE
0671  69           0405 NONEW   LISL  1
0672  3C           0406         DS    S           DEC 'A'
0673  9404         0407         BNZ   NOLNG       NO
0675  2905AA  A    0408 GJAM    JMP   JAM         TOO LONG
0678  4C           0409 NOLNG   LR    A,S
0679  E3           0410         XS    3           NEW NOTE?
067A  94B2         0411         BNZ   TOUT        NO
067C  280739  A    0412         PI    NEWNOTE
067F  9070         0413         BR    OUT
0681  6B           0414 NOLNE   LISL  3           NEITHER LINE ACTIVE
0682  7F           0415         LIS   H'F'
0683  FC           0416         NS    S
0684  5C           0417         LR    S,A         CLEAR BOTH DBL CTRS
0685  68           0418         LISL  0
0686  7F           0419         LIS   H'F'
0687  FC           0420         NS    S
0688  5C           0421         LR    S,A
0689  8404         0422         BZ    A00         A HOLE CTR = 0 ALREADY
068B  3D           0423         DS    I           DEC A HOLE CTR
068C  9404         0424         BNZ   NOAHOLE
068E  69           0425         LISL  1
068F  42           0426         LR    A,2         COUNT CONSTANT
0690  5C           0427         LR    S,A         A = 80
0691  6B           0428 NOAHOLE LISL  3
0692  3C           0429         DS    S           DEC B HOLE CTR
0693  9499         0430         BNZ   TOUT        NO HOLE IN B
0695  2040         0431         LI    H'40'
0697  F0           0432         NS    0           HALF NOTE STILL ON?
0698  8404         0433         BZ    NH          NO
069A  2905F2  A    0434         JMP   HALF        HALF NOTE
069D  40           0435 NH      LR    A,0
069E  21DF         0436         NI    H'DF'       RESET COUNTING ON B
06A0  50           0437         LR    0,A
06A1  42           0438         LR    A,2         COUNT CONSTANT
06A2  69           0439         LISL  1
06A3  5D           0440         LR    I,A         SET A = 80
06A4  5C           0441         LR    S,A         SET B = 80
06A5  9049         0442         BR    OUT
06A7  72           0443 ONELNE  LIS   2
06A8  F6           0444         NS    6
06A9  8427         0445         BZ    ALNE        B LINE NOT ON
06AB  2040         0446 BLNE    LI    H'40'       HALF NOTE SET?
06AD  F0           0447         NS    0           YES=A HASN'T STARTED YET
06AE  941E         0448         BNZ   ANGNE
06B0  68           0449         LISL  0
06B1  7F           0450         LIS   H'F'
06B2  FC           0451         NS    S
06B3  8406         0452         BZ    RSSTA       A HOLE CTR = 0
06B5  3C           0453         DS    S           DEC A HOLE CTR
06B6  4D           0454         LR    A,I
06B7  15           0455         SL    4
06B8  9404         0456         BNZ   ANGNE
06BA  69           0457 RSSTA   LISL  1
06BB  42           0458         LR    A,2         COUNT CONSTANT
06BC  5C           0459         LR    S,A         A = 80
06BD  6B           0460 ANGNE   LISL  3
```

```
06BE  20F0          0461            LI    H'F0'
06C0  FC            0462            NS    S
06C1  2405          0463            AI    HOLE        B HOLE CTR = 4
06C3  5E            0464            LR    D,A
06C4  4C            0465            LR    A,S
06C5  E3            0466            XS    3           B=NOTE?
06C6  9404          0467            BNZ   CHKBGNE
06C8  2807393   A   0468            PI    NEWNOTE
06CB  6A            0469 CHKBGNE    LISL  2
06CC  3C            0470            DS    S           B TOO LONG?
06CD  84A7          0471            BZ    GJAM        B DOC TOO LONG?
06CF  9020          0472            BR    OUT
06D1  40            0473 ALNE       LR    A,0
06D2  21BF          0474            NI    H'BF'       RESET 1/2 NOTE BIT
06D4  50            0475            LR    0,A
06D5  69            0476            LISL  1
06D6  3C            0477            DS    S           DEC A CTR
06D7  849D          0478            BZ    GJAM        A DOC TOO LONG
06D9  40            0479            LR    A,0
06DA  21BF          0480            NI    H'BF'       RST HALF NOTE FLAG
06DC  50            0481            LR    0,A
06DD  6B            0482            LISL  3
06DE  7F            0483            LIS   H'F'
06DF  FC            0484            NS    S           GET B HOLE CTR
06E0  5C            0485            LR    S,A
06E1  8404          0486            BZ    RSTB
06E3  3C            0487            DS    S           DEC B HOLE CTR
06E4  9408          0488            BNZ   AHCNT
06E6  6A            0489 RSTB       LISL  2
06E7  42            0490            LR    A,2         COUNT CONSTANT
06E8  5E            0491            LR    D,A         SET B = 80
06E9  A0            0492            INS   0
06EA  2204          0493            OI    H'04'       RESET SALEM COUNT PULSE
06EC  B0            0494            OUTS  0
06ED  68            0495 AHCNT      LISL  0
06EE  75            0496            LIS   HOLE        HOLE CTR=4, DBL=0
06EF  5C            0497            LR    S,A
06F0  67            0498 OUT        LISU  7
06F1  69            0499            LISL  1
06F2  43            0500            LR    A,3         NOTE - 1 COUNT
06F3  24EF          0501            AI    SALEM       20 PULSES TAKEN YET?
06F5  18            0502            COM
06F6  CD            0503            AS    I           HALF THROUGH NOTE?
06F7  9208          0504            BNC   STPP        YES = STOP SALEM PULSE
06F9  43            0505            LR    A,3         NOTE - 1 CTR
06FA  24EF          0506            AI    SALEM       20 PULSES TAKEN YET?
06FC  18            0507            COM
06FD  CC            0508            AS    S           HALF THROUGH NOTE?
06FE  8205          0509            BC    NOSTPP      NO
0700  A0            0510 STPP       INS   0
0701  2204          0511            OI    H'04'       STOP SALEM COUNT PULSE
0703  B0            0512            OUTS  0
0704  62            0513 NOSTPP     LISU  2
0705  6A            0514            LISL  2
0706  74            0515            LIS   4           JAM ERROR BIT ON?
0707  FC            0516            NS    S
0708  67            0517            LISU  7
0709  8406          0518            BZ    NJB         NO
070B  64            0519            LISU  4           TAKE KEY IMMEDIATELY
070C  70            0520            CLR
070D  5C            0521            LR    S,A         CLEAR KEY BOARD LOCK OUT
070E  9029          0522            BR    LEAVE
0710  67            0523 NJB        LISU  7
0711  6F            0524            LISL  7
0712  A5            0525            INS   5           ANY CHANGE IN REM/LOC
0713  2140          0526            NI    H'40'       OR SALEM RUN/STOP
0715  51            0527            LR    1,A         MEANS LEAVE ROUTINE
0716  A1            0528            INS   1           TO STOP FOR SALEM
0717  2110          0529            NI    H'10'       BATCH
0719  C1            0530            AS    1
071A  EC            0531            XS    S
071B  941C          0532            BNZ   LEAVE
071D  7F            0533            LIS   H'F'        NEW NOTE OR JAM?
```

```
071E  F5            0534           NS    5
071F  940D          0535           BNZ   NTEDONE    YES
0721  2030          0536           LI    H'30'
0723  F0            0537           NS    0          COUNTING ON EITHER LINE?
0724  9405          0538           BNZ   GONST      YES STAY IN POLL
0726  73            0539           LIS   3
0727  F6            0540           NS    6          EITHER COUNT LINE PRESENT?
0728  8404          0541           BZ    NTEDONE    NO
072A  290473   A    0542  GONST    JMP   NSTART     STAY IN NOTE POLL
072D  A5            0543  NTEDONE  INS   5
072E  2140          0544           NI    H'40'      REMOTE OPERATION?
0730  9407          0545           BNZ   LEAVE      YES DON'T COUNT NOTES
0732  67            0546           LISU  7
0733  6C            0547           LISL  4
0734  77            0548           LIS   H'7'
0735  F5            0549           NS    5          ADD ANY NOTES FOUND TO R74
0736  CC            0550           AS    S          NOTES FOUND BUT NOT COUNTED
0737  5C            0551           LR    S,A        SAVE UNCOUNTED NOTES
0738  29FFFF   A    0552  LEAVE    JMP   RETURN     RETURN FROM NOTEPOLL
073B  08            0553  NEWNOTE  LR    K,P        SAVE RETURN ADDR
073C  A5            0554           INS   5
073D  2140          0555           NI    H'40'      REMOTE OPERATION?
073F  8415          0556           BZ    NOREM      NO
0741  A0            0557           INS   0
0742  21FB          0558           NI    H'FB'      START SALEM CNT PULSE
0744  B0            0559           OUTS  0
0745  A1            0560           INS   1
0746  2110          0561           NI    H'10'      SALEM STOP LINE?
0748  940C          0562           BNZ   NOREM      NO
074A  A0            0563           INS   0
074B  21F7          0564           NI    H'F7'      JAM LINE TO SALEM
074D  B0            0565           OUTS  0          FOR FEED ERROR
074E  67            0566           LISU  7
074F  6F            0567           LISL  7
0750  3C            0568           DS    S          CHANGE R77 TO FORCE RESTART
0751  62            0569           LISU  2
0752  6A            0570           LISL  2
0753  900E          0571           BR    SETXTRA
0755  62            0572  NOREM    LISU  2
0756  6A            0573           LISL  2
0757  74            0574           LIS   4          JAM ERROR BIT ON
0758  FC            0575           NS    S          IF SO NO NEW NOTES
0759  67            0576           LISU  7
075A  9445          0577           BNZ   OUTNEW     YES = NO NEW NOTES
075C  62            0578           LISU  2
075D  6A            0579           LISL  2
075E  78            0580           LIS   8          CHECK FOR BATCH BIT ON
075F  FC            0581           NS    S          IF A NOTE IS TAKEN
0760  8405          0582           BZ    NOXTRA     WHILE THE BATCH BIT IS ON
0762  70            0583  SETXTRA  CLR              OR SALEM SAYS STOP
0763  5D            0584           LR    I,A        CLEAR THE OTHER ERRORS
0764  71            0585           LIS   1          SET FEED ERROR BIT
0765  5E            0586           LR    D,A
0766  67            0587  NOXTRA   LISU  7
0767  68            0588           LISL  0
0768  7F            0589           LIS   H'F'
0769  FC            0590           NS    S          RESET A DBL CTR
076A  5C            0591           LR    S,A
076B  6B            0592           LISL  3
076C  7F            0593           LIS   H'F'
076D  FC            0594           NS    S          RESET B DBL CTR
076E  5C            0595           LR    S,A
076F  45            0596           LR    A,5
0770  1F            0597           INC              ADD 1 NOTE
0771  55            0598           LR    5,A        NEW NOTE FLAG
0772  73            0599  NOB      LIS   3          ARE BOTH CNT LINES ON?
0773  F6            0600           NS    6
0774  2503          0601           CI    3
0776  8407          0602           BZ    BOTHON     YES=DON'T SET HALF BIT
0778  40            0603           LR    A,0
0779  2240          0604           OI    H'40'      SET HALF NOTE
077B  50            0605           LR    0,A
```

```
077C  0008   0606         BR    NBTH
077E  40     0607 BOTHON  LR    A,0        RESET HALF BIT
077F  21BF   0608         NI    H'BF'
0781  50     0609         LR    0,A
0782  64     0610 NBTH    LISU  4
0783  68     0611         LISL  0
0784  72     0612         LIS   2          KEY BOARD LOCK OUT
0785  5C     0613         LR    S,A        AFTER ACCEPTING A NOTE
0786  6A     0614         LISL  2
0787  5D     0615         LR    I,A
0788  6E     0616         LISL  6
0789  20FF   0617         LI    H'FF'      LAST KEY = NO KEY
078B  5C     0618         LR    S,A
078C  63     0619         LISU  3
078D  6A     0620         LISL  2          RESET AUTO START/STOP
078E  71     0621         LIS   1          STOP BIT ON
078F  F0     0622         NS    0          YES=KEEP INHIBIT BIT
0790  4C     0623         LR    A,S
0791  9403   0624         BNZ   LVON
0793  21EF   0625         NI    H'EF'      RESET INHIBIT BIT
0795  220F   0626 LVON    OI    H'0F'      RESTART COUNTER
0797  5D     0627         LR    I,A
0798  6C     0628         LISL  4          R33 & 34
0799  78     0629         LIS   8          START CTR FOR
079A  5C     0630         LR    S,A        NO NOTES TAKEN
079B  67     0631         LISU  7
079C  69     0632         LISL  1
079D  44     0633         LR    A,4        GET NOTE -1 COUNT
079E  5D     0634         LR    I,A
079F  5D     0635         LR    I,A        BOTH CTRS = NOTE - 1
07A0  0C     0636 OUTNEW  PK
                   0001 *                         30
                   0002 *****     862 LOOKUP      *****
                   0003 *****                     *****
                   0004 *
                   0005 LOOKUP  PSECT ABS
)07A2              0006         ORG   H'7A2'     START OF PRESET BATCH VALUES
07A2  00           0007         DC    H'00'      0 KEY = 00 BATCH
07A3  00           0008         DC    H'00'
07A4  05           0009         DC    H'05'      1 KEY = 5 BATCH
07A5  00           0010         DC    H'00'
07A6  10           0011         DC    H'10'      2 KEY = 10 BATCH
07A7  00           0012         DC    H'00'
07A8  20           0013         DC    H'20'      3 KEY = 20 BATCH
07A9  00           0014         DC    H'00'
07AA  25           0015         DC    H'25'      4 KEY = 25 BATCH
07AB  00           0016         DC    H'00'
07AC  50           0017         DC    H'50'      5 KEY = 50 BATCH
07AD  00           0018         DC    H'00'
07AE  00           0019         DC    H'00'      6 KEY = 100 BATCH
07AF  01           0020         DC    H'01'
07B0  50           0021         DC    H'50'      7 KEY = 250 BATCH
07B1  02           0022         DC    H'02'
07B2  00           0023         DC    H'00'      8 KEY = 500 BATCH
07B3  05           0024         DC    H'05'
07B4  50           0025         DC    H'50'      9 KEY = 750 BATCH
07B5  07           0026         DC    H'07'
07B6  7B           0027         DC    H'7B'      SEGMENT DATA FOR 0
07B7  30           0028         DC    H'30'      1
07B8  6D           0029         DC    H'6D'      2
07B9  75           0030         DC    H'75'      3
07BA  36           0031         DC    H'36'      4
07BB  57           0032         DC    H'57'      5
07BC  5F           0033         DC    H'5F'      6
07BD  70           0034         DC    H'70'      7
07BE  7F           0035         DC    H'7F'      8
07BF  77           0036         DC    H'77'      9
                   0037 *
                   0038 *      INTERNATIONAL ERROR MESSAGES
                   0039 *
07C0  4F           0040         DC    H'4F'      E
07C1  0C           0041         DC    H'0C'      R
07C2  0C           0042         DC    H'0C'      R
```

```
07C3  30        0043         DC    H'30'     1
                0044  *
07C4  4F        0045         DC    H'4F'     E
07C5  0C        0046         DC    H'0C'     R
07C6  0C        0047         DC    H'0C'     R
07C7  6D        0048         DC    H'6D'     2
                0049  *
07C8  00        0050         DC    H'00'     BLANK
07C9  00        0051         DC    H'00'
07CA  00        0052         DC    H'00'
07CB  00        0053         DC    H'00'
                0054  *
07CC  4F        0055         DC    H'4F'     E
07CD  0C        0056         DC    H'0C'     R
07CE  0C        0057         DC    H'0C'     R
07CF  75        0058         DC    H'75'     3
                0059  *
07D0  4F        0060         DC    H'4F'     E
07D1  0C        0061         DC    H'0C'     R
07D2  0C        0062         DC    H'0C'     R
07D3  36        0063         DC    H'36'     4
                0064  *
                0065  *      U.S. ERROR MESSAGES
                0066  *
07D4  3E        0067         DC    H'3E'     H
07D5  7E        0068         DC    H'7E'     A
07D6  0D        0069         DC    H'0D'     L
07D7  4E        0070         DC    H'4E'     F
                0071  *
07D8  3D        0072         DC    H'3D'     D
07D9  1F        0073         DC    H'1F'     B
07DA  0B        0074         DC    H'0B'     L
07DB  00        0075         DC    H'00'
                0076  *
07DC  1F        0077         DC    H'1F'     B
07DD  7E        0078         DC    H'7E'     A
07DE  4B        0079         DC    H'4B'     C
07DF  3E        0080         DC    H'3E'     H
                0081  *
07E0  4F        0082         DC    H'4F'     E
07E1  0C        0083         DC    H'0C'     R
07E2  0C        0084         DC    H'0C'     R
07E3  00        0085         DC    H'00'
                0086  *
07E4  4E        0087         DC    H'4E'     F
07E5  4F        0088         DC    H'4F'     E
07E6  4F        0089         DC    H'4F'     E
07E7  3D        0090         DC    H'3D'     D
                0091  *
                0092  *      START OF KEY LOOK UP
                0093  *
07E8  08        0094         DC    H'08'     8
07E9  05        0095         DC    H'05'     5
07EA  02        0096         DC    H'02'     2
07EB  00        0097         DC    H'00'     0
07EC  FF        0098         DC    H'FF'
07ED  42        0099         DC    H'42'     STOP
07EE  FF        0100         DC    H'FF'
07EF  FF        0101         DC    H'FF'
07F0  07        0102         DC    H'07'     7
07F1  04        0103         DC    H'04'     4
07F2  01        0104         DC    H'01'     1
07F3  FF        0105         DC    H'FF'     OLD CNT KEY = NOT USED
07F4  43        0106         DC    H'43'     RUN (RIGHT HAND START KEY 872)
07F5  41        0107         DC    H'41'     CONTINUE
07F6  FF        0108         DC    H'FF'
07F7  FF        0109         DC    H'FF'
07F8  09        0110         DC    H'09'     9
07F9  06        0111         DC    H'06'     6
07FA  03        0112         DC    H'03'     3
07FB  FF        0113         DC    H'FF'     OLD CLR KEY = NOT USED
07FC  FF        0114         DC    H'FF'
07FD  40        0115         DC    H'40'     ENTER
07FE  FF        0116         DC    H'FF'
07FF  FF        0117         DC    H'FF'
                0118         END
```

What is claimed is:

1. Apparatus for counting sheets moving at spaced intervals along a feed path, comprising:
   a light source positioned to one side of said feed path;
   light sensor means positioned to the opposite side of said feed path for generating a light signal representing the light intensity of light rays from said light source directed across the feed path towards said light sensor means;
   reference means for generating a first reference level when no sheets are passing between the light sensor and the light source;
   comparator means comparing the output of said light sensor means against said first reference level for generating a first signal as the leading edge of a sheet passes between said light source and light sensor means; and
   said reference means including level adjusting means responsive to the presence of said first signal for abruptly changing said reference level to a second level responsive to said first signal to prevent the generation of an erroneous signal.

2. The apparatus of claim 1 wherein said comparator means develops a resetting signal as the trailing edge of a sheet passes said light sensor;
   said reference means being responsive to said resetting signal for restoring said first reference level in readiness for detecting the next leading edge of a sheet to pass the light sensor.

3. The apparatus of claim 1 wherein said reference means includes means for abruptly raising the reference level responsive to detection of the leading edge of a sheet by said light sensor.

4. The apparatus of claim 3 wherein said reference means is abruptly reduced to said first reference level responsive to the trailing edge of a sheet passing said light sensor.

5. Apparatus as in claim 1 in which said level adjusting means comprises a switch.

6. Apparatus of multiple fed sheets of a predetermined transmissivity normally arranged to move along a feed path in single spaced fashion, comprising:
   sensor means responsive to the movement of sheets along said path for generating a sensing signal;
   reference comparator means for comparing the sensing signal against a predetermined reference level to ascertain the presence of multiple feed sheets;
   amplifier means coupled between said sensor means and said reference comparator means for amplifying the output of said sensor means;
   said amplifier means including means for normally maintaining the amplifier means in saturation in response to said sensing signal when no sheet is present and when a single sheet is present adjacent said sensing means and which is driven out of saturation in the presence of overlapped sheets to develop a signal below the saturation level of said amplifier means when said sensing signal drops below a predetermined amplitude representing the presence of overlapped sheets.

7. Apparatus for detecting the presence of overlapped sheets of a given optical transmissivity normally arranged to move along a path in spaced one-by-one relationship comprising:
   a light source at one side of said path,
   a light detector at the other side of said path for producing a signal in response to light from said source,
   a comparator for comparing said detector signal against a reference signal,
   an amplifier coupling said detector to said comparator, said amplifier being saturated in response to a signal of a predetermined magnitude,
   said detector producing an output signal of a first magnitude greater than said predetermined magnitude in the absence of a sheet between said light source and said detector and in the presence of a single sheet between said light source and said detector and producing a signal of a second magnitude less than said predetermined magnitude in the presence of overlapped sheets between said light source and said detector,
   said comparator producing an indication of overlapped sheets in response to said amplified second magnitude signal.

* * * * *

UNITED STATES PATENT AND TRADEMARK OFFICE
CERTIFICATE OF CORRECTION

PATENT NO. : 4,703,172
DATED : October 27, 1987
INVENTOR(S) : Sherman, III et al It is certified that error appears in the above-identified patent and that said Letters Patent are hereby corrected as shown below:

In Column 73, line 41, after "Apparatus" insert --for detecting the passage--.

In Column 74, line 4, "feed" should read --fed--.

Signed and Sealed this

Tenth Day of May, 1988

Attest:

DONALD J. QUIGG

Attesting Officer

Commissioner of Patents and Trademarks